INVENTORS
LORING P. CROSMAN
HAROLD J. CHALL
BY

Feb. 9, 1954  L. P. CROSMAN ET AL  2,668,494
ACCOUNTING MACHINE
Filed Feb. 20, 1950  30 Sheets-Sheet 2

INVENTORS
LORING P. CROSMAN
HAROLD J. CHALL
BY
ATTORNEY

Feb. 9, 1954 L. P. CROSMAN ET AL 2,668,494
ACCOUNTING MACHINE
Filed Feb. 20, 1950 30 Sheets-Sheet 6

INVENTORS
LORING P. CROSMAN
HAROLD J. CHALL
BY
ATTORNEY

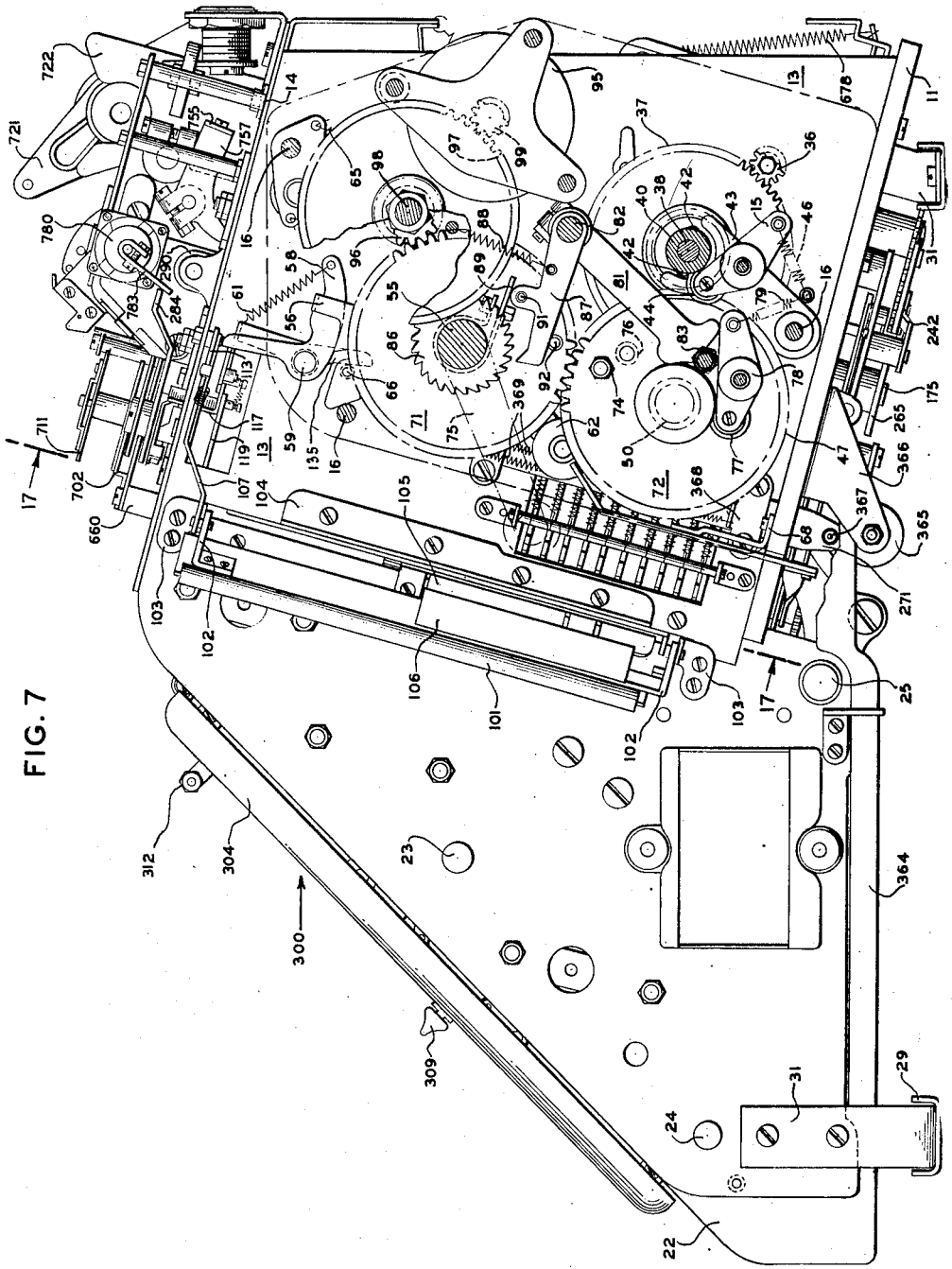

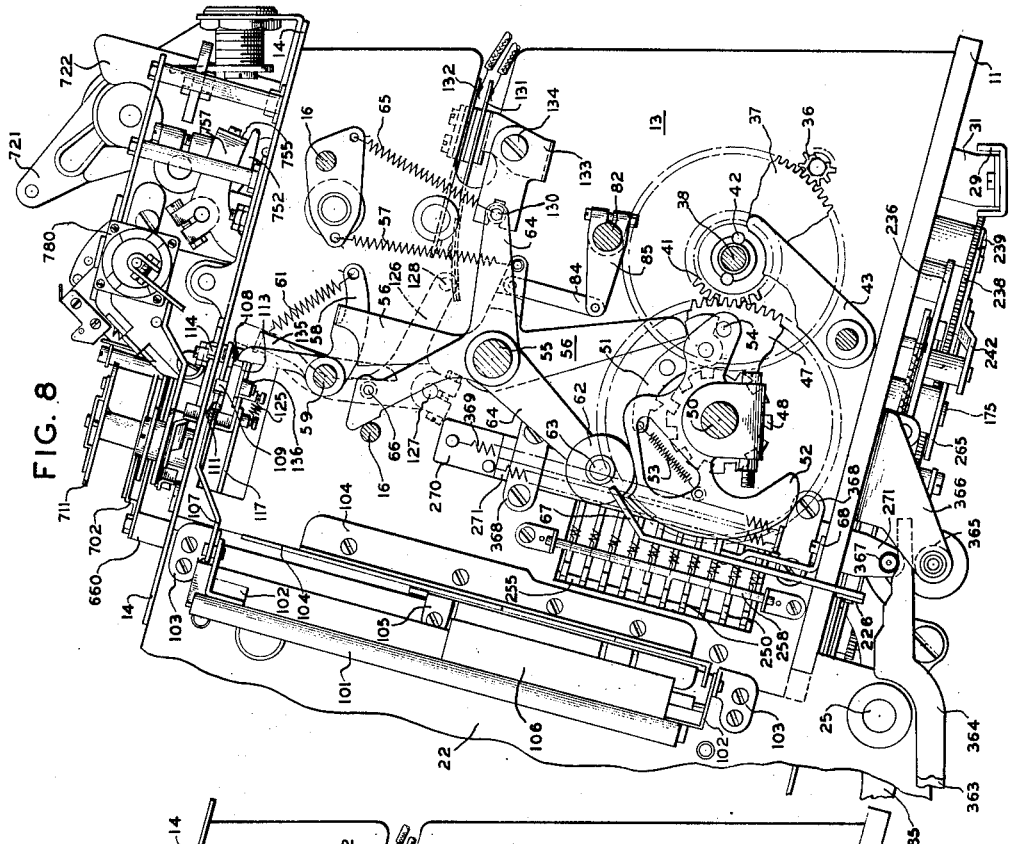

INVENTORS
LORING P. CROSMAN
HAROLD J. CHALL

ATTORNEY

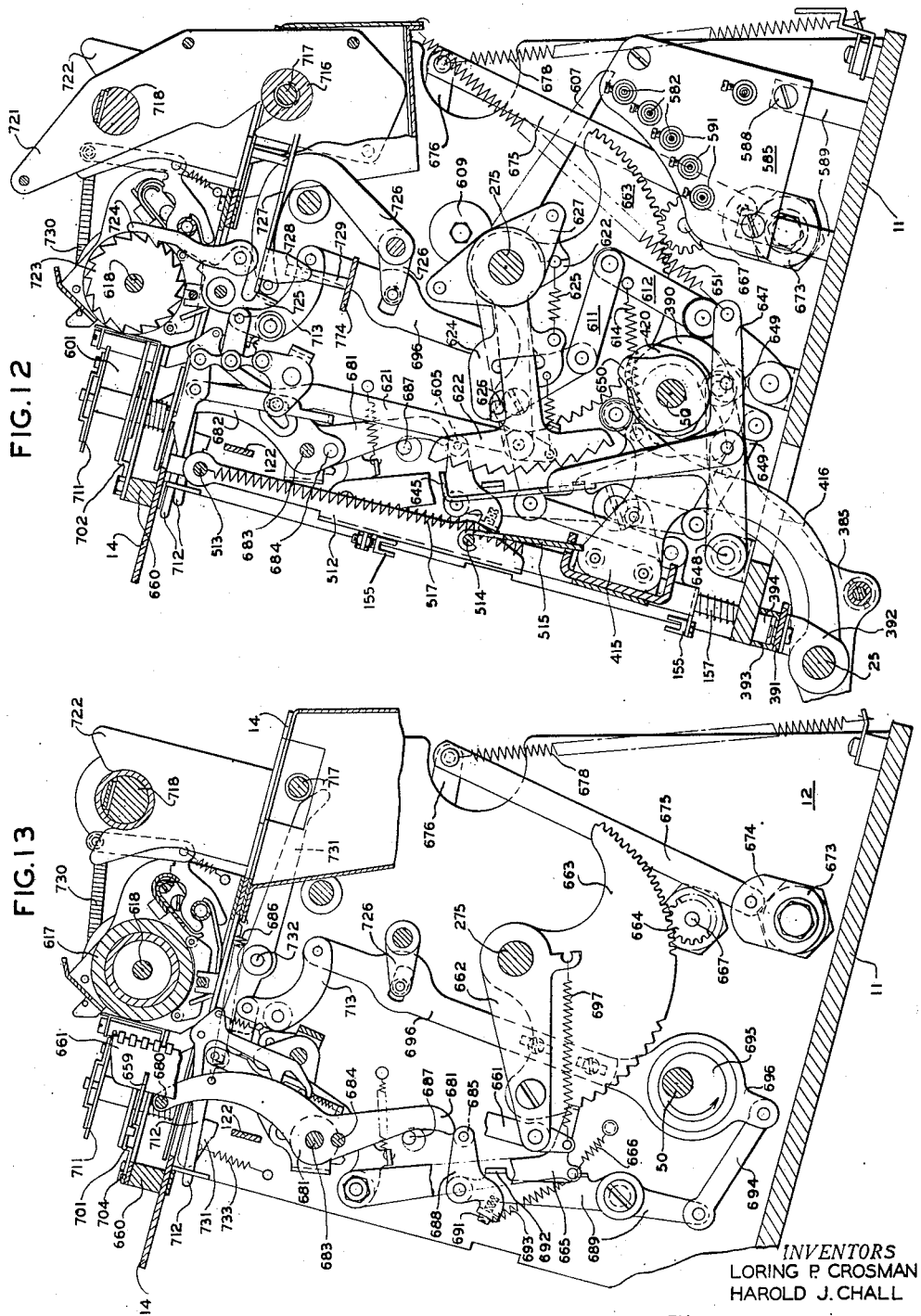

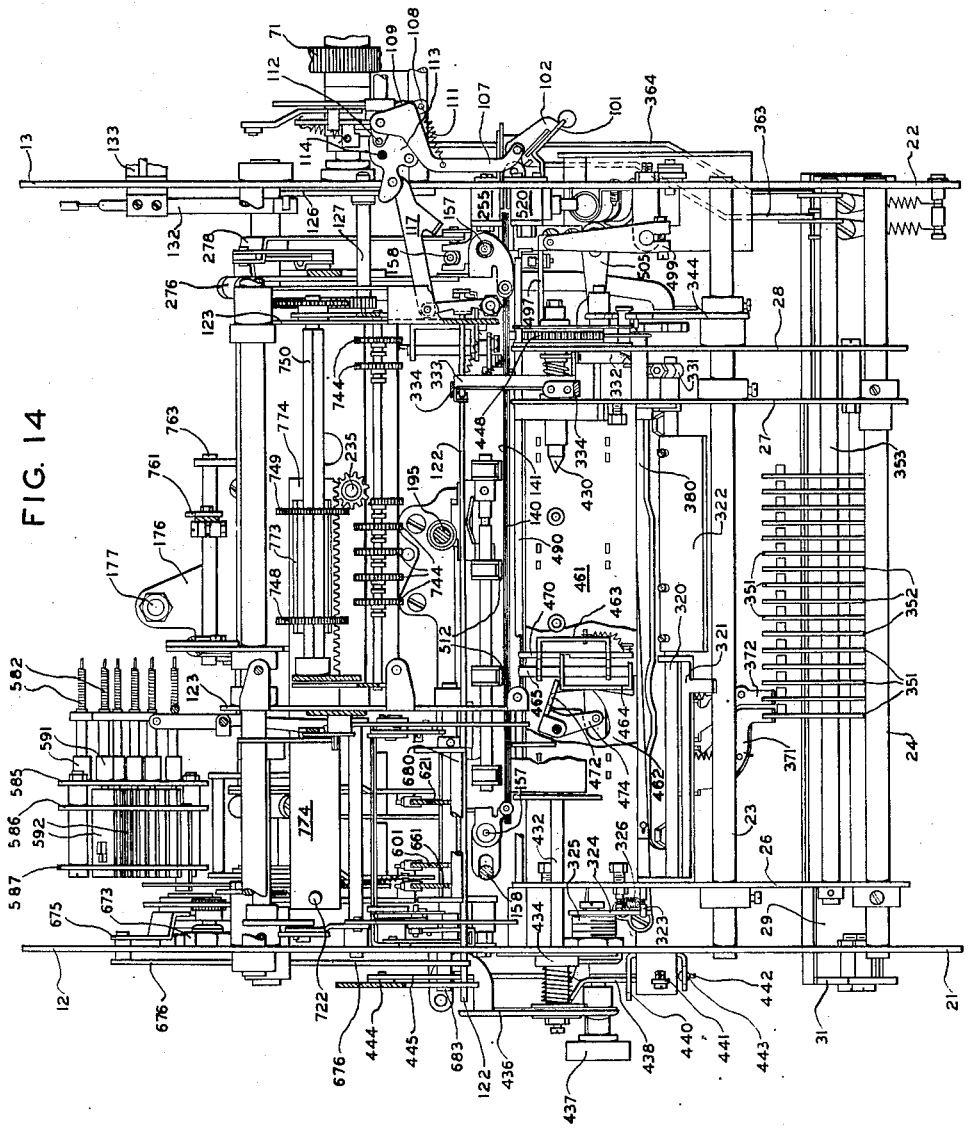

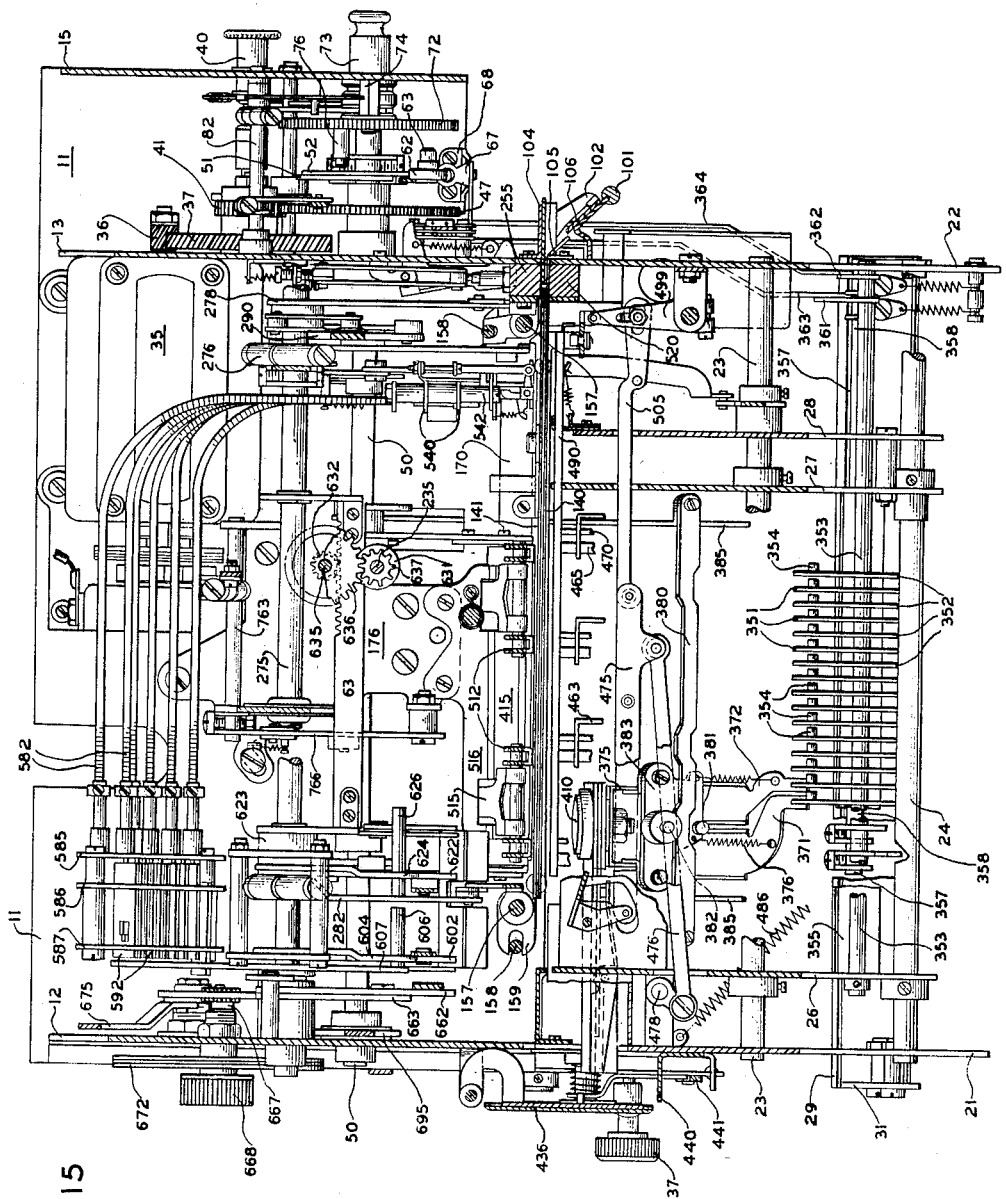

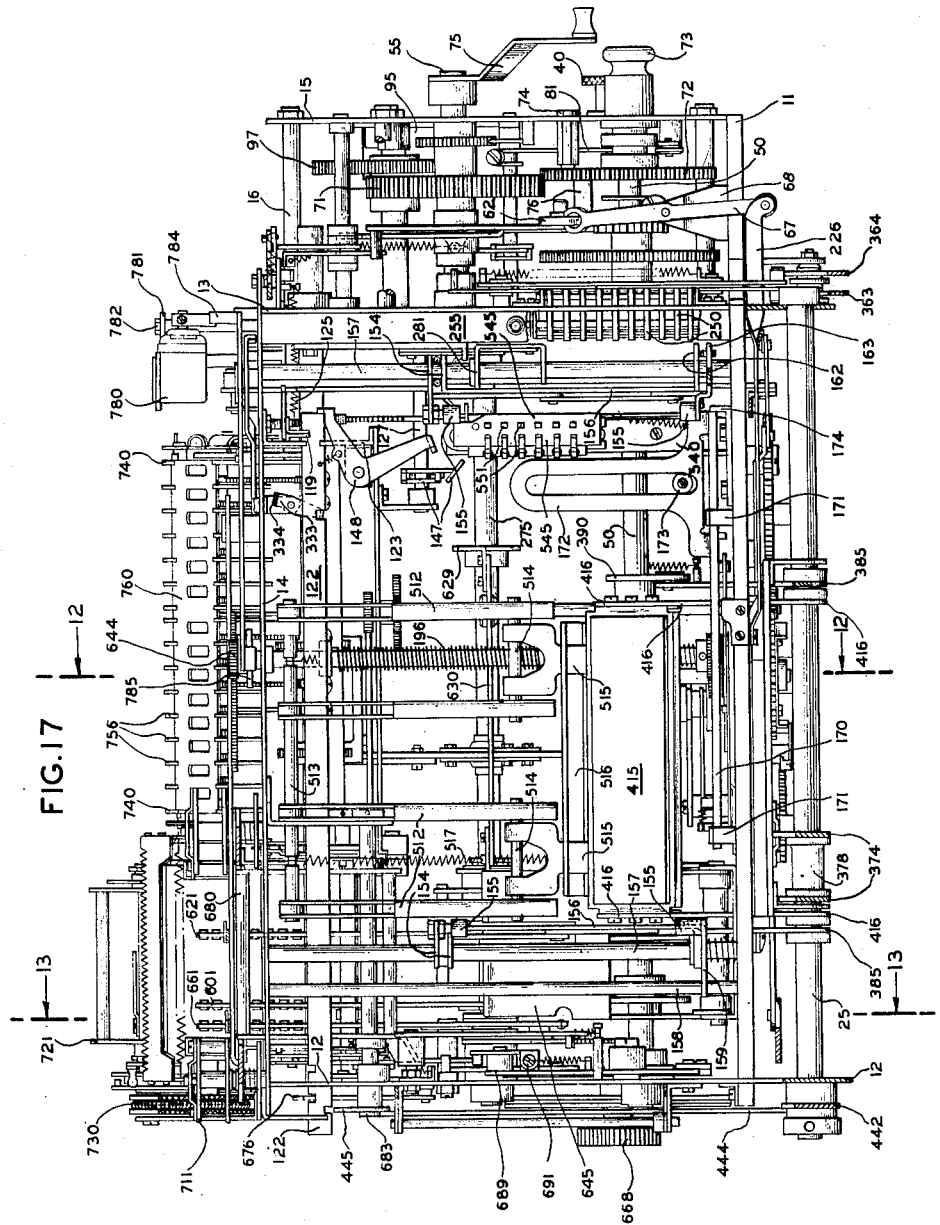

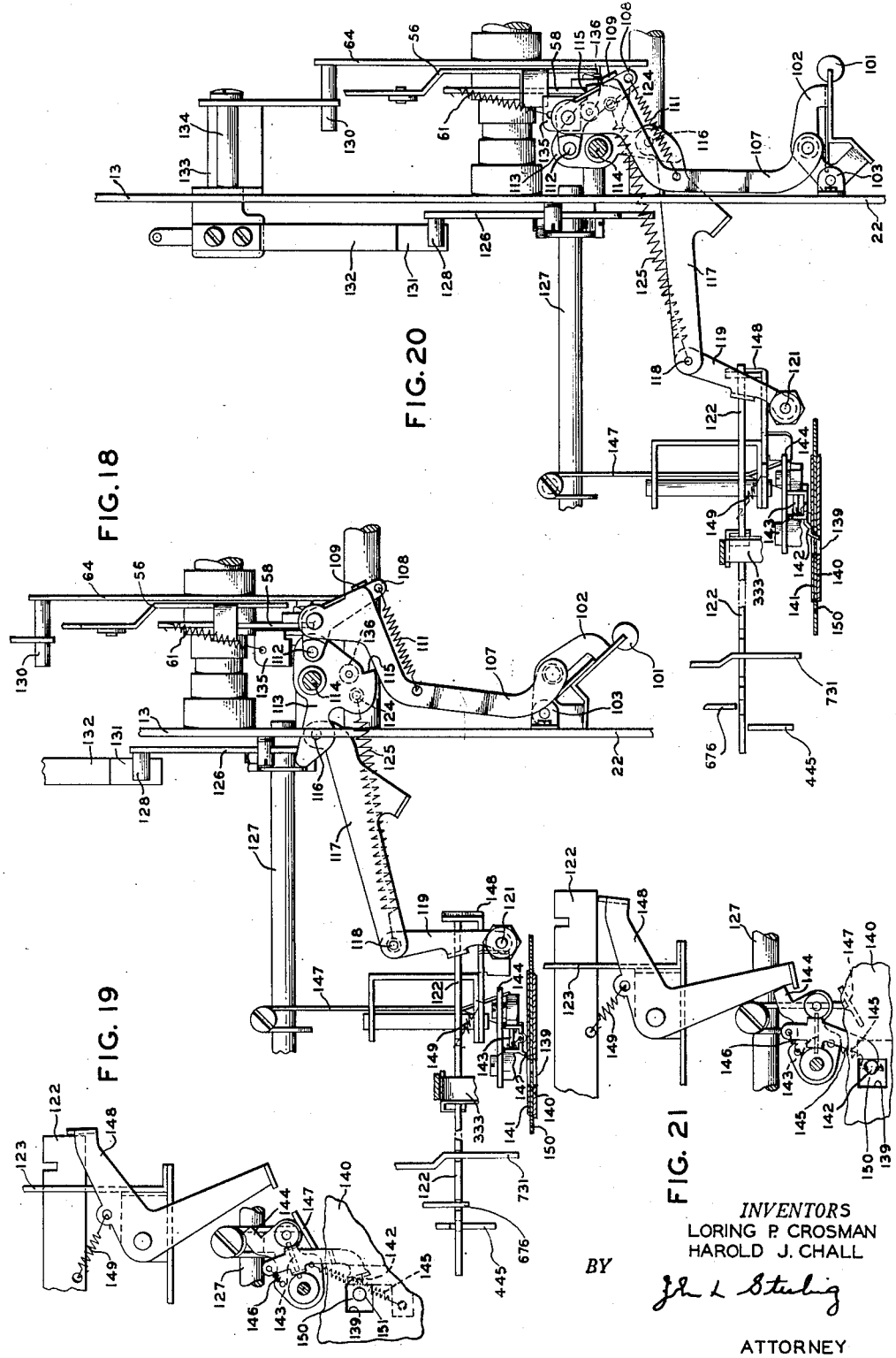

Feb. 9, 1954 — L. P. CROSMAN ET AL — 2,668,494
ACCOUNTING MACHINE
Filed Feb. 20, 1950 — 30 Sheets-Sheet 17

INVENTORS
LORING P. CROSMAN
HAROLD J. CHALL
BY
ATTORNEY

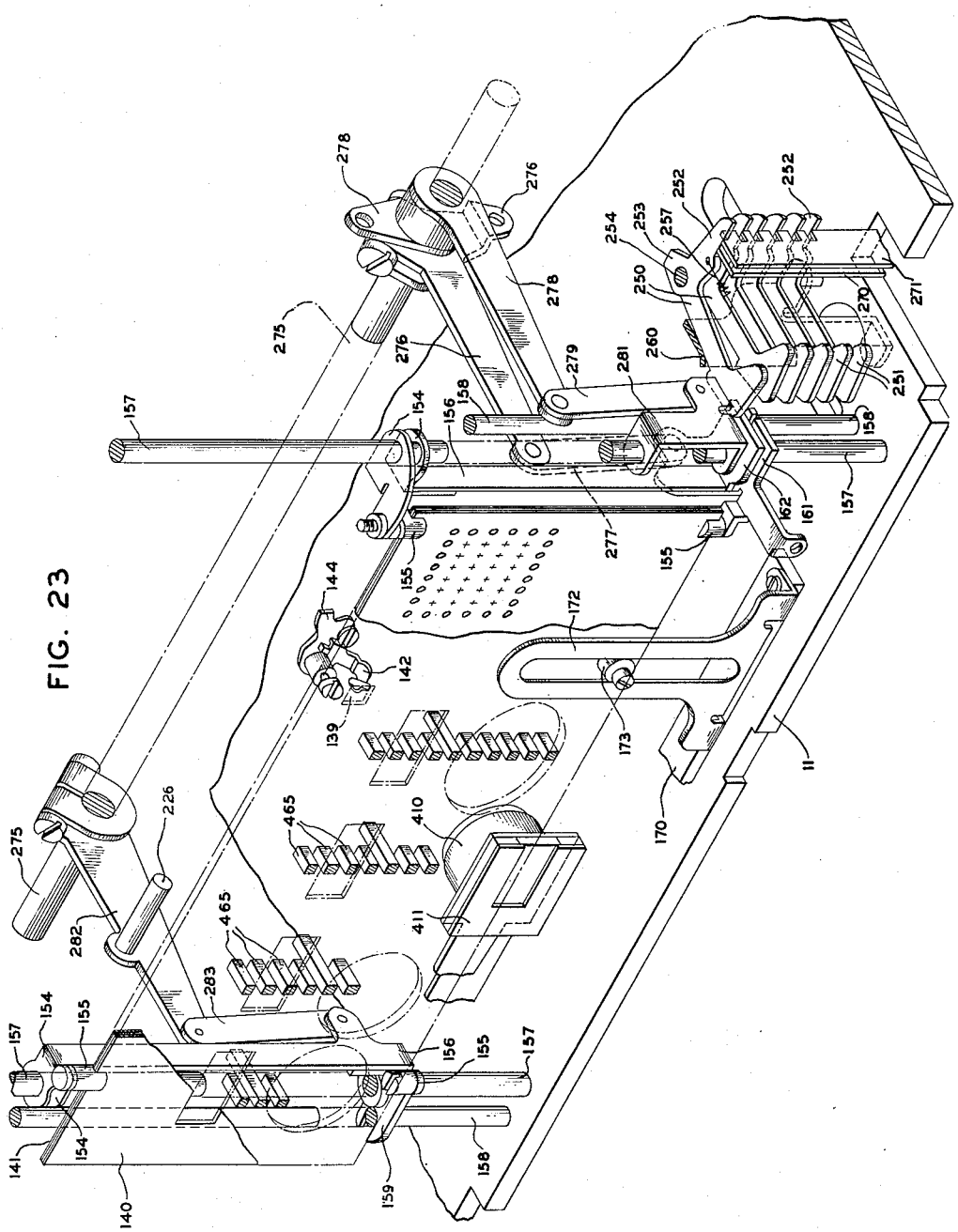

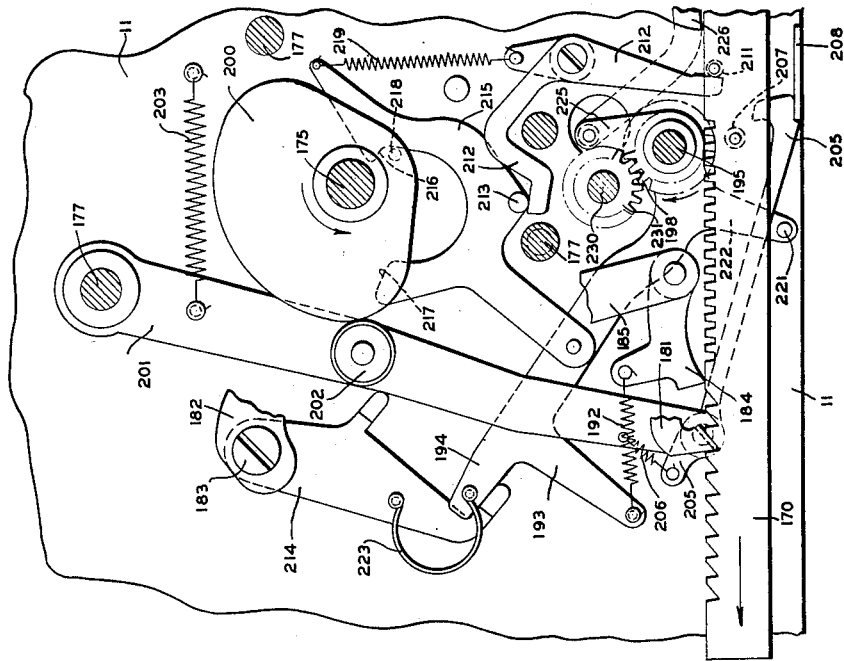

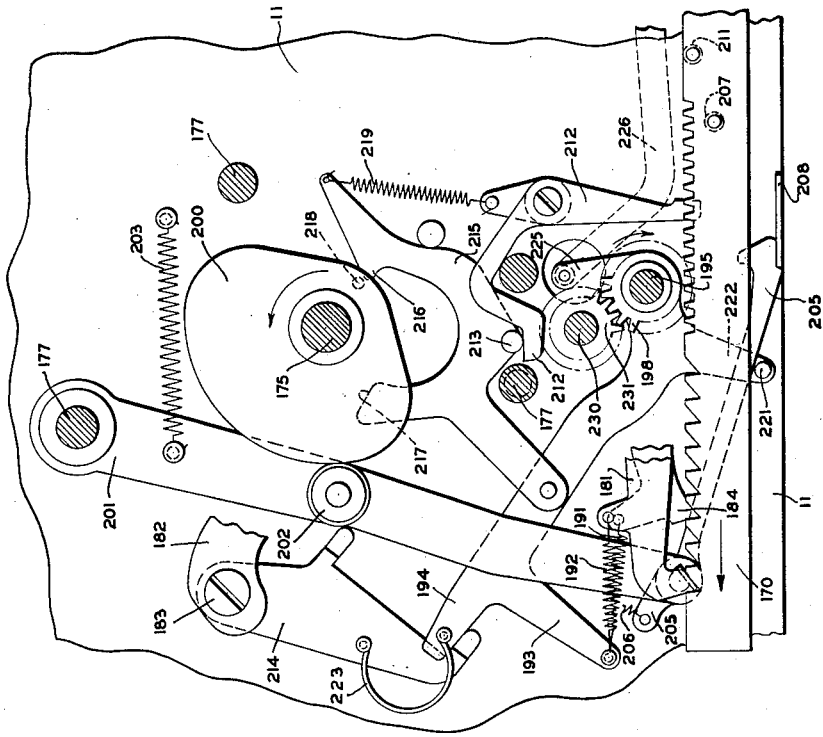

Feb. 9, 1954
L. P. CROSMAN ET AL
2,668,494
ACCOUNTING MACHINE
Filed Feb. 20, 1950
30 Sheets-Sheet 21
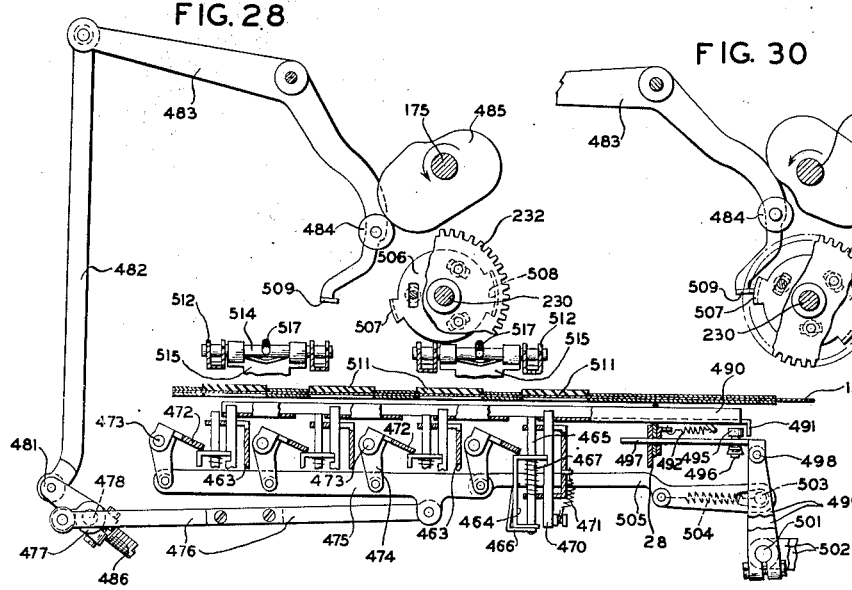
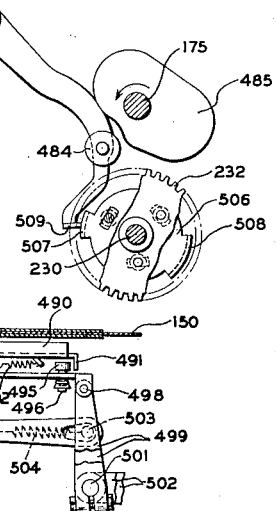
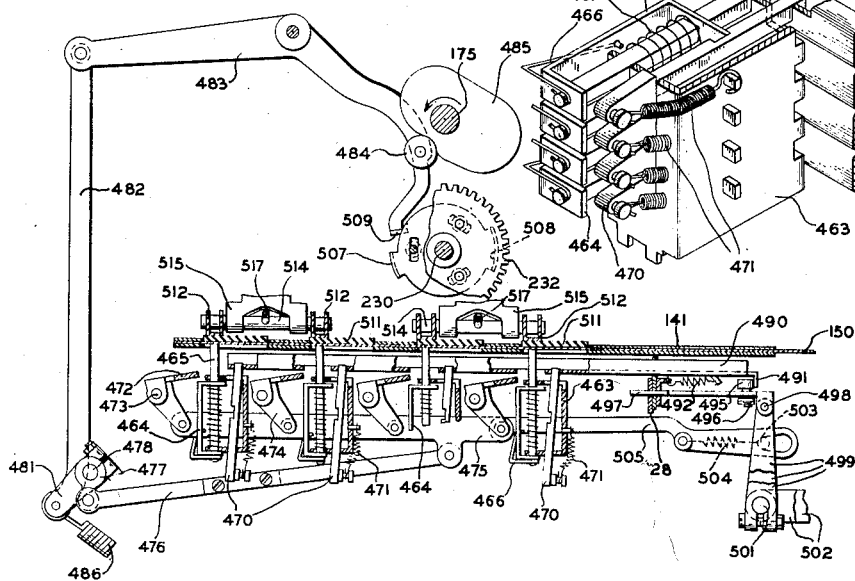
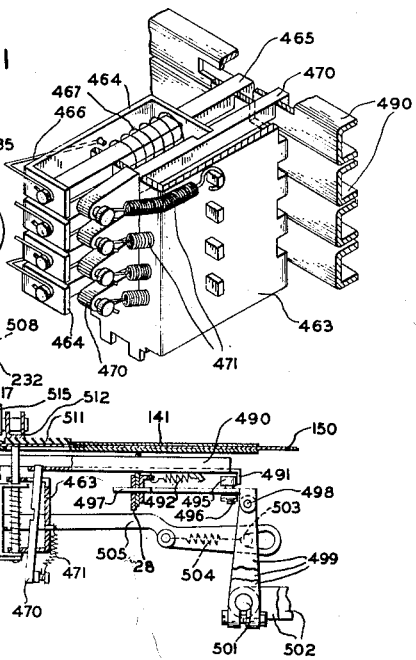
*INVENTORS*
LORING P. CROSMAN
HAROLD J. CHALL
BY
ATTORNEY Feb. 9, 1954  L. P. CROSMAN ET AL  2,668,494
ACCOUNTING MACHINE
Filed Feb. 20, 1950  30 Sheets-Sheet 23

*INVENTORS*
LORING P. CROSMAN
HAROLD J. CHALL
BY
ATTORNEY

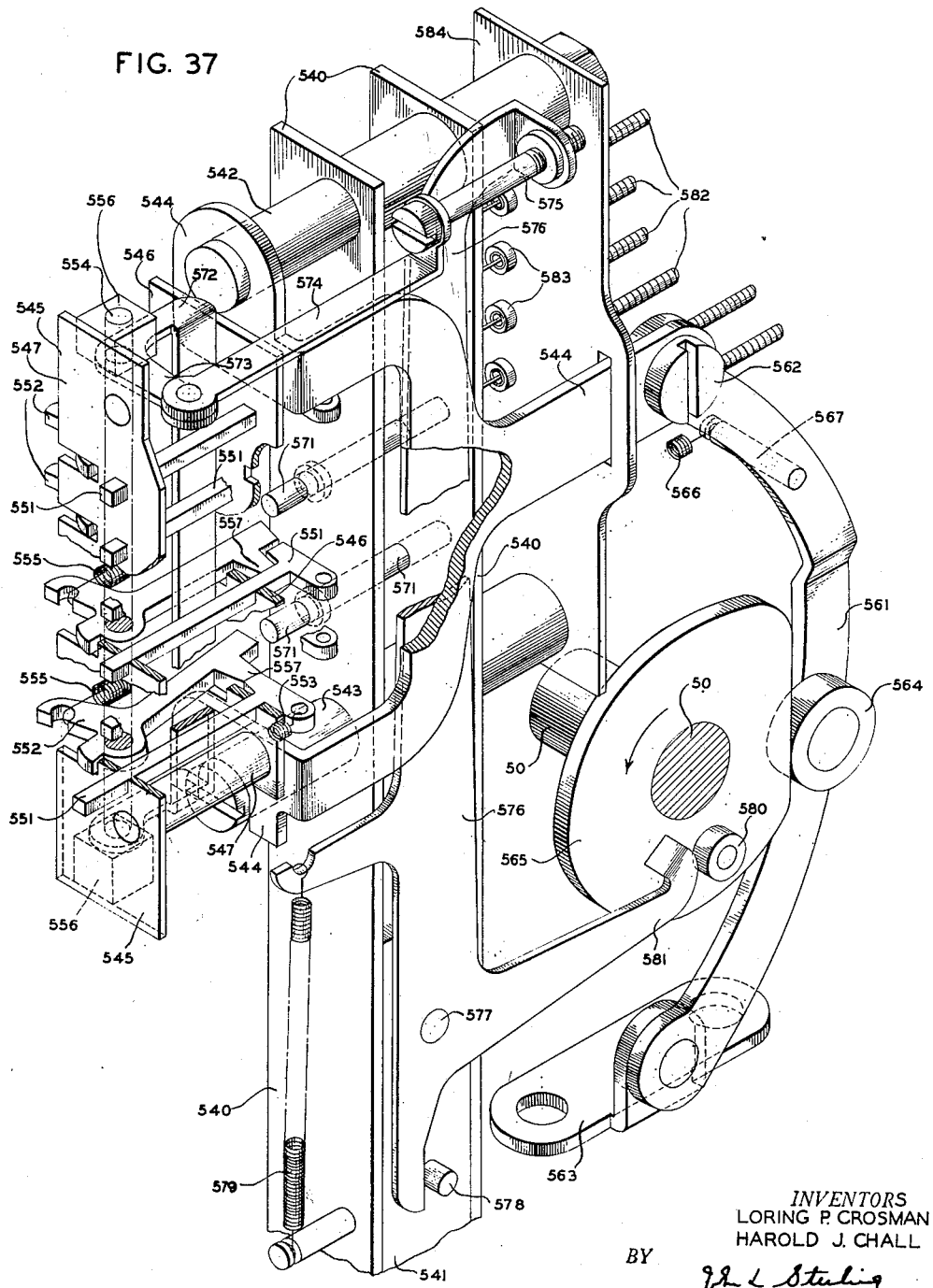

Feb. 9, 1954
L. P. CROSMAN ET AL
2,668,494
ACCOUNTING MACHINE
Filed Feb. 20, 1950
30 Sheets-Sheet 25
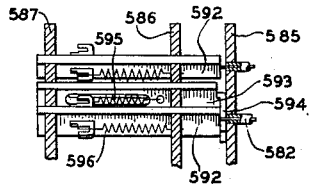
FIG. 40
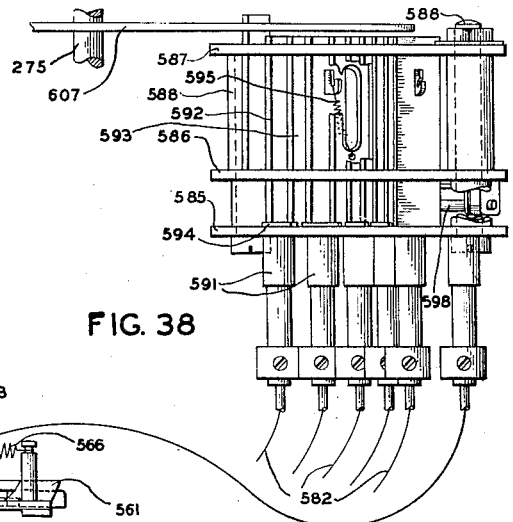
FIG. 38
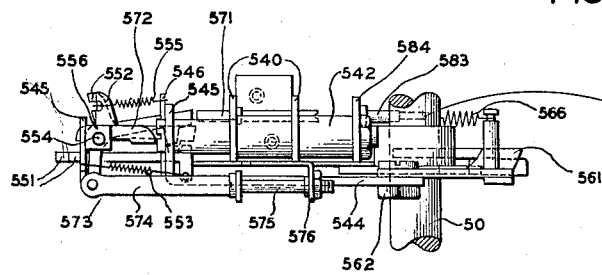
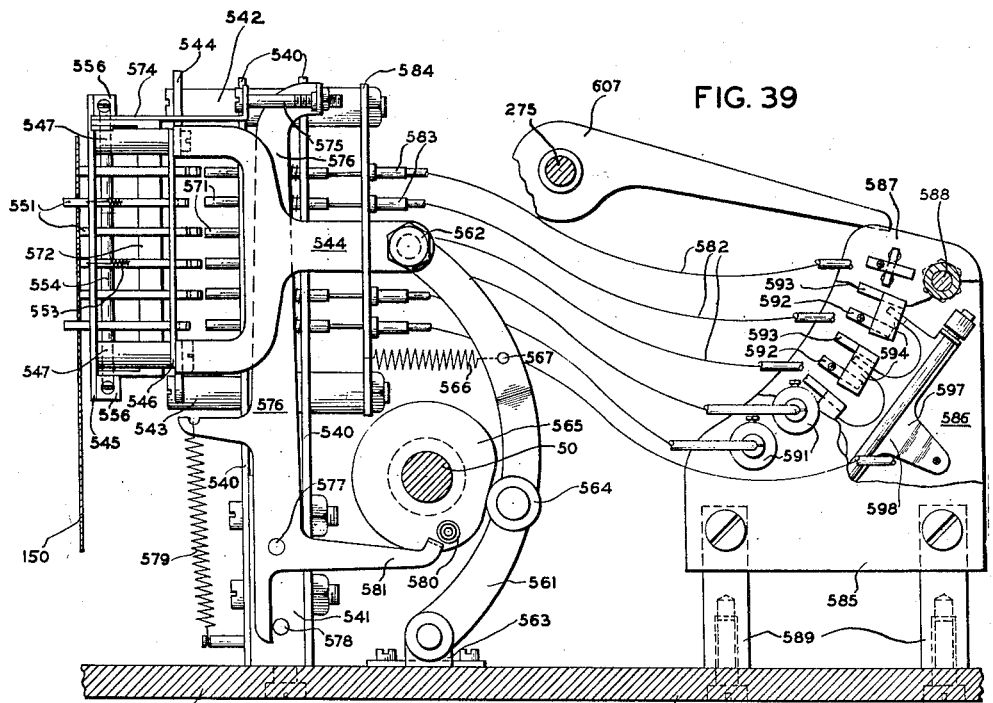
FIG. 39
INVENTORS
LORING P. CROSMAN
HAROLD J. CHALL
BY
ATTORNEY

INVENTORS
LORING P. CROSMAN
HAROLD J. CHALL
BY
ATTORNEY

Feb. 9, 1954 L. P. CROSMAN ET AL 2,668,494
ACCOUNTING MACHINE
Filed Feb. 20, 1950 30 Sheets-Sheet 27
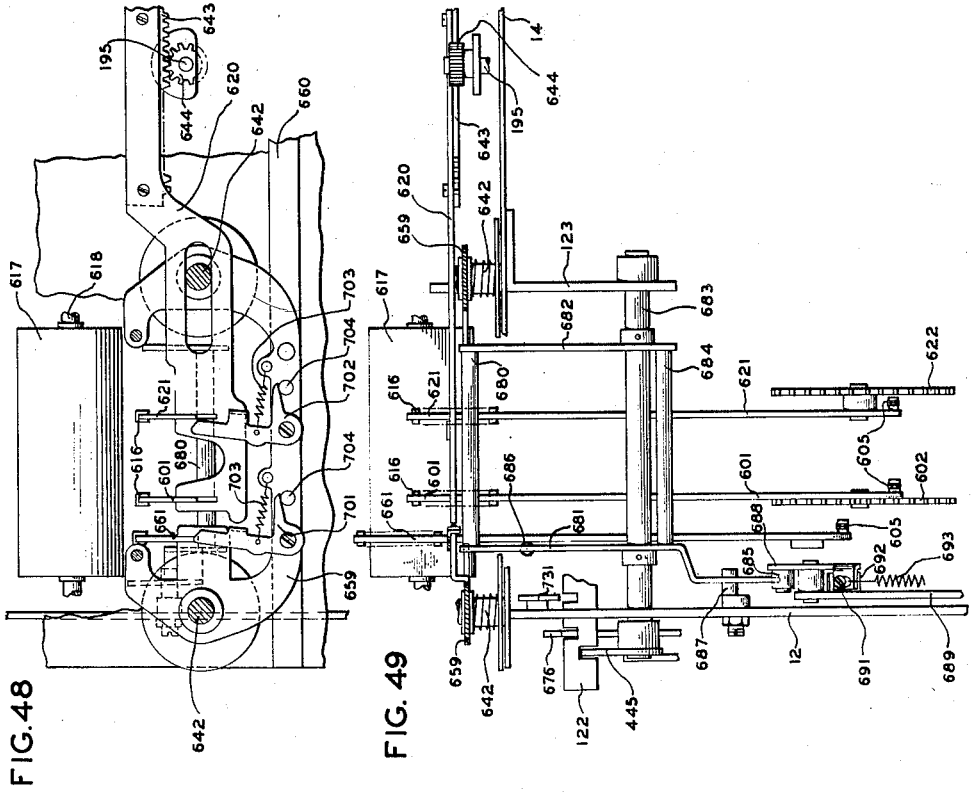
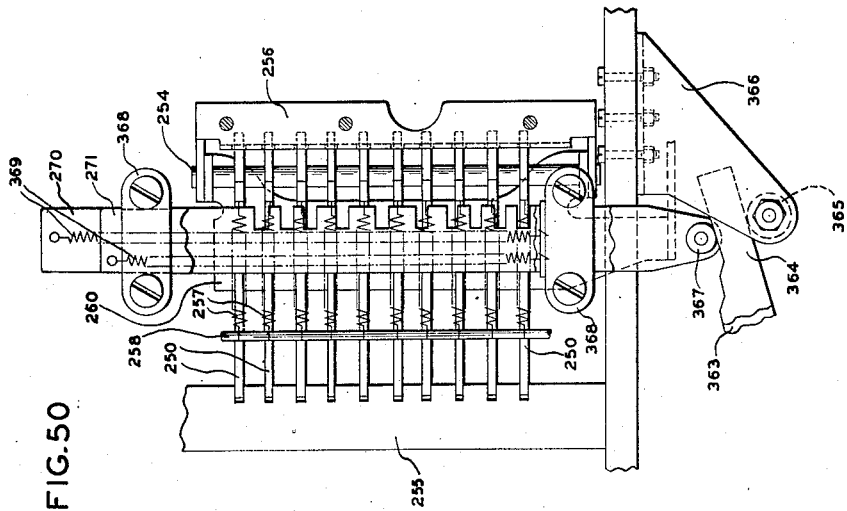
INVENTORS
LORING P. CROSMAN
HAROLD J. CHALL
BY
ATTORNEY Feb. 9, 1954
L. P. CROSMAN ET AL
2,668,494
ACCOUNTING MACHINE
Filed Feb. 20, 1950
30 Sheets-Sheet 28
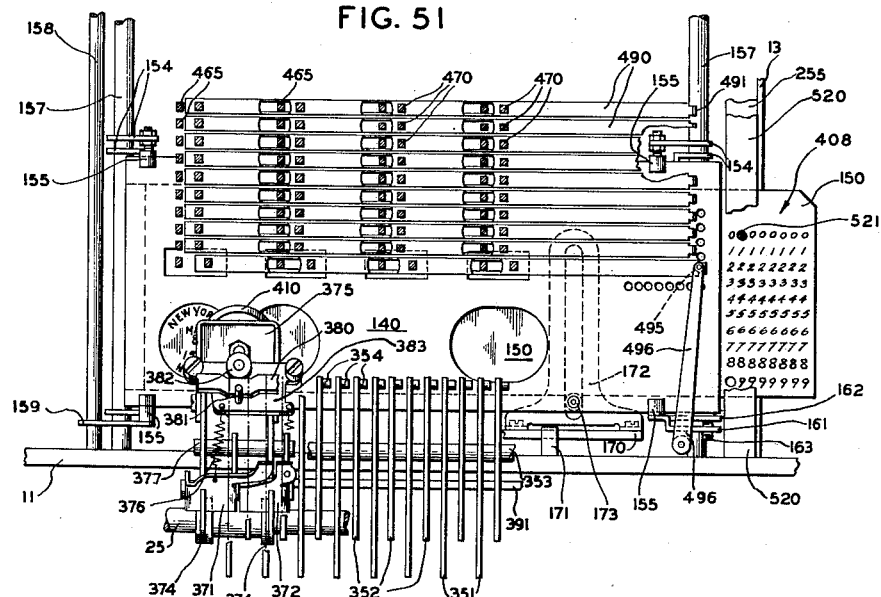
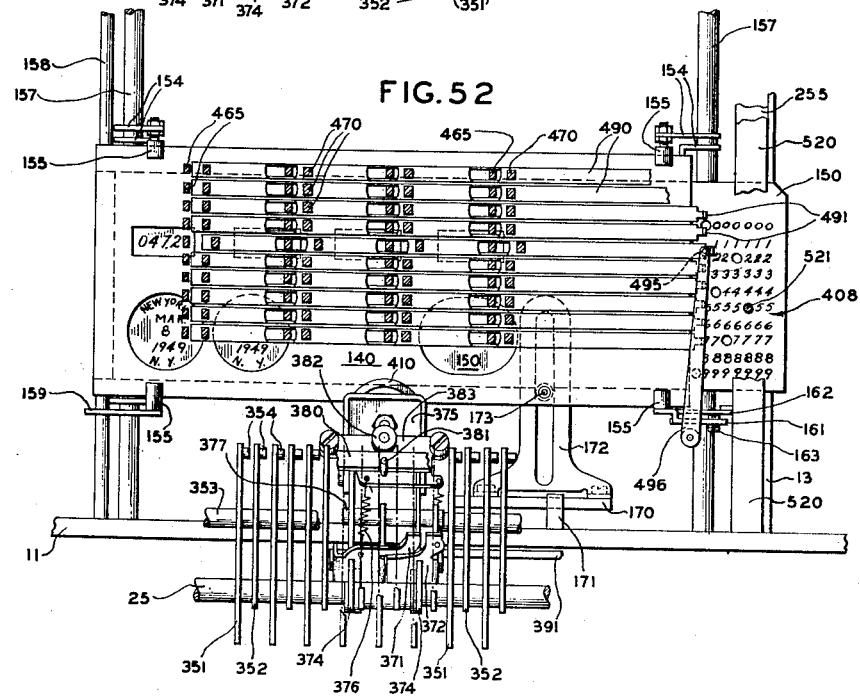
INVENTORS
LORING P. CROSMAN
HAROLD J. CHALL
BY
ATTORNEY Feb. 9, 1954 L. P. CROSMAN ET AL 2,668,494
ACCOUNTING MACHINE
Filed Feb. 20, 1950 30 Sheets-Sheet 29

INVENTORS
LORING P. CROSMAN
HAROLD J. CHALL
BY
ATTORNEY

INVENTORS
LORING P. CROSMAN
HAROLD J. CHALL
BY
ATTORNEY

Patented Feb. 9, 1954

2,668,494

UNITED STATES PATENT OFFICE 2,668,494

ACCOUNTING MACHINE

Loring P. Crosman, Darien, Conn., and Harold J. Chall, San Leandro, Calif., assignors to Remington Rand Inc., New York, N. Y., a corporation of Delaware Application February 20, 1950, Serial No. 145,204

27 Claims. (Cl. 101—93)

This invention relates to punched card accounting machines, and more particularly to the means employed for enabling a machine to enter manually pre-settable data in both perforated and printed form on a record card concurrently with the sensing of other data pre-punched in said record card, and to separately list and accumulate said pre-settable data in conjunction with the listing of said sensed data so as to tabulate and account for the entry of said pre-settable data.

The embodiment of the invention herein disclosed is in a machine adapted for use in issuing and accounting for the issue of postal money orders wherein it is desired that certain descriptive and identifying data be entered in the money order in both printed and punched form and that a tabulation be made of the data so entered.

The type of postal money order for use with which the present machine is designed is in the form of a record card having assigned thereto an individual serial number and including a plurality of detachable coupon stubs, one to be detached and retained by the issuing office, one for the remitter of the order, and one to be detached by the paying office. The order itself is designed to provide space for containing the name and address of the payee and of the remitter and also to provide a record card punch field into which the serial number of the order is pre-punched. The order also contains a separate punch card field into which data pertaining to the amount and date of issue of the order is punched by the machine.

The machine incorporating the present invention is provided with a keyboard arranged columnarly in which the data to be entered on individual money orders may be set up. In the present embodiment of the invention said data would represent the date of issue, the face value, and the fee charged for the issuance of the order. The record card, i. e., money order to be issued, is retained throughout the issuing operation of the machine in a travelling card chamber adapted for both longitudinal and transverse movement, which chamber both spaces the record laterally and, under control of the keyboard, differentially positions the card vertically relative to card printing and punching mechanism. The card printing mechanism is disposed so as to print set-up keyboard data in each of four locations simultaneously, i. e., on the face of the order and upon each of the three detachable coupon stubs. The punch mechanism is disposed so as to perforate a punch field of the order, in a pattern representing the set-up keyboard data. The machine also includes additional printing means for listing data on a paper tape, said additional printing means including a printing member actuated under control of the keyboard for printing the data set up in the keyboard and another printing member actuated under control of record sensing means for listing the data sensed in the pre-punched area of the record card. Accumulator means are also provided for accumulating numeric data which is printed and punched into the record under control of the keyboard, and further, a counter is provided for registering the number of orders processed through the machine.

In view of the fact that the invention relates to machines adapted for the issuance of records which in themselves constitute evidence of indebtedness on the part of the issuer, certain safeguarding features are provided in the machine to render it tamper proof and also to render the operation thereof fool proof. One of said features resides in the novel arrangement and interrelation between the several record printing mechanisms, record punching mechanism, the tape printing mechanism, and the accumulator mechanism. All of said several mechanisms accomplish their separate functions in cooperation with one individual set of differential stops and are actuated therefrom with positive action connecting linkage so that any discrepancy of the amounts of data separately entered by said mechanisms is positively precluded. Other safeguarding features reside in locking mechanisms effective for identifying the operator and preventing operation of the machine by unauthorized persons. As will become apparent from the following more complete description of the machine, the entire processing or issuance of an individual postal order is effected within eight successive machine cycles. For this reason other safeguards are provided to prevent manipulation of the keyboard after the starting and before the completion of the said eight cycles. Likewise, means are provided to prevent removal of a record from the machine until a complete processing operation has been effected. A mechanism is also provided to insure that the record is properly positioned in the card chamber before the machine will operate and also that only one record is processed within one issuing operation.

An object of this invention is to provide an improved machine operable for entering data on a record and accounting for the data so entered.

Another object of this invetnion is to provide an improved mechanism for enabling a printed tabulation comprised of data sensed from a record together with data concurrently entered in the record.

Another object of this invention is to provide an improved positive action differential mechanism for enabling concurrent operation of a plurality of printing mechanisms, punching mechanism, and accumulating mechanism under control of a keyboard.

Another object of this invention is to provide an improved mechanism for both spacing and differentially setting a record relative to a print and/or punch mechanism so as to enable line printing and/or punching of said record by a single print and/or punch mechanism.

Another object of this invention is to provide a mechanism for both spacing and differentially setting print members relative to a print platen so as to enable line printing by a single one of said print members.

Another object of this invention is to provide an improved machine start stop mechanism interrelated with a record retaining member so as to render the starting and stopping of the machine interdependent with the insertion and removal of a record from the machine.

A further object of this invention is to provide an improved carriage spacing mechanism.

A still further object of this invention is to provide an improved record sensing device for enabling normal machine operation only when a record is properly positioned therein.

Other objects and features of the invention, together with the advantages resulting therefrom, will become apparent from the following specification when read in conjunction with the drawing, wherein Fig. 1 is an outside perspective view of the machine from the left hand side with the main covers in place.

Fig. 7 is a side elevation from the right hand side with the main covers removed.

Fig. 8 is a section taken along the line 8—8 of Figs. 2, 3, and 4 illustrating the main drive clutch and associate gearing at zero degrees of the cycle.

Fig. 9 is a section taken along the same line as Fig. 8 illustrating the same mechanism at 180° of the cycle.

Fig. 12 is a sectional view from the right hand side taken along line 12—12 of Fig. 17.

Fig. 13 is a sectional view from the right hand side taken along line 13—13 of Fig. 17.

Fig. 14 is a sectional plan view of the machine taken along line 14—14 of Figs. 2 and 4.

Fig. 15 is a sectional plan view taken along line 15—15 of Figs. 2 and 4.

Fig. 17 is a front sectional view of the machine taken along line 17—17 of Figs. 3 and 7.

Fig. 18 is a plan detail view of start-stop mechanism with the parts in idle position.

Fig. 19 is a front detail view of part of the mechanism shown in Fig. 18.

Fig. 20 is a plan detail view of the same mechanism shown in Fig. 18, but in a machine running position.

Fig. 21 is a front detail view of part of the mechanism shown in Fig. 20.

Fig. 23 is an isometric view showing mechanism for differentially positioning the card chamber.

Figs. 24 through 27 are operational detail views in plan of the spacing actuating mechanism with Fig. 24 illustrating the parts at about 180° of the seventh cycle of the issuing operation, Fig. 25 showing same parts at about 170° of the eighth cycle, Fig. 26 illustrating the parts at 360° of the eighth cycle, and Fig. 27 illustrating the parts at about 180° of the first cycle of a subsequent issuing operation.

Figs. 28 and 29 are operational views in plan of the record printing mechanism, Fig. 28 illustrating the mechanism at about 106° of the cycle, and Fig. 29 illustrating the same parts at 224° of the cycle, both of said views being taken in the second cycle of an issuing operation.

Fig. 30 is a plan view of a portion of Fig. 28 taken in its first cycle position.

Fig. 31 is an isometric view of a bank of typing elements in retracted position.

Figure 32:
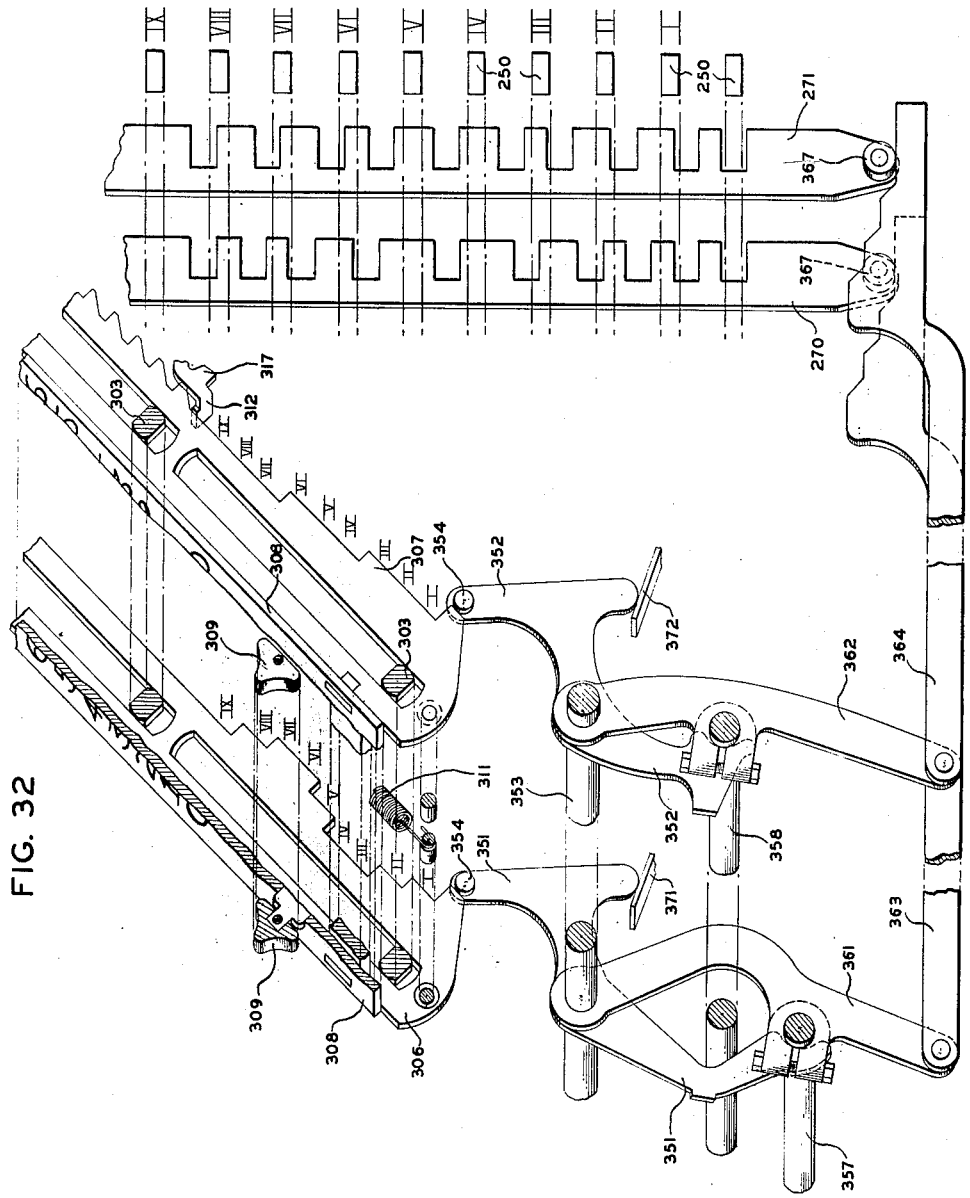

Fig. 32 is an exploded schematic view illustrating the keyboard control of the differential stops.

Figure 33:
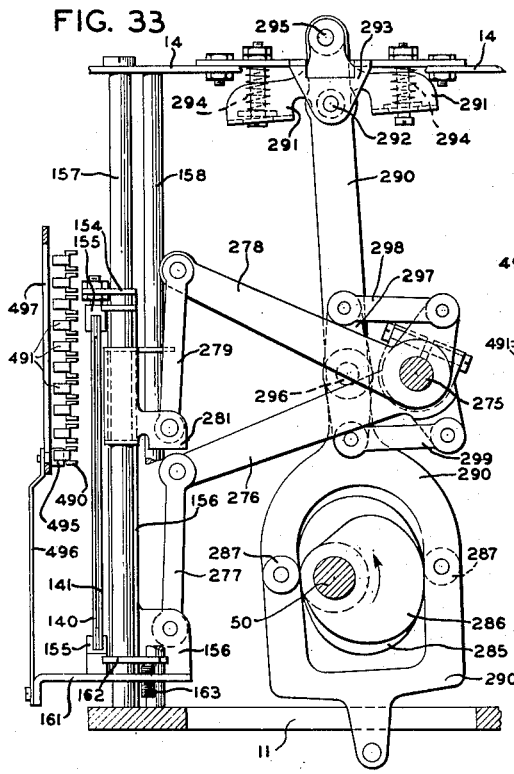
Figure 34:
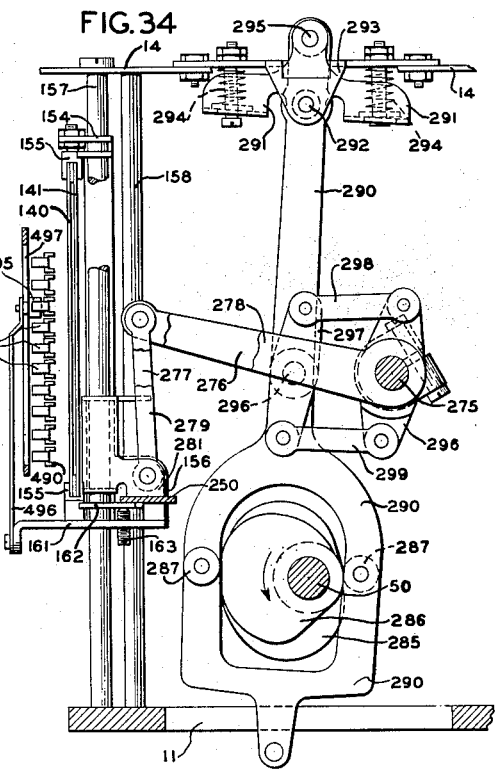

Figs. 33 and 34 are operational views in side elevation illustrating the differential actuating mechanism, Fig. 33 showing the parts in a fully restored position, Fig. 34 showing the parts in a differentially set position.

Figure 35:
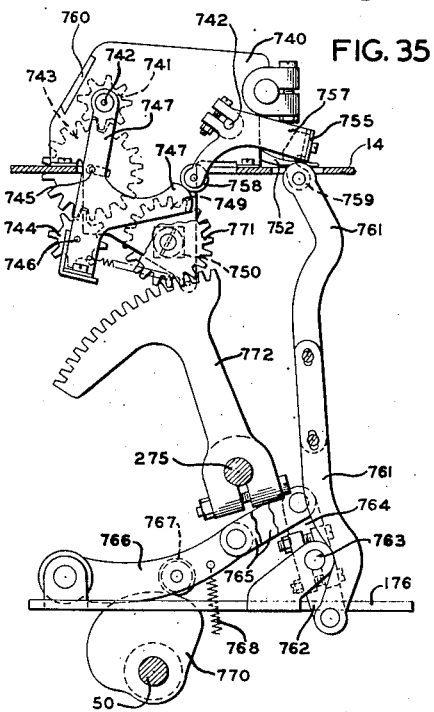

Fig. 35 is a detail view in side elevation of the accumulator actuating mechanism.

Figure 36:
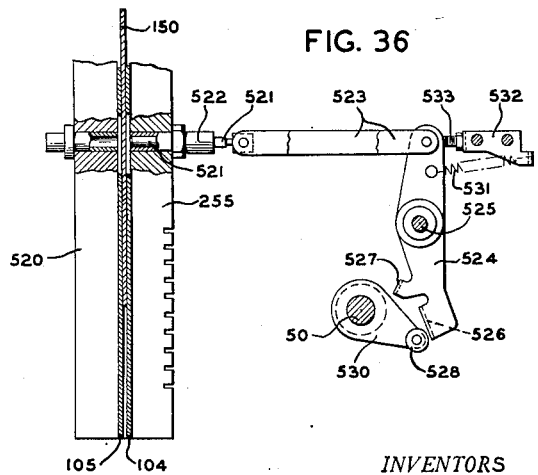

Fig. 36 is a detail view in side elevation in the card punch mechanism.

Fig. 37 is an isometric view of the card sensing unit.

Fig. 38 is a plan view of the sensing unit and related mechanism.

Fig. 39 is a side elevation of the mechanism shown in Fig. 38.

Fig. 40 is a detail view in section of a portion of the stop basket shown in Figs. 38 and 39.

Figure 41:
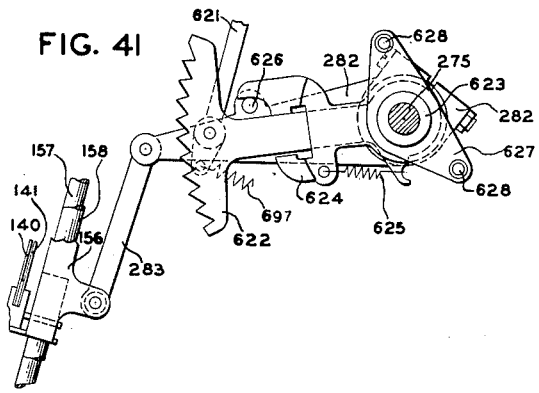

Fig. 41 is a detail view in side elevation of the keyboard controlled type bar setting mechanism.

Figure 42:
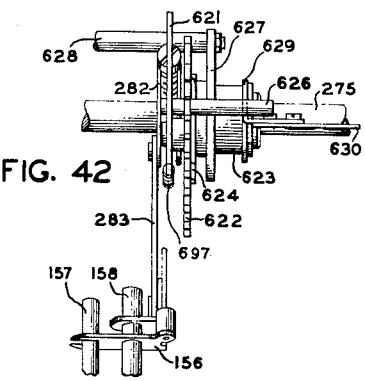

Fig. 42 is a front view of the mechanism shown in Fig. 41.

Figure 43:
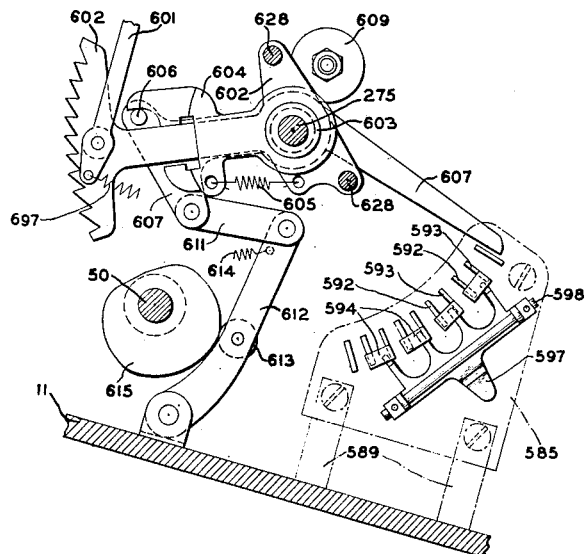

Fig. 43 is a detail view in side elevation of the sensing unit controlled type bar setting mechanism.

Figure 44:
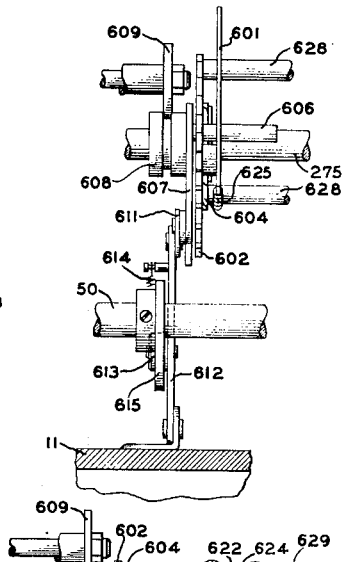

Fig. 44 is a front view of the mechanism shown in Fig. 43.

Figure 45:
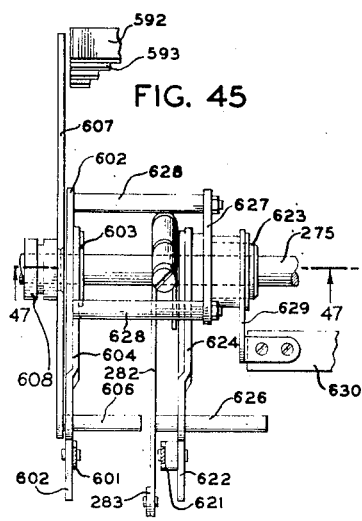
Figure 46:
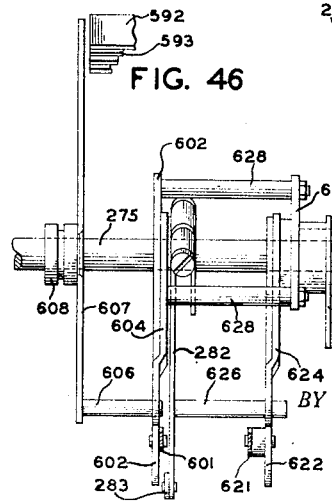

Figs. 45, 46 are operational views in plan of the combined mechanism shown in Figs. 41 and 43, Fig. 45 showing the parts in their first cycle position, and Fig. 46 showing the parts in their eighth cycle position.

Figure 47:
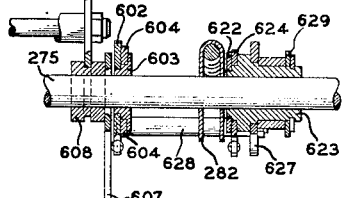

Fig. 47 is a sectional view in plan taken along line 47—47 of Fig. 45.

Fig. 48 is a detail view in plan of the tape print mechanism in its first cycle position.

Fig. 49 is a front elevation of the mechanism shown in Fig. 48.

Fig. 50 is a detail view in side elevation showing the means for mounting the differential stops.

Figs. 51 and 52 are operational views in front elevation illustrating the combined spacing and differential movements of the card chamber, Fig. 51 illustrating the parts as set in their "zero" differential position at about 224° of the second cycle, Fig. 52 showing the same parts set in their "five" differential position at about 224° of the sixth cycle.

Figs. 53 and 54 illustrate the form of record card as adapted for use in the machine, Fig. 53 illustrating the card in blank, Fig. 54 illustrating the card upon completion of the issuing operation.

Figure 55:
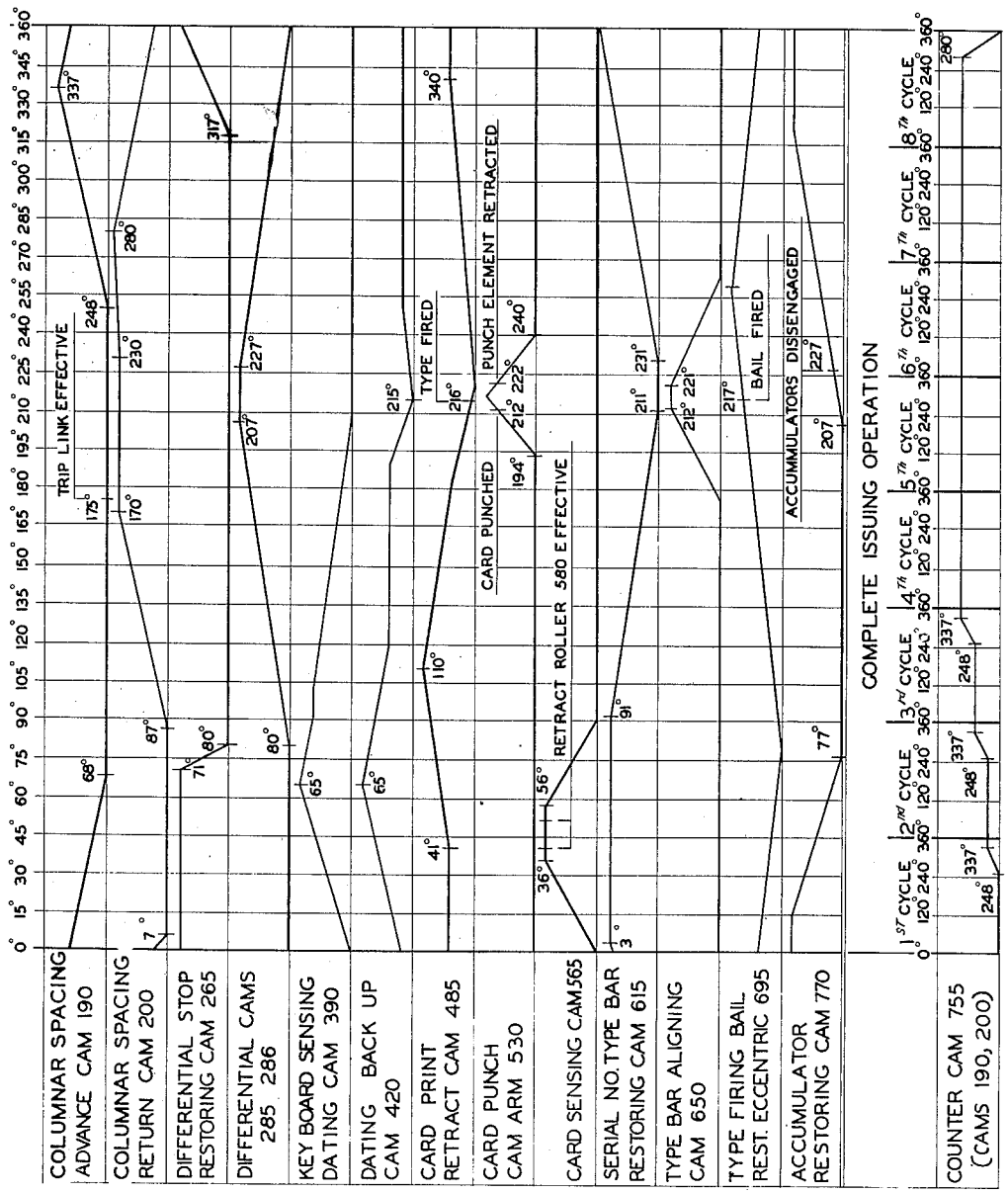

Fig. 55 is a timing diagram of the machine.

It should be understood that all views, unless otherwise indicated, show the respective mechanisms in machine stopped position, i. e., at 360° of the last (eighth) cycle of an issuing operation, and that all references herein to timing are approximate.

MAIN FRAMEWORK

(Figs. 1-7)

Figure 1:
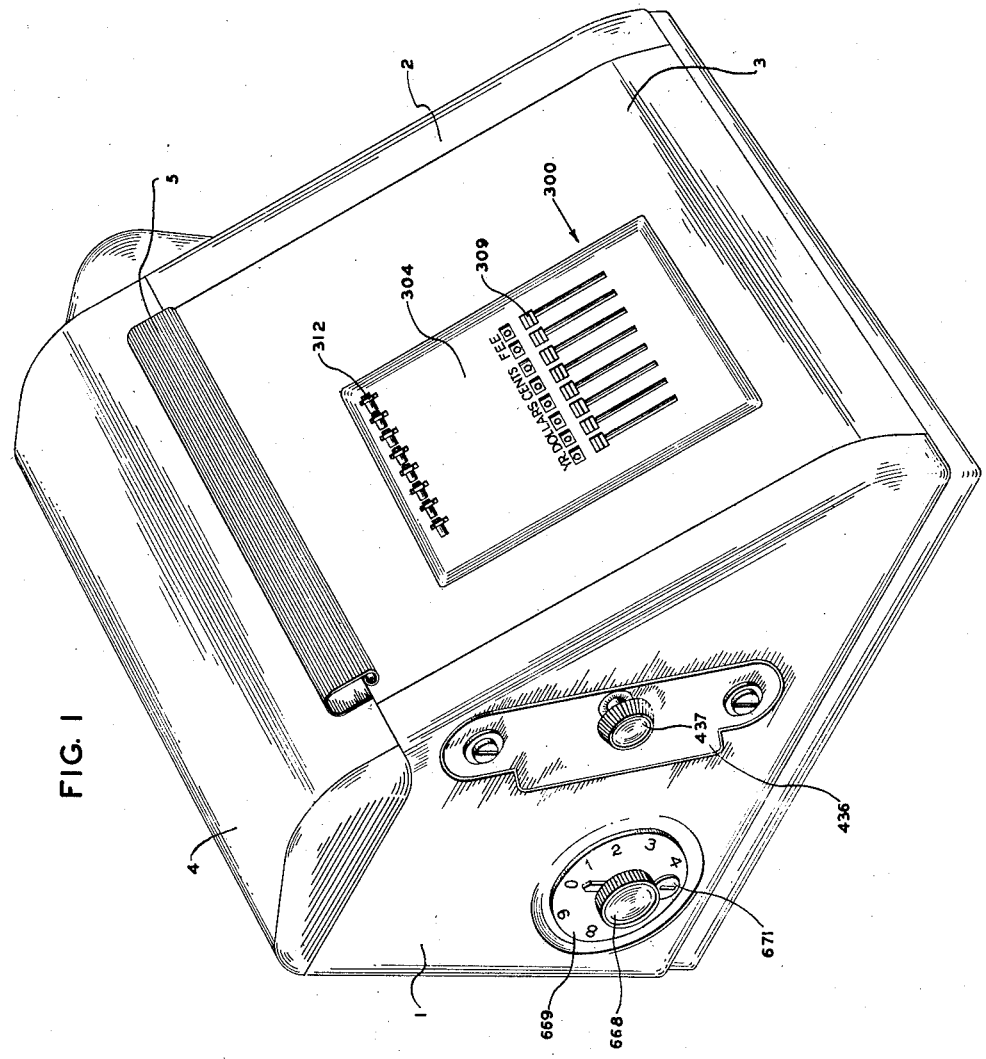

As can be seen in Fig. 1, the machine is suitably enclosed within a plurality of interlocked covers 1, 2, 3 and 4, the left hand side cover 1 and front cover 3 being cut out to accommodate a setting knob 668, a door 436, and a separate keyboard cover 304, which parts will be hereinafter more fully described. The top cover 5 is suitably hinged to the rear framework of the machine and is formed with a bent over flange 6 providing a manual grip whereby the cover may be raised to expose certain printing and visibly readable accumulating mechanism of the machine. All other views of the machine are shown with the main covers 1, 2, 3 and 4 completely removed.

Figure 4:
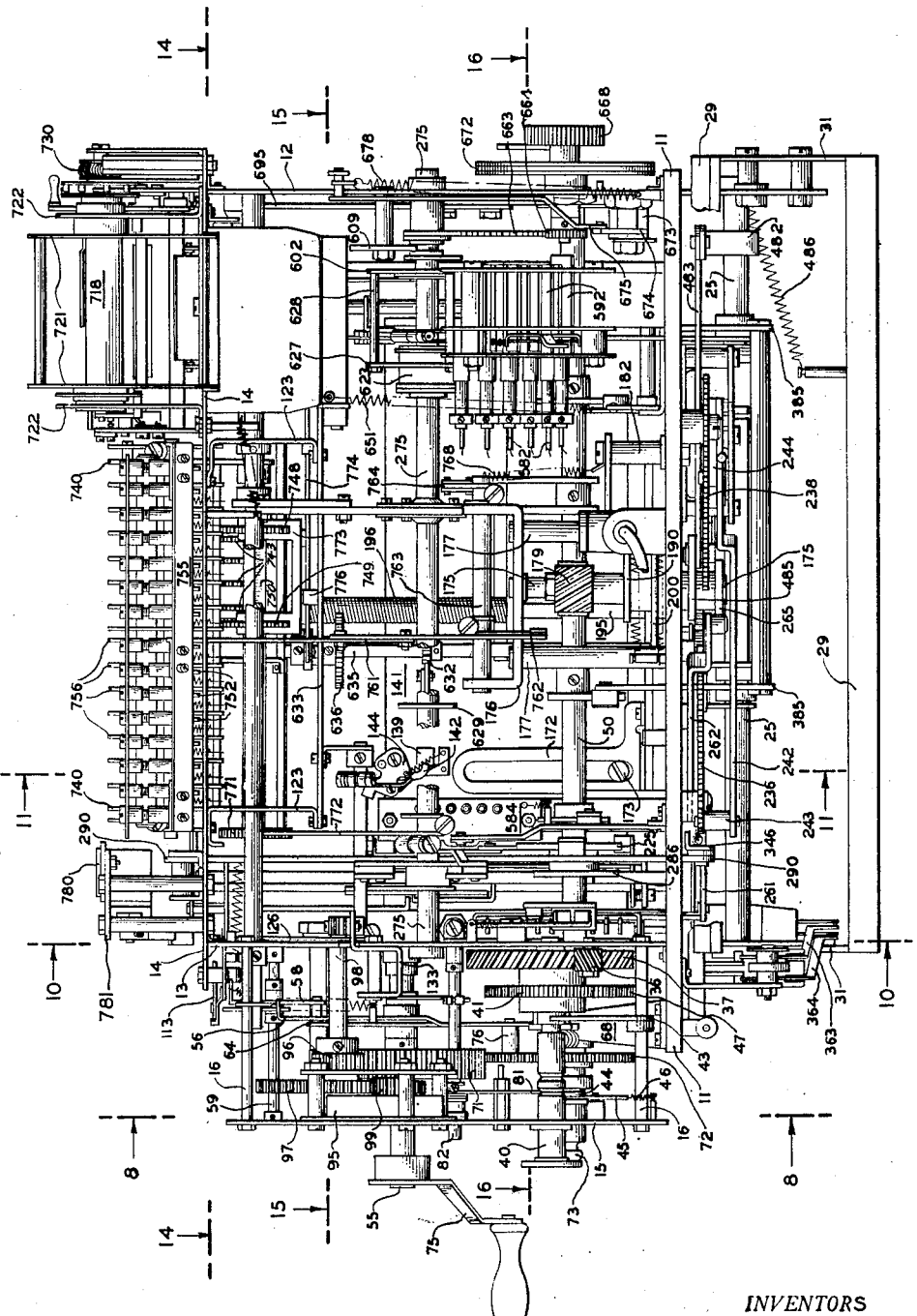
Fig. 4 is a rear elevation of the machine with the covers removed.
Figure 5:
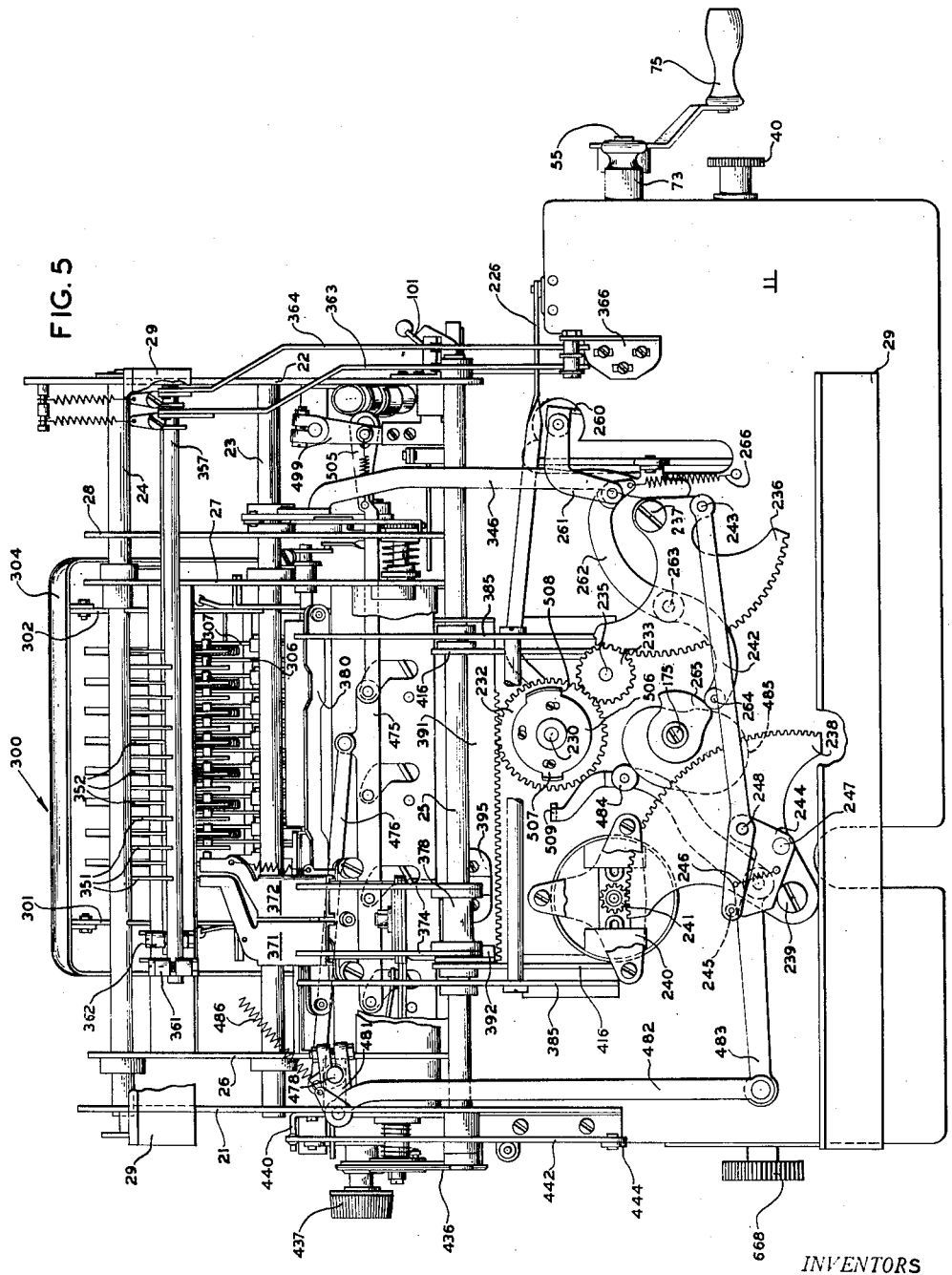
Fig. 5 is a bottom view of the machine.
Figure 6:
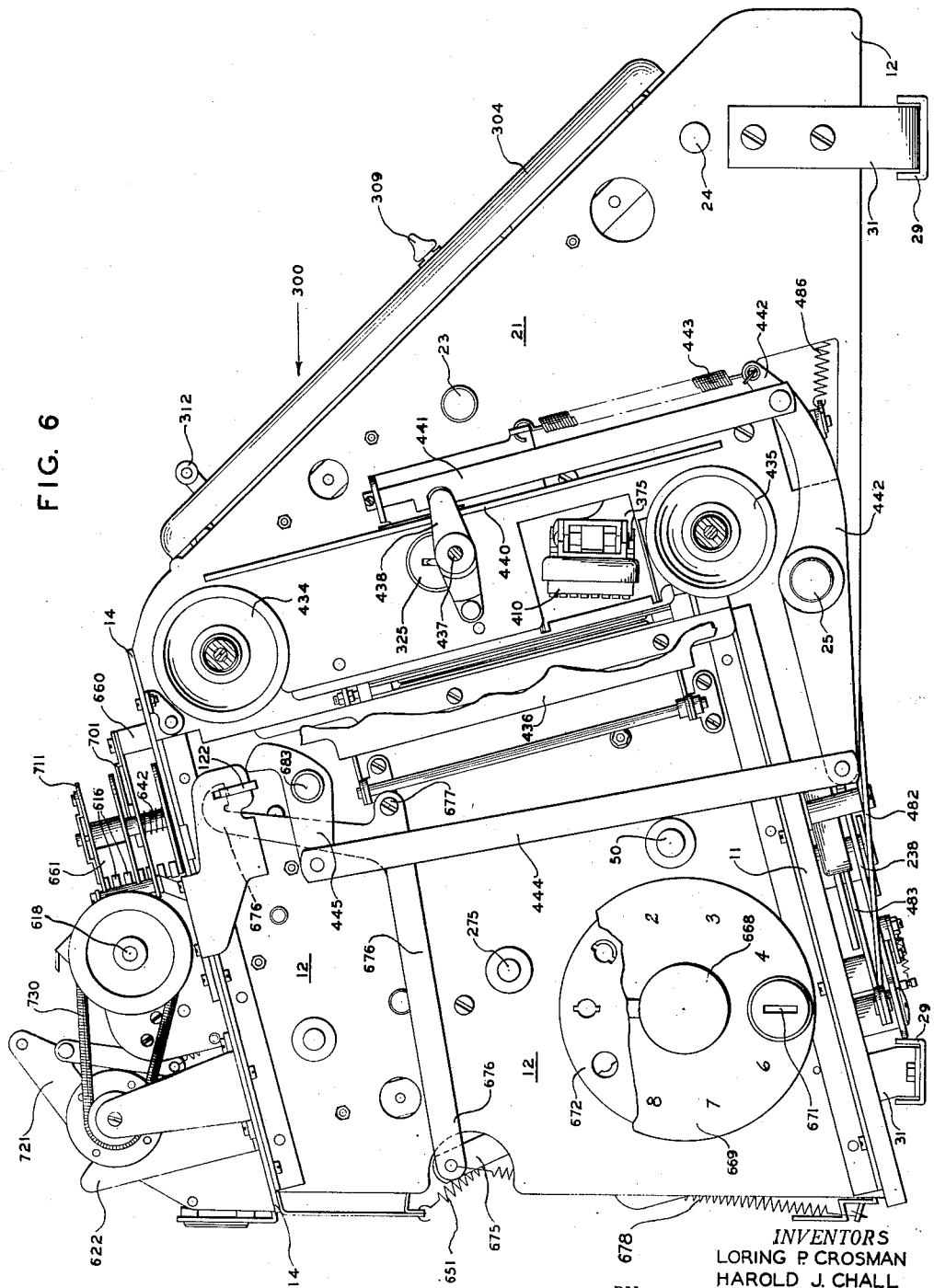
Fig. 6 is a side elevation from the left hand side with the main covers removed.

The framework of the machine includes a main base frame plate 11, which, as can be seen in Figs. 4, 5, 6, and 7, supports the rearmost portion of the machine and which, in the normal position of the machine, is disposed to incline forwardly as can be best seen in Figs. 6 and 7. It will be understood that Fig. 4 is a rear view taken with the rear of the machine partially elevated so as to be viewed in a plane parallel with that of the plate 11 in order to disclose the working parts of the mechanism with greater clarity.

Firmly secured to the main base plate 11 is a pair of vertical side frame plates 12 and 13, respectively, the upper extremities of which are joined by and serve to support the top frame plate 14. It will be seen that the frame plates 11, 12, 13, and 14, form an open box-like structure within which is supported and contained the main driving shafts and operating mechanisms of the machine.

Figure 2:
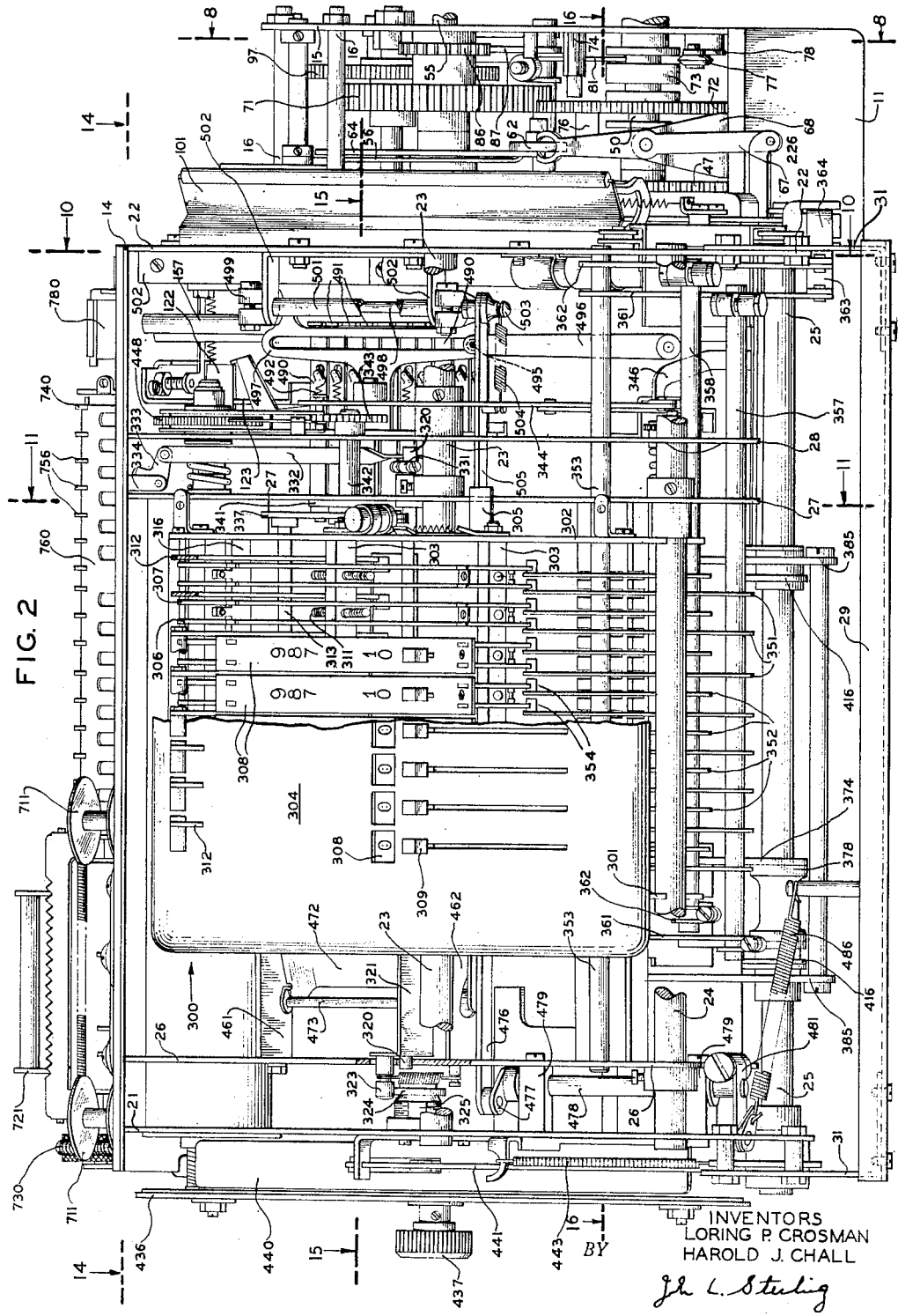
Fig. 2 is a front elevation of the machine with the main covers removed.
Figure 3:
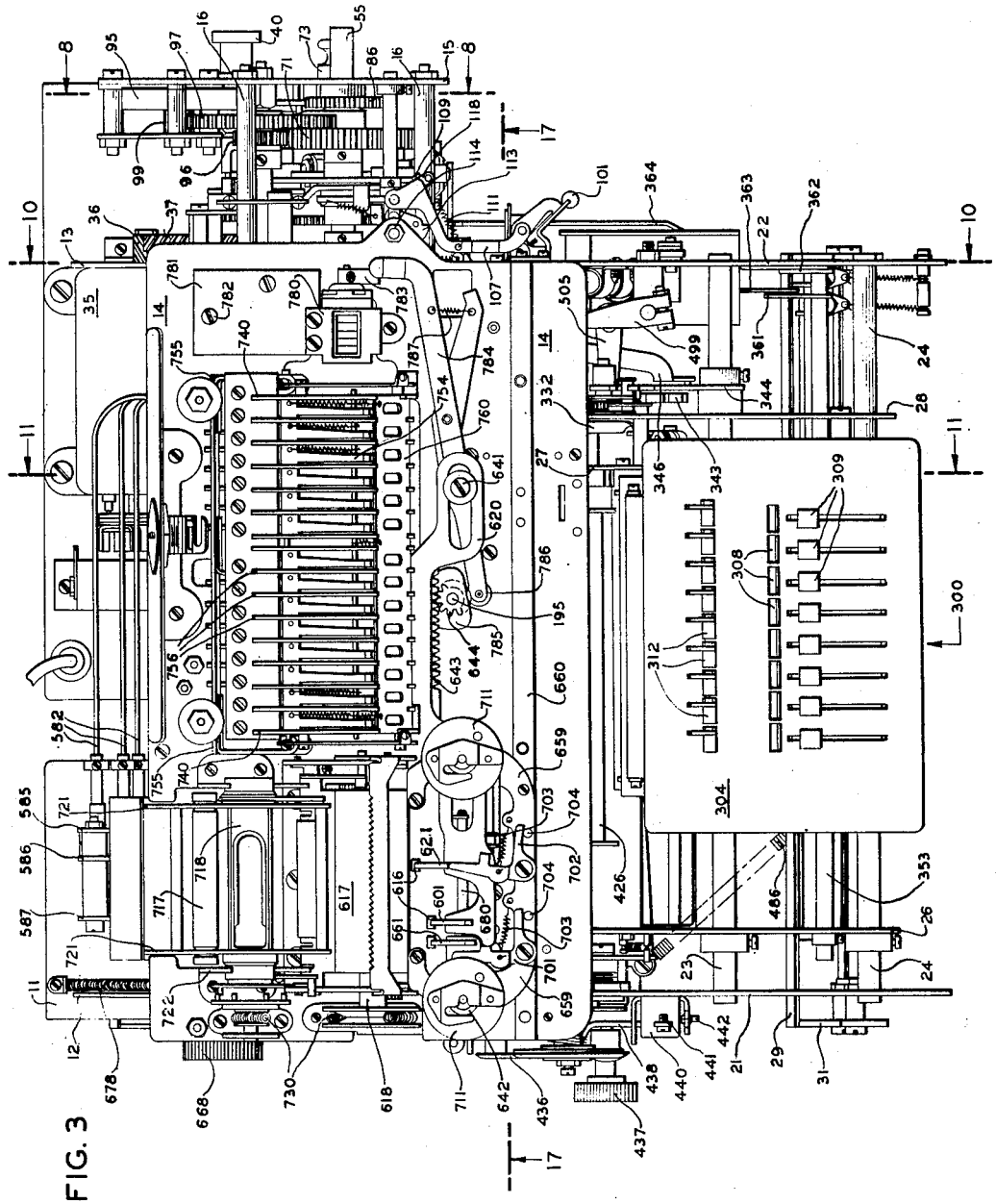
Fig. 3 is a plan view of the machine with the main covers removed.

Disposed outwardly from the rear side frame plate 13 is an auxiliary frame plate 15, as can also be seen in Figs. 2 and 3, which auxiliary frame is suitably supported from the plate 13 by tie rods 16 and which auxiliary frame plate helps to support the main drive gear mechanism of the machine.

The forwardmost portion of the machine is contained between two side frame plates 21, 22 of substantially triangular shape and constituting forward extensions of the rear frame plates 12 and 13, respectively. The front side frames 22, 23 are suitably joined to their respective rear side frames 12, 13, and also to the base frame plate 11 and are further braced by a pair of tie rods 23, 24, and by a guide rod 25 (see Fig. 2). Also supported by the tie rods 23, 24 is a plurality of intermediately spaced partition plates 26, 27, and 28, the two plates 26, 27 supporting the record card printing and keyboard mechanism of the machine and the plate 28 supporting the ribbon feed and related mechanism, said mechanism being hereinafter more fully described.

The main framework of the machine is supported by a pair of transversely extending channel shaped bars 29 said bars being secured to the frame by bent legs 31, the forwardmost legs being joined to the side frames 21, 22, respectively, the rearmost legs 31 being secured to the base plate 11.

While the above described parts comprise the main framework of the machine it should be understood that the framework also includes other frame structure relating more specifically to individual units of the machine, which other structure will be referred to hereinafter more specifically in connection with the description of said individual units.

ALTERNATE DRIVE MECHANISM

(Figs. 2, 4, 7, 8, 9, 15, 17)

The machine is adapted to be driven either electrically or manually with means being provided to lock out one form of drive when the other is in operation. For electric drive operation, a motor 35 (Fig. 15) is provided and secured to the rear right hand portion of the frame plate 11, the armature shaft of said motor extending through the side frame plate 13 and carrying a helical gear 36 meshing with idler gear 37. The idler gear (Figs. 4, 7, 8, 9) is loosely mounted on a stud shaft 38 one end of which is mounted in the frame plate 13, the other end of which supports a rotatable sleeve 40 extending through the auxiliary frame plate 15. Also loosely mounted on the stud shaft 38 is a pinion 41, the hub of which carries a pair of shiftable coupling pins 42 adapted to cooperate with holes formed in the hub of idler gear 37. The heads of the coupler pins engage with an annular groove formed in the sleeve 40 which when shifted on the shaft 38 will act to engage or disengage the pinion 41 with or from the idler 37. The free end of the sleeve is in the form of a knurled knob, as a convenience for the operator, and provides means for turning over the drive mechanism in the event of a power failure occurring during the course of a motor driven machine operation. It should be understood, however, that a manual operation of the machine through the sleeve 40 is a safety feature, in addition to the alternate manually operative drive mechanism hereinafter to be described and is provided since said alternate manual drive mechanism, for safety reasons, is positively locked out from the start to finish of an electrical motor drive operation, and thereby would be unavailable in the event of a power failure occurring during the course of such a motor drive operation.

In Fig. 4, the sleeve 40 is shown in the normal motor driving position with the idler gear 37 coupled integral with the pinion 41. It will be seen that the manual withdrawal of the sleeve 40 outwardly will act to uncouple said gears enabling the pinion to be manually rotated by the sleeve 40 free from the idler 37 and the motor 35.

As can be seen also in Fig. 7, a retaining fork 43, supported by one of the tie rods 16, is provided to hold the pinion 41 in proper spaced position on the shaft 38. A detent is also provided for the sleeve 40 to hold it in either of its two effective positions, said detent comprising a roller 44, a lever 45 and a spring 46, the lever being suitably pivoted to the auxiliary frame 15 with the roller yieldably seating in grooves formed in the sleeve 40.

The pinion 41, as best seen in Figs. 8 and 9, meshes with a gear 47, formed integral with a clutch disc 48, which gear and disc are loosely mounted on a rotatable shaft 50. The shaft 50 is the main drive shaft extending transversely across the machine and is suitably journaled in the side frame plates 12 and 13.

Cooperating with the clutch disc 48 is a clutch pawl 51 pivoted on a cam sector 52, which cam sector is firmly secured to the main drive shaft 50. The clutch pawl has a tooth adapted to engage between teeth of the clutch disc under tension of a spring 53, and when disengaged, as shown in Fig. 8, is in a clockwise rotated position bearing against a limit stud 54 formed on the cam sector 52. The clutch pawl 51 is rocked to ineffective position by a clutch trip lever 56 when the lower extremity of the lever is rocked clockwise into the path of rotation of a shoulder formed on the pawl. The clutch lever 56 is loosely mounted on a short shaft 55 journalled in the frame plates 13 and 15 and is retained in a drive disengaging position, against tension of a spring 57, by a latching bell-crank 58 loosely mounted on a supporting rod 59.

The latching bell-crank 58 is counter-clockwise tensioned by a spring 61 and is formed with a shoulder adapted to engage a bent over ear formed on the upper extremity of the trip lever 56 so as to retain the lever and pawl 51 in the drive disengaging position, as shown in Fig. 8, which figure illustrates the position of the parts at zero degrees of a machine cycle.

Starting of the machine, when set for a motor drive operation, is effected by manually actuated mechanism hereinafter to be described which acts to simultaneously energize motor 35 and to rock the latching bell-crank 58 clockwise. Energization of the motor causes rotation of the clutch disc 48, and the clockwise rocking of bell-crank 58 releases trip lever 56 to enable pawl 51 to engage the clutch disc 48 whereupon the cam sector 52 will be rotated and carry with it the main drive shaft 50.

Stopping of the machine is effected automatically, after a predetermined number of cycles, by action of the cam 52 operating through a roller 62 slidably mounted on a stud 63 formed on one arm of a three armed follower lever 64. The follower lever is loosely mounted on shaft 55 and is counter-clockwise tensioned by a spring 65 connected to the rearwardly extending arm of the lever. The upwardly extending arm of the lever is formed with stud 66 adapted to engage the forward end of the clutch trip lever 56.

As can be seen best from Fig. 8, near the end of a machine cycle the outer periphery of cam sector 52 will bear on the roller 62 causing the follower lever 64 and stud 66 to rock clockwise to engage and restore trip lever 56 to the position shown in latched relationship to the latching bell-crank 58, whereupon the clutch pawl will be rocked out of engagement with the disc 48 and rotation of the main drive shaft 50 blocked in the position shown. As the main drive shaft reaches stopping position, i. e., 360°, the roller rides into the lower dwell of the cam sector 62 releasing the follower lever 64 to a limit position against one of the tie rods 16. It should be understood, however, that the stopping mechanism is not effected each machine cycle, but rather only in the last cycle of a processing operation.

As can be seen also in Fig. 17, a shift lever 67, bifurcated at one end to cooperate with the roller 62, is pivoted on a frame bracket 68 and is adapted to shift the roller to effective and ineffective relation with the cam sector 52. The means for rocking the shift lever will be described hereinafter, but for the present it may be stated that the roller 62 is shifted to ineffective position shortly after the beginning of the first cycle of a processing operation and is returned to effective machine stopping position during the last cycle of the operation, which last cycle, in accordance with the present embodiment of the invention, would be the eighth cycle of the machine's operation.

The mechanism for effecting a hand drive operation of the machine can best be seen in Figs. 7, 15 and 17, and includes a wide crank gear 71 which is fast on the shaft 55 and in constant mesh with a shiftable gear 72. That portion of shaft 55 extending outside of auxiliary frame plate 15 is adapted to receive a handle 75 by which the shaft may be manually rotated. The gear 72 is fast on a sleeve 73 which sleeve is slidably mounted on the main drive shaft 50 and extends outside of the frame plate 15 in the form of a knob so as to be accessible for manual adjustment to either of two positions. The position shown in Figs. 15 and 17 is the motor-drive position of the sleeve, its most outward position, whereby a locking stud 74 on the auxiliary frame 15 enters into a cooperating opening in the gear 72 so as to lock the gear and the hand drive mechanism in an ineffective position. The other position of the sleeve 73, that is, the effective hand drive position, is shown in Fig. 2. As will be seen, the manual sliding of the sleeve 73 inwardly on shaft 50 renders gear 72 free of the locking of stud 74 and at the same time causes a driving stud 76, formed on the inner face of the gear 72, to engage a cooperating hole formed in the clutch pawl 51 (see Fig. 8). Accordingly, when the machine is set for a hand drive operation, driving stud 76 acts to hold the clutch pawl out of engagement with the clutch disc 48 while transmitting rotary movement from the hand operated gear 72 to the cam sector 52 on the main drive shaft 50. It is, of course, understood that in a motor driven operation the driving stud 76 is free of clutch pawl 51.

Detent and locking mechanisms are provided for retaining the sleeve 73 in either of its two settable positions, which mechanisms cooperate with a pair of spaced annular grooves formed in the periphery of the sleeve. The detent mechanism, as can be best seen in Fig. 7, includes a roller 77, a lever 78, and a spring 79, the lever being pivoted to the auxiliary frame plate 15, and yieldably urging the roller into one or the other of the grooves in the sleeve 73. The locking mechanism includes a lock arm 81 fast on a rock shaft 82, which arm is suitably guided by a spacing collar 83 secured to the auxiliary frame plate 15. The shaft 82 extends between the frame plates 13 and 15 and is actuated by the clutch trip lever 56, as can be seen in Fig. 8, through a link 84 connecting a rearwardly extending arm of the trip lever with an arm 85 fast on the rock shaft 82. Thus it will be apparent that as trip lever 56 is rocked counter-clockwise to enable either a hand or motor drive operation of the machine, shaft 82 and lock arm 81 will be rocked clockwise so as to engage one or the other grooves in the sleeve 73, and thereby lock the machine in one or the other forms of drive as long as the machine continues to operate. Upon completion of a machine operation and the return of the trip lever 56 to a blocking position relative to the pawl 51 (the position shown in Fig. 8), the lock arm 81 will be rocked counter-clockwise and free of the sleeve 73 so as to enable resetting of the sleeve for a change in the type of drive for the machine if so desired.

Means are also provided for regulating direction and speed of the hand drive mechanism, which means includes a ratchet wheel 86 (best seen in Fig. 7), a reverse movement blocking pawl 87, and a spring 88, the blocking pawl being loosely mounted on rock shaft 82 and tensioned in a clockwise direction by the spring 88. A friction clamp 89 is adjustably fastened to the crank shaft 55 and engages a stud 91 formed on the pawl, the frictional binding of the clamp on the shaft being sufficient to overcome tension of spring 88 when the shaft is rotated clockwise so as to urge the pawl against a limit stud 92, in which position it is clear of the ratchet wheel 86. However, any attempt to rotate the shaft 55 counter-clockwise enables spring 88 to rock the pawl into engagement with the wheel so as to prevent a reverse turning of the hand drive mechanism.

The speed regulating mechanism for the hand drive includes a governor 95 secured to the auxiliary frame 15. The governor 95 is geared to the crank gear 71 by a pair of idler gears 96 and 97 which are formed integral with each other and suitably mounted on a supporting rod 98. The smaller idler 96 meshes with the crank gear 71 and the larger idler 97 meshes with a gear 99 on the shaft of the governor 95.

START-STOP MECHANISM (Figs. 4, 8, 9, 14, 15, 17, 18-21, 23, 53)

The means for rocking the latching bell-crank 58, so as to release clutch trip lever 56 from a blocking relation with the clutch pawl 51 and thereby enable starting of the machine, are actuated by the manual closing of a door 101 adapted to seal an aperture in the side frame 22 through which records are fed into and removed from the machine. As best seen in Figs. 8, 9, and 15, the edge of the frame plate 22 abutting the frame 13 is slightly cut away to define a narrow slot or aperture of sufficient width to accommodate passage of a record card and through which the cards are placed into the card chamber of the machine. As seen, card guide lips 104 and 105 are secured to the frames 13 and 22, respectively, for facilitating the passage of a card into the machine with the card guide lip 105 cooperating with an overlapping card guide 106 secured to the door 101. The guide 104 also serves as a limit for the door 101 when in the closed position shown in Fig. 9. The door is formed with a rounded outer edge of increased thickness so as to align with the card aperture and to block the removal of a card from the machine when the door is in closed position, and is provided with hinge arms 102 pivotally connected with hinged brackets 103 by which means the door is hung on the frame plate 22.

The uppermost door hinge arm 102 is pivotally connected by a link 107 to an angular yield lever 108, said lever being formed with an upturned ear 109 yieldably tensioned against the side of the link 107 by in interconnecting spring 111. The yield lever, best seen in Figs. 18 and 20, overlies and is pivoted at 112 to a rockable crank lever 113 rotatably mounted on a stud 114 secured to the top machine frame plate 14. The crank lever 113 is adapted for counter-clockwise rocking by the manual closing of door 101 and is formed with a cam shoulder 115 adapted to engage and rock clockwise the latching bell-crank 58, heretofore described, when the door is moved from the open position shown in Fig. 18 to closed position shown in Fig. 20. That portion of the crank lever 113 extending within the frame plate 13 (as seen in Fig. 18) comprises a cam arm to which is pivotally connected at 116 a forked link 117, of which link one arm is upwardly bent to extend through an opening in the top frame plate, the other arm of which is pivotally joined at 118 to a pull lever 119 pivoted to the top frame of the machine by a pivot nut 121. The pull lever 119 is formed with a downwardly bent ear engaging within a notch cut out of a slidable lockout bar 122. The bar 122 extends across substantially the entire machine, as can be seen in Fig. 17, and is suitably supported at one end by one of a pair of frame brackets 123 and at the other end by the side frame plate 12 so as to enable lateral slidable movement thereof by the pull lever 119 upon actuation of the door 101. Means hereinafter to be described are provided for engaging said bar to block the sliding movement thereof, thereby preventing the closing of the door 101, said means being provided as safety measures to avoid the possibility of machine operation until certain prerequisite operating conditions are first complied with. A spring 125 (Figs. 18 and 20) stretched between the pivot point 118 and a stud 124 on the under side of the crank lever 113 serves to supplement the rocking of the crank lever 113 in either direction by exerting a buckling force at pivot point 116 and thereby moving the door actuating mechanism to either its fully closed or open position.

The cam arm of the crank lever 113 disposed inside the frame plate 13 cooperates with the upright arm of a bell-crank 126 (see also Figs. 8 and 9) which bell-crank is secured fast to a short rock shaft 127, one end of the shaft being journaled in the frame plate 13. The rearward extending arm of the bell-crank 126 carries a pin 128 engaging a circuit breaking contact 131 which contact, together with contact 132, forms a pair of contacts for completing a circuit to the motor 35. The contacts are supported in suitably insulated relation on a bent bracket 133 extending through a slot in the side frame plate 13 and supported by a pivot stud 134 secured to the frame 13. One arm of the bracket 133 is slotted so as to cooperate with a pin 130 formed on the rearwardly extending arm of the heretofore described follower lever 64, by which means the contacts are rocked counter-clockwise about the stud 134 and out of engageable relation with the bell-crank 126 when the follower lever 64 is rocked clockwise, during a machine stopping operation, by the cam sector 52, as heretofore described.

From the foregoing it will be seen that as the door 101 is manually swung from open position of Fig. 18 to the closed position of Fig. 20, link 107 will act to rock the crank lever 113 counter-clockwise in the event that the lockout bar 122 is unblocked and free to slide to the right by the pulling action of the forked link 117 and pull lever 119. With the door in closed position it will be noted that the pivot connection between link 107 and hinge 102, and the pivot point 112 are at substantially dead center relation to the rotatable axis, i. e., pivot stud 114, of crank lever 112, thereby preventing opening of the door by manual force applied thereto. This dead center position is effected by the spring 125 which, in providing a buckling force on the crank lever 113 and forked link 117 at pivot point 116, acts to rock the crank lever counter-clockwise after said pivot point 116 is manually moved past dead center relation to the direction of pulling force of the spring 125. The cam arm of the crank lever 113, upon counter-clockwise rotation thereof, releases the bell-crank 126 enabling contact 131 to engage with contact 132, thereby closing the circuit to the motor. As the crank lever 113 moves into closed position the cam shoulder 115 thereon bears against and rocks the latching bell-crank 58 to unlatching position (see Fig. 9) enabling the clutch to engage and drive the main drive shaft 50. Of course, it will be understood, as before mentioned, in a motor drive operation the motor is coupled with the main drive shaft through engagement of the clutch pawl 51 with the clutch disc 48, while in a hand drive operation the driving force is carried through the pawl 51 while in a non-engaging position. Accordingly, when electric power is unavailable and the machine is set for hand drive operation, the closing of the contacts becomes an idle function, but the necessity for closing of the door remains since trip lever 56 also acts as a blocking member in a hand drive operation and, therefore, must be tripped in the manner just described, regardless of the form of drive, before the main drive shaft can be rotated.

The door 101 is automatically opened on the stopping of the machine at the end of a processing operation in the following manner: As the follower 64 is rocked clockwise during the eighth cycle of operation, in the manner heretofore described, by the cam sector 52 acting through shiftable roller 62, the stud 66 on the follower engages the lower end of a throw lever 135. The lever 135 is loosely mounted on the supporting rod 59 and is yieldably tensioned clockwise by the aforementioned spring 61. The upper extremity of the throw lever is bent to form an ear adapted to engage a stud 136 formed on the underside of the crank lever 113, thereby rocking the crank lever clockwise from the position shown in Fig. 20 to that of Fig. 18. The clockwise rocking of the crank lever to effect opening of the door 101 is similarly assisted by the spring 125 as the pivot point 116 passes back through dead center relation to the direction of the pulling force of the spring and as it reaches the position shown in Fig. 18 the cam arm of the crank lever will bear against and rock bell-crank 126 separating contacts 131 and 132 and breaking the circuit to the motor. Both contacts 131 and 132 are rocked counter-clockwise, from the position shown (in Figs. 8 and 9), by the follower 64 in the eighth cycle of operation at the time the door is moving to open position so as to prevent a premature breaking of the motor circuit by the bell-crank 126 prior to completion of the eighth cycle and the return of the main drive shaft 50 to zero degrees or stopping position (position shown in Fig. 8). It will be noted that as the follower 66 is actuated in the eighth cycle to throw open the door and to rock the clutch trip lever 56 to a blocking position, the latching bell-crank 58 becomes enabled so as to latch and hold the trip lever 56 in the blocking position shown in Fig. 8 and thereby stop the rotation of the main drive shaft at exactly 360° of the cycle.

One of the safety devices for preventing an erroneous operation of the machine resides in a pilot hole detecting mechanism cooperating with the lockout bar 122. Said mechanism is mounted on the rear of the card chamber and is adapted to prevent starting of the machine unless a record is properly positioned within the chamber. The record chamber of the machine and the means by which it is differentially positioned and simultaneously columnarly spaced will be described more fully hereinafter, but for the present it will be mentioned that the chamber comprises a pair of spaced plates 140, 141 (Figs. 15, 23), suitably supported in a substantially vertical plane so as to align with the slotted feed opening of the side frame plate 22 through which records may be fed into the chamber. The record 150 (see also Fig. 53), for use with which the instant embodiment of the machine is adapted, is in the form of a card having an area pre-punched therein and also containing a pilot hole 151 pre-punched in a pre-determined position on the card. Other features of the card 150 will be described hereinafter in connection with the description of those portions of the machine more closely related thereto. The two plates 140, 141 comprising the record chamber are suitably spaced so as to accommodate the thickness of only one record, and are provided with an over-sized rectangular aperture 139 located to register with the pilot hole 151 when the card is fully and properly inserted within the card chamber. As seen in Figs. 18 through 21, the pilot hole detecting means includes a bent sensing finger 142 pivotally mounted on a pin 143 supported on a rockable blocking arm 144. A spring 145 tensions the blocking arm in a clockwise direction and a spring 146 tensions the sensing finger 142 inwardly to bear on the chamber plate 141 or on a record 150 within the chamber. The blocking arm is released and restored at the beginning and ending, respectively, of each processing operation by a retract arm 147 fast on the rock shaft 127 and formed with a twisted forward extremity underlying the blocking arm 144. As was heretofore described, the shaft 127 is rocked by the bell-crank 126 and crank lever 113 upon the opening and closing of door 101. Also cooperating with the blocking arm 144 is a bell-crank 148 pivoted to one of the machine frame brackets 123, one arm of said bell-crank having an ear bent to bear against a shoulder of said blocking arm, the other arm of said bell-crank formed with an ear tensioned by a spring 149 to bear against the end of the lockout bar 122. Figs. 18 and 19 show the position of the parts in a machine stop position, Figs. 20 and 21 in machine running position, in each case parts being shown with the record 150 properly positioned within the card chamber. It will be seen that as the door 101 is closed to start a processing operation, the rocking of shaft 127 will lower retract arm 147, thereby releasing the blocking arm 144 and sensing finger 142. If a card is properly positioned, the pilot hole 151 will be engaged by the finger 142 to hold the blocking arm in the position shown in Fig. 21, in which position the bell-crank 148 is free to rock clockwise when so urged by lateral movement of the lockout bar 122. If, however, there is no card in the chamber or if that portion of a card within a chamber has no pilot hole in register with the apertures 139, then the sensing finger 142 and blocking arm 144 will rock further to a position determined by the limits of the aperture and in which position the shoulder of the blocking arm 144 will abut against the bell-crank 148, preventing the rocking thereof and thereby holding the lockout bar 122 immobile in a lockout position. In such latter event, the manual rocking of the door 101 to closed position will be ineffective for starting the machine since crank lever 113 will be unable to rock sufficiently to trip the latch lever 58 in the manner heretofore described, and the door will not remain in closed position but will operate only to stretch and further tension the yield lever 108. It will be noted that when a card is properly positioned within the chamber and the pilot hole 151 thereof is detected, the finger 142 operates to hold a card in said proper position throughout ensuing cycles and movements of the chamber. Upon completion of a processing operation and as the machine is automatically stopped, the retract arm 147 will rise to rock the blocking arm 144 counter-clockwise and restore the detecting finger 142 to the position shown in Fig. 19, thereby enabling the withdrawal of a completed record from the chamber and insertion of a succeeding record thereinto.

CARD CHAMBER COLUMNAR SPACING (Figs. 4, 5, 11, 16, 17, 22, 23–27, 55)

The card chamber of the present machine is adapted to receive an unissued card, fed thereto in the above described manner, retaining the card therein during the entire issuing operation, said chamber being differentially settable in a vertical direction for printing and punching purposes, and also being movable laterally each machine cycle for columnar spacing purposes. The means by which the card chamber is laterally or columnarly spaced will next be described, after which the means for differentially positioning the chamber vertically will be described in conjunction with the description of the record printing and punching mechanism.

Figure 16:
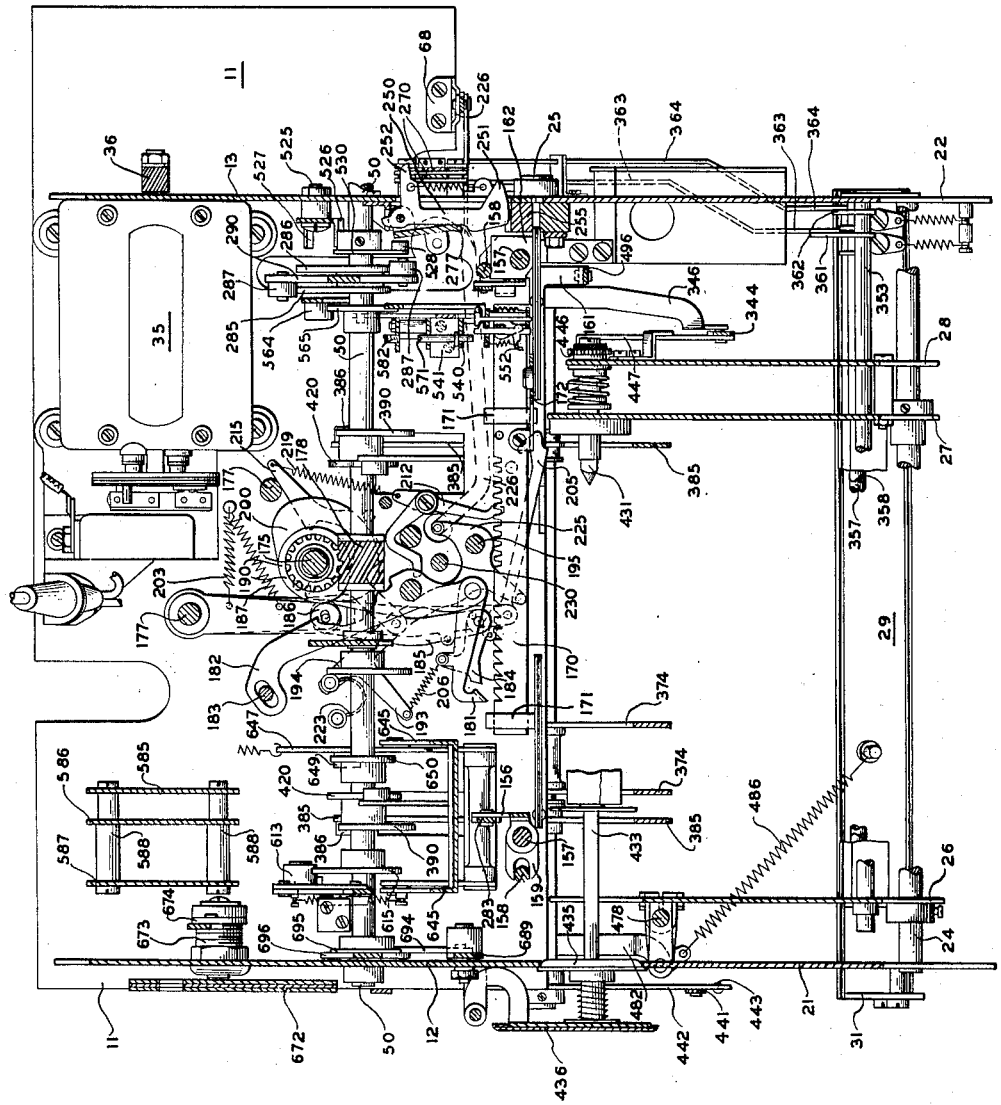
Fig. 16 is a sectional plan view taken along line 16—16 of Figs. 2 and 4.

Fig. 17 is a front sectional view taken along a line immediately behind the card chamber, showing the means by which the chamber is mounted in the machine. Fig. 23 is an isometric view of some of the same mechanism and with the card chamber shown partially in phantom lines. The card chamber, comprised of the spaced plates 140, 141 (not shown in Fig. 17), is supported and guided for lateral spacing movement by a plurality of slotted guide studs 155 arranged in pairs, each pair of studs being secured to a vertically reciprocable bracing sleeve 156. The upper extremity of each sleeve is formed with double spaced ears 154 slidably fitted on vertical guide rods 157, said rods being mounted in and extending between the top frame plate 14 and the base frame plate 11. The lower extremity of the left hand sleeve 156, as can also be seen in Fig. 16, is similarly formed with bent ears 159 which, in addition to being slidably fitted on rod 157, also is slotted to encompass an aligning guide rod 158 located adjacent to, and mounted in a similar manner to rod 157. In this manner the sleeve is held in proper aligned relation to the rod 157 as it reciprocates each machine cycle. The lower extremity of the right hand sleeve 156 includes an ear 161 of slightly modified construction but which is similarly slidably fitted to its respective rod 157 and also suitably guided by the adjacent aligning rod 158. An adjustable limit plate 162, fitted on rod 157 and supported on the ear 161, is held in spaced relation to the ear 161 by a set screw 163. The limit plate is adapted for engagement by selectively releasable stopping members in a manner to be hereinafter described, and is provided to enable close adjustment for the various differentially settable positions of the card chamber. It will be noted also that the upper studs 155 of each pair are adjustably secured to their respective sleeves 156 so as to enable a proper adjustment in achieving a close slide fitting between the card chamber and said guides. The sleeves 156 are reciprocated vertically on guide rods 157 each machine cycle to differentially position the card chamber under control of a keyboard mechanism hereinafter to be described.

Figure 22:
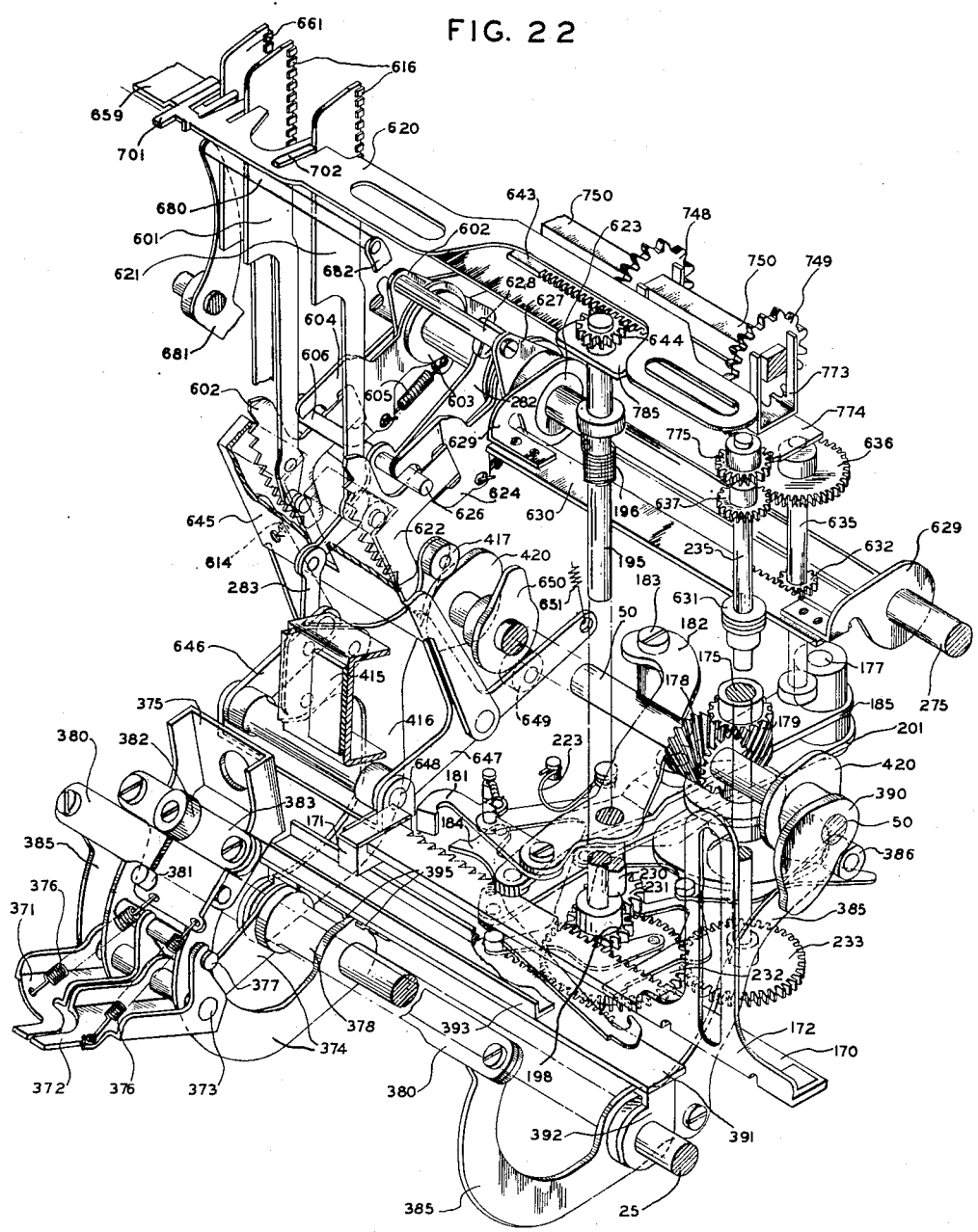
Fig. 22 is an isometric view illustrating the mechanism for spacing the card chamber and related parts.

The card chamber is columnarly spaced by means of a spacing rack 170, as can be seen also in Fig. 22, which rack is suitably supported in a raised position off the base plate 11 by guide blocks 171. Secured to the spacing rack is an upright carry arm 172 having a vertically elongated slot for accommodating a roller 173. The roller is suitably secured to the rear card chamber plate 141 and rides in the slot during the vertical differential positioning movement of the card chamber. In Figs. 17 and 22, the spacing rack 170 is shown in its extreme right hand position as determined by a limit stop 174 (Fig. 17) secured to the base plate 11 and which is the position of the parts when the machine is idle upon the completion of a processing or issuing operation.

The mechanism for advancing and returning the spacing rack is actuated from a vertical drive shaft 175. As can be best seen in Figs. 4 and 11, the vertical shaft 175 is journalled in the main base frame 11 and an intermediately spaced supporting frame plate 176 which plate is secured in a raised position off the base plate by a plurality of upright posts 177. The shaft 175 is driven from the main drive shaft 50 by a pair of intermeshing spiral gears 178, 179, one on each of the shafts 50, 175, respectively, and having a 1:1 ratio.

The spacing mechanism actuated by the shaft 175 can best be seen in the detail views 24 through 27, showing the parts in their respective positions at different cycles and at different degrees in a cycle, and with particular reference to Fig. 24 it will be seen that the spacing rack 170 is formed with ratchet teeth and also with gear teeth. Cooperating with the ratchet teeth is a holding pawl 181 pivotally supported on the end of a fixed arm 182, which arm is secured to one of the supporting posts 177 and a short stud 183. Also cooperating with the ratchet teeth of the rack 170 is an advance pawl 184 pivoted to the end of a follower arm 185. The follower arm is rotatably mounted on one of the supporting posts 177 and carries a roller 186, the arm being yieldably tensioned counter-clockwise by a spring 187 whereby the roller bears on the surface of an advance cam 190 fast on the drive shaft 175. Both pawls 181 and 184 are urged into engagement with the ratchet teeth by springs 191, 192, respectively, said springs being tied to one arm 193 of an escapement lever 194. Accordingly, as the advance cam 190 rotates from the position shown in Fig. 24, which position is at 180° of the seventh or next to last cycle of an issuing operation, the high periphery thereof acting on roller 186 causes the advance pawl 184 to slide the rack 170 so as to enable the holding pawl 181 to engage the next succeeding tooth of the rack and hold the rack in its eighth or most advanced columnar spaced position. As can be seen with reference to the timing diagram (Fig.

Figure 11:
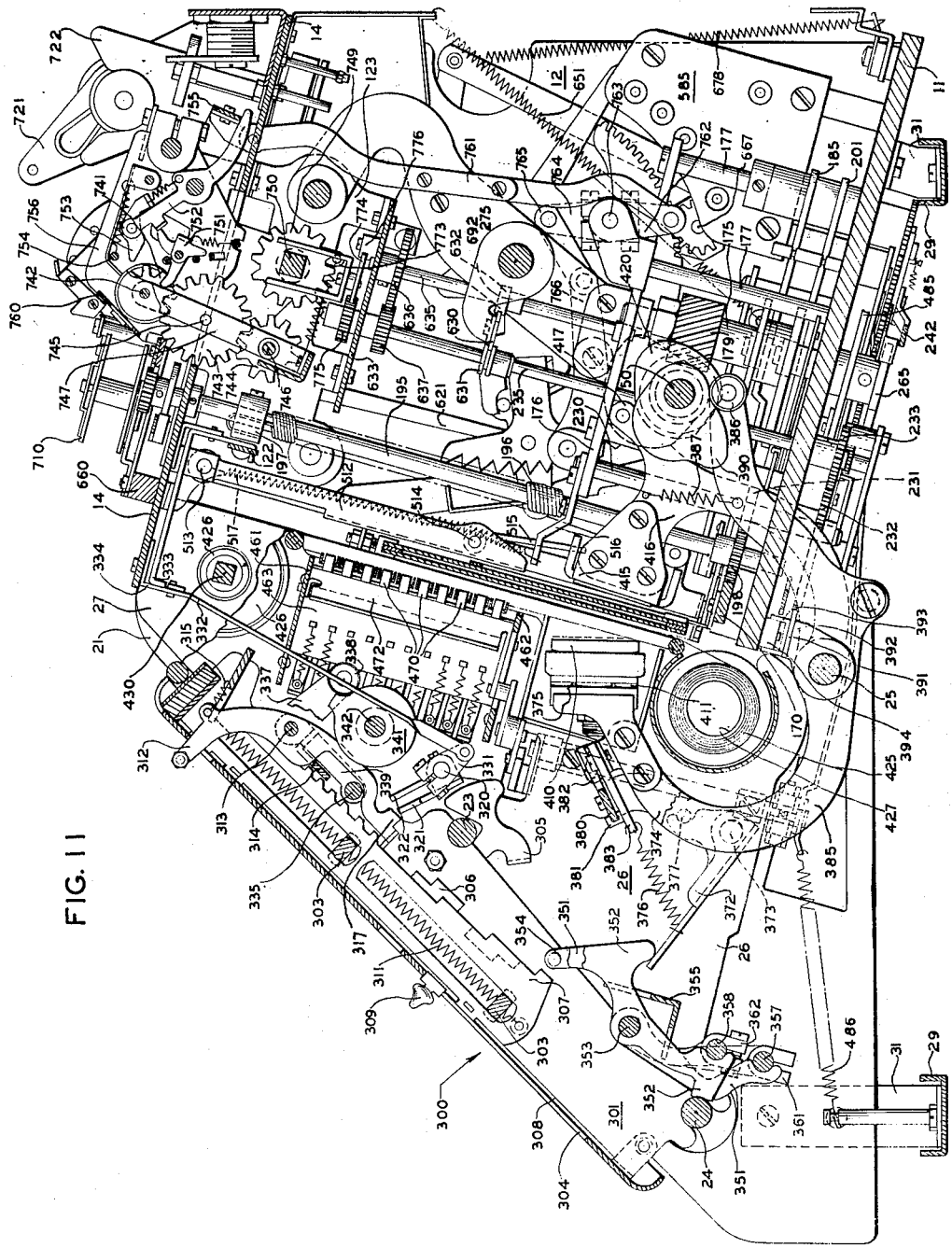
Fig. 11 is a right hand side sectional view taken along line 11—11 of Figs. 2, 3 and 4.

55), the cam 190 operates to advance the rack from about 248° to 337° of a cycle and to return the advance pawl from 337° to 68° of the following cycle so that from 337° until 248° of the following cycle the card chamber is held in one columnar spaced position, within which time the record sensing, punching, and printing functions are effected. The rack 170 advances against the tension of a coil spring 196 acting through a torsion shaft 195. As can be seen in Figs. 11 and 22, the torsion shaft is disposed substantially vertically, being suitably journalled in the top frame plate 14 and lower frame plate 11. The spring 196 is wound about the shaft and connected by a collar 197 with a machine frame member so as to impart a counterclockwise torque to the shaft 195. A gear 198, fast on the shaft, meshes with the gear teeth of the rack 170, thereby imparting the yieldable force of the spring against the advance movement of the rack.

The rack is returned to its first cycle of starting position by mechanism under control of a return cam 200 (Figs. 24–27), which cam is mounted fast on shaft 175 just below the cam 190. Cooperating with the cam 200 is a follower arm 201 mounted similarly to follower 185 on a post 177, and carrying a roller 202 cooperating with the cam 200 under tension of a spring 203. Pivotally carried on the most forward end of the follower 201 is a rack return hook link 205 which is tensioned clockwise about its pivot point with the arm 201 by a spring 206. The hook portion of the link 205 is adapted to cooperate with a stud 207 on the under side of the rack 170, at the proper cycle and proper time in said cycle, for returning the rack to its first cycle or starting position under control of the cam 200 and spring 196. In the position shown in Fig. 24, the hook link 205 is in an ineffective relation to the stud 207 and is seated against a limit plate 208 secured to the base frame plate 11, which position is that of 180° of the seventh or next to last cycle. It will be seen from Fig. 55 that the extreme high periphery of the cam 200 is effective from about 230° to 280° of a cycle at which time the hook 205 is raised slightly off a fully seated relation with the limit plate 208.

The return hook link 205 is rendered effective during the eighth or last cycle of an issuing operation by mechanism now to be described. As the rack 170 is advanced to its eighth or last columnar spaced position, i. e., from the position shown in Fig. 24 to that of Fig. 25, which spacing occurs from 248° to 337° of the seventh cycle, a trip stud 211 on the under side of the rack bears against and rocks clockwise one arm of a bell-crank 212. The other arm of the bell-crank 212 bears against a stud 213 formed on a release trip link 215. The bell-crank 212 is pivoted to the base plate 11 and the release trip link 215 is pivoted to the escapement lever 194 and is tensioned clockwise by a spring 219. The trip link 215 is formed with a hook portion 216 and with a cam shoulder 217, both of which cooperate with a rotating stud 218 formed on the underside of the return cam 200. As can be seen in Fig. 25, the movement of rack 170 in the seventh cycle operates through the bell-crank 212 to rock the release trip link 215 so as to throw the hook portion 216 thereof into the path of rotation of the stud 218. Accordingly, at about 175° of the eighth or last cycle the stud 218 engages with the hook portion 216 and pulls the trip link 215 rearwardly, causing the escapement lever 194 to rock clockwise about its loose pivot on the shaft 195.

The clockwise rocking of the escapement lever 194 acts through a stud 221, formed on another arm 222 thereof, to rock the hook link 205 counter-clockwise off seated relation with the limit plate 208 and into effective relation with the rack stud 207, and at the same time the arm 193 of the escapement lever pulls springs 191, 192 beyond dead center relation to the pivot points of pawls 181, 184, so as to urge the pawls out of a rack engaging position. Accordingly, as the parts move from the position of Fig. 25 to that of Fig. 26, which later figure shows the parts at 360° of the eighth or last cycle, the rack 170 will be slightly advanced by the return hook link 205 so as to remove the spring tension of the rack from the holding pawl 181, said movement occurring at 230° to 280° of the eighth or last cycle, and enabling both pawls 181 and 184 to disengage from the rack. The escapement lever 194 and related parts are held in the position shown in Fig. 26 by an over center spring 223, sprung between the lever and a limit plate 214 secured to post 183 and base frame plate 11, said over center spring being of sufficient strength to resist the tension of spring 219. As the roller 202 rides into the low dwell of the return cam 200, which movement occurs from 280° of the eighth or last cycle to 7° of the first cycle of a new processing operation, the rack is returned to the position shown in Fig. 26, wherein the parts are shown when the machine stops at the end of the eighth or last cycle.

It may be here mentioned that the rocking movement of the escapement lever 194 is the effective actuating force for sliding the shiftable roller 62 (see Figs. 8, 9, and 17) as heretofore described, for causing an automatic machine stop. For this purpose a third rearwardly extending arm 225 of the escapement lever 194 is pivotally joined, through an opening in the base frame 11, to a shift link 226. As best seen in Fig. 17, the other end of the shift link 226 is twisted and pivoted to the shift lever 67, for causing the roller 62 to slide into effective machine stopping position relative to the cam ring 52 at about 180° of the eighth or last cycle of operation.

In the machine stop position, as shown in Fig. 26, it will be seen that the return hook 205 is free of the stud 207 since the return movement of the hook during the course of the eighth or last cycle is greater than is required to return rack 170 to its limit position. Since in this returned position it is also free of the stud 221, the spring 206 is effective for rocking the hook lever clockwise to bear against the limit plate 208.

Upon starting of the machine in the manner hereinbefore described, as the return cam 200 begins to rotate from the position shown in Fig. 26 to the position shown in Fig. 27, which latter position is at 180° of the first cycle, the stud 218 on the cam 200 bears against the cam shoulder 217 of the release trip link 215 to restore the link, escapement lever 194 and associated parts to normal advancing position as shown in Fig. 27 and bringing pawls 181, 184 into cooperative engagement with the rack 170. At the same time as the roller 202 rides onto a higher periphery of cam 200, the hook link 205 advances independently of the rack to assume its normal seated position on the limit plate 208. Likewise, as the escapement lever 194 returns to normal advancing position, the shift link 226 is pulled to slide the shiftable roller 62 out of cooperative relation with the cam ring 52 until the next automatic stopping of the machine is effected in the last cycle of the current operation and in the manner just above described.

Since the spacing rack 170 in addition to spacing the card chamber in the manner above described also operates to space printing mechanisms and accumulating mechanisms hereinafter to be described, it requires that the coil spring 196 on the torsion shaft 195 be of considerable strength and sufficient to restore the respective mechanisms to their original or normal starting position. Consequently, in order to prevent slamming of the parts on the restoring movement thereof and also to prevent the force of the spring from accelerating the driving speed of the machine through excessive torque force on the return cam 200, braking means are provided to ease the respective mechanisms back to their starting or normal position at the end of a processing operation. In this connection, a short vertical shaft 230 is provided, the upper end of which is journalled in the supporting plate 176, as can be seen also in Fig. 11, the lower end of which is journalled in and extends through the base frame plate 11. The shaft 230 is driven from the torsion shaft 195 through a gear 231 fast thereon and meshing with the torsion shaft gear 198. Secured to the lower end of the shaft 230 beneath the base frame 11 is a gear 232 meshing with a gear 233. The gear 233 is fast on the lower end of a vertical shaft 235, hereinafter to be more fully described, and which operates to space the accumulator mechanism of the machine synchronously with the spacing of the card chamber. For the purpose of retarding or breaking the return movement of the spacing rack 170 and associated mechanisms, a gear sector 236, as can be best seen in Fig. 5, is pivotally mounted at 237 to the underside of the base frame plate 11 and is arranged to mesh with the gear 233. Linked to the gear sector 236 is a similar gear sector 238 pivotally mounted on the base plate 11 by a pivot stud 239. The sector 238 is arranged so as to mesh with a gear 241 of a governor 240. The two gear sectors are interconnected by a link 242, one end of said link being pivoted to the sector 236 at 243 and near the other end pivoted at 248 to a bell-crank 244. The free end of said bell-crank yieldably bears under tension of a spring 246 against a limit stud 245 disposed at the extreme end of the link 242. The bell-crank 244 is pivoted at 247 to the gear sector 238. In Fig. 5, the parts are shown in their respective positions at the start of a processing operation. As the card chamber advances through the eight cycles of a processing operation the spacing shaft 230 will be rotated step by step clockwise so as to rock gear sector 236 clockwise from the position shown in Fig. 5. It will be noted that in this starting position the moment arm 237, 243 of the sector 236 for imparting a thrust on the link 242 is substantially perpendicular to the moment arm 239, 247 of the sector 238 for receiving said thrust, the pivot point 247 being in substantially dead center relation to the pivot stud 239 and the pivot point 243. This dead center relationship is advantageous for effecting a minimum velocity of the sector 238 and governor 240 in the early part of the return sweep, and a maximum velocity in the latter part of the return sweep, thereby rendering the governor most effective at the end of the return sweep of the sectors to avoid a jarring or slamming of the parts as they reach normal starting position and, at the same time, without unnecessarily delaying the return movement thereof which otherwise would occur. The provision of bell-crank 244 enables the dead center relation between pivot points 239, 247, 243 to be overcome since, as the sector 236 is rocked initially in the first cycle, the thrust through link 242 tends to rock the bell-crank 244 counter-clockwise. However, since the free arm of the bell-crank 244 is disposed to bear against the pivot stud 239, said stud becomes a fulcrum about which the bell-crank rocks, thereby imparting a counter-clockwise thrust at the pivot point 247 to the gear sector 238, said thrust being in a direction substantially perpendicular to the moment arm 239, 247. This initial stepping movement of the sectors during the advance of the spacing rack causes a stretching of the spring 246 until the pivot point 247 passes beyond dead center relation to the stud 239 and pivot point 243, at which time the spring 246 acts to rock the bell-crank 244 clockwise about its pivot connection 247 and against a limit stud 245, which rocking movement serves to give an additional counter-clockwise thrust to the sector 238. From this point on, the step by step advance of the spacing rack and the continued thrust of the link 242 is carried directly through bell-crank 244 to the sector 238 without fulcruming from the pivot stud 239 and until the parts are fully advanced to the eighth cycle position, at which time the torsion shaft 195 (Fig. 11) is fully wound.

Upon the return sweep of the sectors 236, 238 back to the position shown in Fig. 5, it will be seen that the initial movement of the spring driven sector 236 will cause relatively slight movement of the link 242 and sector 238 since at this initial stage of the return movement, the movement arm 237, 243 extends substantially in line with the link 242. Accordingly, during this initial portion of the return sweep, sector 236 will travel at an accelerating velocity substantially free of the governor 240. Assuming for the moment that the spacing rack and associated spacing mechanisms have been returned approximately half way from fully advanced position to their normal starting position, it will be understood that although sector 236 would be similarly returned half way to its starting position, sector 238, however, would be still at a nearly fully advanced position. As the sector 236 enters the latter portion of the return sweep and as the moment arm 237, 243 approaches perpendicular relation to the link 242, the link will be pulled with a greatly accelerating velocity, causing sector 238 to swing in a correspondingly accelerated velocity, in this manner rendering the governor 240 effective for braking the greatly accelerated movement. As the sector 236 reaches fully returned position, the governor controlled uniform velocity of sector 238 will cause a gradually decelerating velocity for sector 236 which at this point is approaching maximum torque ratio to the sector 238, so that as the sector 236 reaches its fully restored position, that of Fig. 5, its return velocity will be decelerated to the greatest extent. Accordingly, the spacing rack 170 and associated spacing mechanisms geared directly to the sector 236 through the gears 233, 232 and shafts 235, 230 will be returned with a maximum speed but with a gradually decelerating velocity as they reach their return limit positions so as to prevent any jarring or slamming and consequent injury which might otherwise occur to the respective mechanisms.

CARD CHAMBER DIFFERENTIAL MECHANISM

*(Figs. 5, 10, 16, 23, 33, 34, 50–52, 55)*

The card chamber is positioned vertically into any one of ten different printing positions by differential mechanism now to be described, each of said different positions being determined by an individually releasable stop 250. The stops 250, which can be seen in Figs. 16, 23, and 50, are mounted in a vertical row and in a position for engaging, when released, the adjustable limit plate 162 associated with the right hand card chamber supporting sleeve 156 so as to block the vertical movement of the card chamber in a position corresponding to that of each respective stop 250. The stops are selectively released under control of a manually settable keyboard mechanism in a manner which will be hereinafter more fully described.

Each stop 250 comprises a substantially triangular shaped head portion 251, a transversely projecting tail 252, and a foot 253, and are loosely mounted for horizontal releasing movement on a vertical supporting rod 254 suitably secured to the side frame plate 13 of the machine. The head portion 251 of each stop is suitably spaced and slidably supported in notches formed in a vertical frame bar 255, the foot portion 253 being similarly supported in a comb plate 256 secured to the side frame 13. Individual springs 257 connecting the tail 252 of each stop with a rod 258, mounted on the frame 13, serve to yieldably tension each stop against a stop restoring bail 260. Cooperating with the tail portion 252 of the stops are a pair of shiftable upright permutation slides 270, 271 respectively, jointly effective for blocking the release movement of all but a selected one of said stops in each separate machine cycle. Said slides are controlled in accordance with the keyboard set up of the machine, and the operation thereof will be more fully described in connection with the machine keyboard mechanism. The restoring bail 260 is loosely mounted for rocking movement on the vertical rod 254, and is actuated once each machine cycle by mechanism best seen in Fig. 5. As seen in Fig. 5, the bail 260 is formed with a bent under ear pivotally connected to an angular shaped link 261, the other end of said link being pivoted to a follower lever 262. The lever 262 is pivoted at 263 to the base frame plate 11 of the machine and carries a roller 264 cooperatively bearing on a restoring cam 265. The lever 262 is tensioned clockwise by a spring 266 connecting the lever with the base frame plate 11. Cam 265 is fast on the lower end of the vertical drive shaft 175 heretofore described, which rotates once each machine cycle to positively restore bail 260 and enable the yieldable releasing thereof once each machine cycle. As can be seen with reference to the timing chart (Fig. 55), cam 265 is shaped so as to hold the stops 250 in fully restored position from 0° through 71° and to enable the complete release of a selected stop from 80° through 317° of a machine cycle.

The means for vertically reciprocating the card chamber each machine cycle to a differential position, as determined by one of the stops 250, is effected by mechanism best seen in Figs. 23, 33 and 34 and includes a rockable differential shaft 275. The differential shaft extends across the entire width of the machine and is suitably journaled in the side frame plates 12, 13, respectively. Secured fast to the shaft 275 is a card chamber lift bell-crank 276, which bell-crank is pivotally joined to the right hand chamber supporting sleeve 156 by a link 277. Loosely mounted on the shaft 275 at a point adjacent the lift bell-crank 276 is a complementary pressure bell-crank 278. The bell-crank 278 is pivotally connected by a link 279 to a pressure sleeve 281, similarly slidably fitted to the vertical guide bars 157, 158. It will be seen that the sleeve 281 is disposed on the guides at a position between the ears 154, 161 respectively, of the card chamber supporting sleeve 156, and is so disposed in order to enable engagement with the top surface of a released stop 250 by the sleeve 281 concurrently with the engagement of the under surface of said stop by the adjustable limit plate 162. The left hand end of the card chamber is lifted in a similar manner, and for this purpose an additional lift arm 282 (Fig. 23) is secured fast to the differential shaft 275 and is pivotally connected to the left hand sleeve 156 by a link 283, whereby both ends of the card chamber will be lifted the same extent upon differential rocking of the shaft 275.

Figure 10:
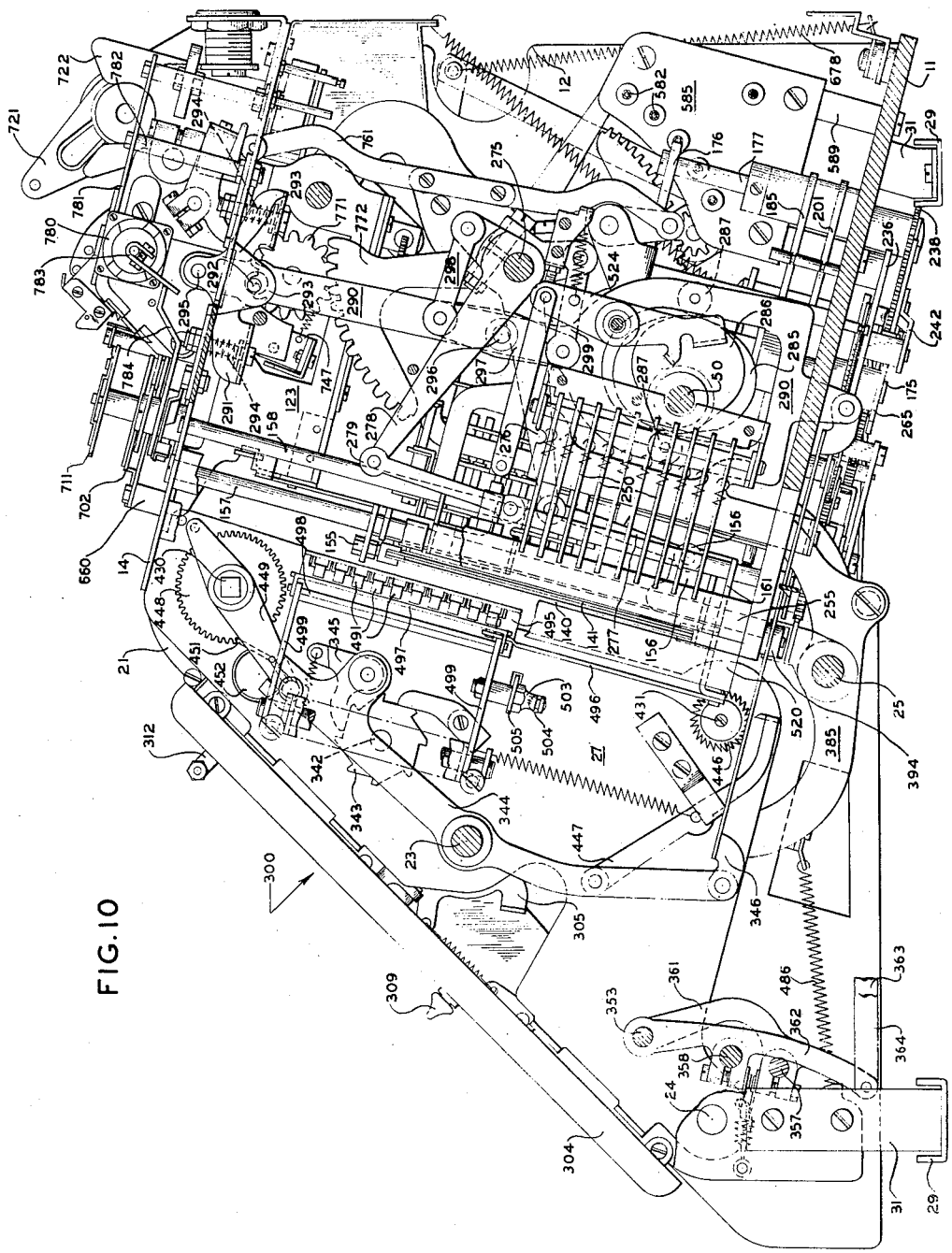
Fig. 10 is a right hand sectional view of the machine taken along the line 10—10 of Figs. 2, 3, and 4.

The differential mechanism is actuated from the main drive shaft 50 by means which include a pair of conjugate cams 285, 286, respectively, said cams being fast on the main drive shaft 50 and cooperating with a pendant yoke 290. The yoke is disposed to encompass shaft 50, and is provided with a pair of diametrically opposed rollers 287, each cooperatively bearing on one of the cams 285, respectively. The yoke is suspended from a yieldable pivot support 291 yieldably secured to the top frame plate 14. As can be seen in Figs. 10, 33, 34, the support 291 is pivotally mounted on a fixed pin 292 secured to a depending frame bracket 293, the support 291 being substantially wing shaped, each wing thereof being bent under and tensioned away from the frame plate 14 by individual compression springs 294. A pivot stud 295 carried by the support 291 serves as a pivotal axis for the normal rocking of the yoke 290.

Pivoted to the shank of the yoke at 296 is a balance lever 297, opposite ends of which are connected to the complementary bell-crank 278 and the lift bell-crank 276 by parallel links 298, 299, respectively. Link 298 connects the upper end of the balance lever with the complementary bell-crank 278, and the link 299 connects the lower end of the balance lever with the lift bell-crank 276. It will be seen that as the yoke 290 is rocked clockwise from the position shown in Figs. 10 and 33 by the cam 286, the balance lever 297 pulling on the link 298 will rock the complementary bell-crank 278 counter-clockwise loosely about the shaft 275, at the same time, through link 299, rocking the lift bell-crank 276 and the shaft 275 in a clockwise direction to a position determined by one of the stops 250. In Figs. 10 and 33, the parts are shown in their normal unactuated or fully restored position. It will be seen that in the event one of the lower stops 250 is released in a particular cycle the differential movement of the card chamber will be blocked by said stop in substantially the position shown in Figs. 10 and 33, in which event as the yoke 290 is driven clockwise the balance lever 297 is caused to rock counter-clockwise about its pivot 296 so as to increase the arc of movement of the complementary bell-crank 278. Accordingly, the pressure sleeve 281 associated with the complementary bell-crank 278 will be lowered on the guide 157 until engaging the top surface of the released stop 250, and thereby applying a squeezing force on said stop in cooperation with the limit plate 162. In Figs. 23 and 34, the parts are shown in their actuated positions when engaging with the Nos. 5 and 7 stops, respectively. In this first mentioned view, the two bell-cranks 276, 278 have been rocked in opposite directions to substantially the same extent, since the No. 5 stop is near the medium position between the extremes of the zero stop and the nine stop. In the event the topmost stop or the "9" digit stop 250 should be released in a particular cycle, the complementary bell-crank 278 will be blocked and retained in substantially the same position shown in Fig. 10, causing the balance lever 297 to rock clockwise about its pivot 296 and increase the effective arc of rotation of the lift arm 278, and thereby raising the card chamber to its uppermost or extreme differential position, and likewise causing the differential shaft 275 to be rocked clockwise to the maximum differential position. The arrangement is such that whichever one of the stops 250 may be released, the bell-cranks 276, 278 will be pulled in opposite directions in scissors fashion until that particular stop becomes a limit position for the movement of both of said arms, with the extent of rocking of one arm being complementary to the extent of rocking of the other. This arrangement has the advantage of giving a more positive action to the differential mechanism by eliminating spring urged follower mechanism commonly employed in mechanisms of this type, and consequently avoiding slamming and rebound, which is incident to said spring urged devices.

In order to assure a firm differential positioning of the card chamber, the conjugate cams 285, 286 are designed with slightly oversized dimensions so as to give the yoke 290 a slight overthrow movement, i. e., slight additional movement beyond that necessary to bring the two members 281 and 162, respectively, into abutting engagement with a stop 250, and it is for this reason that the pivot 295 for the yoke is yieldably secured to the machine frame. This yielding function of the pivot pin 295 will be understood upon realization that when the yoke 290 is actuated and rocked clockwise to a position where one of the stops limits the rocking of the bell-crank 276, 278, respectively, the pivot point 296 will be blocked from further rocking movement about the pivot 295. Continued actuation of the yoke by the cam 285, i. e., overthrow movement, causes the yoke to rock clockwise about the pivot point 296, causing the yieldable pivot 295 to shift slighty in a rearwardly direction. This shifting of the pivot 295 causes the rocking of the support member 291 about its pivot pin 292, thereby causing an increased tension of one of the heavy compression springs 294. It will be seen that this overthrow movement by the cams 285, 286, causes a tight squeezing of the respective stop 250 so as to firmly and securely position the card chamber and associated members in their respective differential position.

With reference to Fig. 55, the timing chart, it will be seen that the cams 285, 286, are designed so as to actuate the differential mechanism from 80° to 207°, holding the mechanism fully actuated from 207° to 227°, and restoring the differential mechanism to its normal position from 227° to 360°. As was heretofore mentioned, the stop restoring bail 260 is timed to fully release a stop at about 80°, thereby enabling the stop to be fully released concurrently with the initial actuating movement of the differential mechanism by cams 285, 286.

From the foregoing, it will be apparent that the card chamber, comprising the spaced plates 140, 141, effects movement in two different directions within a machine cycle, i. e., in lateral transverse spacing movement by the spacing rack 170 through the chamber carry arm 172, and a vertical differential movement effected by the chamber lift bell-crank 276 to an extent determined by one of the releasable stops 250. Fig. 51 shows the card chamber in the second cycle spaced location at "zero" differential position, and Fig. 52 shows it in the sixth cycle spaced location at No. "5" differential position. The lateral spacing movement of the card chamber occurs from 248° through 337° and is effected concomitantly with the restoring movement from the differentially set position to normal differential position which occurs from 227° to 360° of a cycle.

KEYBOARD MECHANISM (Figs. 2, 5, 7, 10, 11, 15, 22, 32, 50, 51, 52)

The differential stops 250 are selectively released under control of a keyboard unit 300, seen in Figs. 2 and 11, mounted on the front of the machine in an inclined position. The keyboard, which is made as a separate detachable unit for assembly reasons, comprises a pair of side frame plates 301, 302, joined together by transverse comb bars 303 and suitably enclosed by a cover plate 304. The side frames 301, 302, are provided with round recesses adapted to fit around the frame tie rods 23, 24, and each have yieldably releasable hooks 305 engaging with the tie rod 23 so as to secure the keyboard unit to the machine.

The comb bars 303 serve to support and space a plurality of settable code slides 306, 307, respectively, arranged in pairs, each pair being integral and including a value index plate 308 and a key stem 309 extending through slots in the cover plate 304. The bottom edge of said code slides 306, 307, are cut away to provide steps of three different depths, the slide 306 having a greater number of steps than the code slide 307. Each pair of said code slides 306, 307, represents the set-up means for one column of the keyboard and is shiftable to one of ten positions so as to represent a value to be entered in the machine.

In the present machine there are eight pairs of code slides, one pair provided for controlling the operation of the machine in each of eight cycles of an issuing operation. Of course, it will be understood that a greater or lesser number of code slides could be provided thereby changing the keyboard capacity of the machine, depending upon the nature of the record to be issued or requirements of the user.

Each pair of code slides is tensioned upwardly to its normal or zero position by a spring 311. Individual release levers 312 are provided to cooperate with each pair of code slides 306, 307, said levers being spring urged into engagement with detent teeth formed in the under surface of the code slides 307. Release levers 312 are loosely mounted on a cross shaft 313 and spaced by transverse comb plates 314, 316. The levers are tensioned clockwise by individual springs 315 so as to engage with the detent teeth, as aforesaid, in the code slides and thereby retain the associated pair of slides in any one of their respective set-up positions. The upper end of each release lever 312 projects through slots formed in the cover 304 so as to be accessible for manual rocking thereof for releasing the code slides to their normal or zero position.

As best seen in Fig. 11, the lower extremities of the release levers 312 are formed with a blocking shoulder 317, which shoulder is disposed for blocking engagement with one or another keyboard lock-up member 321, 322, mounted on a rock shaft 320. The members 321, 322 are provided as safety features to prevent manual shifting of the keyboard slides during the course of the machine's operation. The structure of said members can also be seen in Fig. 14. As seen therein, the lock-up member 321 is in the form of a bail having an upright protruding finger and loosely mounted to rock about the shaft 320. One ear of the bail carries a pin 323, also seen in Fig. 2, extending through the frame partition plate 26 to cooperatively engage with a rockable cam arm 324, which cam arm is operatively connected with a key actuated lock 325 mounted on the side frame plate 21. The blocking finger of the bail 321 is disposed to align with the release key lever 312 associated with the code slides 306, 307 of the first keyboard column, i. e., the extreme left hand keyboard column as viewed from the front of the machine. In the present machine the first keyboard column is utilized to set up a number representing the year of issue of a postal money order, and since it represents data which remains constant throughout the year, separate locking means are provided for retaining the set-up of the first keyboard column. As seen in Fig. 11, the blocking finger 321 is disposed in blocking relation to its associated key lever 312 and thereby prevents any change in the set-up of the respective code slides 306, 307. The unblocking of the release lever may be effected by manually manipulating the key operated lock 325 to rock the cam arm 324 and the member 321 clockwise from the position shown in Fig. 11 to an ineffective position so as to free the release lever 312 and enable the setting up of the respective code slides 306, 307 of the first keyboard column.

The keyboard lock-up member 322 as distinguished from finger 321, is firmly secured to the rock shaft 320 and presents an extended blocking edge for cooperating with all the remaining release levers 312, i. e., the release levers associated with the seven right hand keyboard columns. As seen in Figs. 2 and 11, a rock arm 331 fast on the shaft 320 is pivotally connected by a twisted link 332 to a rockable follower lever 333 mounted in brackets 334 secured to the top frame 14. The follower 333 operates as a bell-crank and is formed with a depending arm having a bent ear engaging in a slot formed in the under side of the heretofore described lock-out bar 122. As heretofore described, the lock-out bar 122, associated with the machine start-stop mechanism, is pulled in a left to right direction upon a machine starting operation, and is returned from a right to a left position as the machine stops. Accordingly, it will be seen that as the machine is started and the lock-out bar is pulled from left to right, the follower 333 will rock counter-clockwise (as viewed in Fig. 2) to pull upward on the link 332 so as to rock the shaft 320 counter-clockwise (as viewed in Fig. 11). Consequently, blocking member 322 will be rocked, from the ineffective position shown, into blocking engagement with the shoulders 317 of all the related release levers 312, and in this manner, effectively lock up all the associated code slides 306, 307 in their respective set-up positions for the duration of the issuing operation.

Conversely, as the machine effects an automatic stopping and the lock-out bar 122 returns to its restored position during the course of the eighth cycle, the blocking member 322 will be rocked clockwise into unblocking position, i. e., the position shown in Fig. 11, which is the normal position of the parts when the machine comes to a stop, and in which position the code slides 306, 307 of the related keyboard columns are free for setting up the next issuing operation.

Means are also provided for automatically releasing all but the first column keyboard code slides 306, 307 at the completion of each issuing operation, which means include a release bail 335 (Fig. 11). The release bail is disposed transversely to the associated key release levers 312, and is carried at one end thereof by a bell-crank 337 secured to rock shaft 313, the other end thereof being carried in a rock arm 339 secured to shaft 313. The bell-crank 337 carries a roller 338 which cooperatively engages with a cam 341 (see also Fig. 2), which cam is mounted on a short rock shaft 342 suitably journaled in the frame partition plates 27 and 28. Mounted on the right hand end of the rock shaft 342 is an eight tooth ratchet wheel 343 (see also Fig. 10) by which the shaft is rotated one complete revolution within the eight cycles of an issuing operation. As best seen in Fig. 10, the ratchet wheel is actuated from a rock lever 344 loosely mounted on the frame tie rod 23, said lever carrying a spring urged pawl 345 adapted to engage the ratchet wheel 343. The lower end of the rock lever 344 is pivotally connected by a link 346 with the lower end of the differential yoke 290, thereby rocking synchronously with the yoke and advancing the ratchet wheel one tooth space each machine cycle. As best seen in Fig. 11, the shape of cam 341 is such as to rock the bell-crank 337 and the release bail 335 counter-clockwise during the latter part of the eighth cycle, and in this manner rock the related keyboard release levers 312 counter-clockwise, and thereby release the associated code slides 306, 307 from their respective set-up positions to normal or zero position.

The means by which the various set-up positions of the paired keyboard code slides 306, 307 of each keyboard column operate to control the differential mechanism can be seen in Figs. 2, 11, 15, and 32 and include a plurality of sensing rockers 351, 352. The rockers are alternately arranged and loosely mounted on a cross rod 353 supported in the frame plates 26, 27, 28, and 22. The upper or head portion of each rocker carries a stud 354, the rockers being suitably spaced apart by a comb bar 355 so that the stud 354 carried by the rockers 351 will lie in vertical alignment with the related code slide 306 while the stud 354 carried by each rocker 352 will lie in vertical alignment with the code slide 307 associated with each keyboard column. Each of the rockers has a depending tail portion cooperatively bearing on one or another bail 357, 358, respectively, the rockers 351 cooperating with the bail 357 and the rockers 352 having a slightly shorter tail portion so as to cooperate with the bail 358. The bail 357 is supported at each end thereof by a rock arm 361 loosely mounted on the supporting rod 353. The bail 358 is similarly supported from the rod 353 by arms 362. The right hand bail supporting arms 361, 362, respectively, are extended downwardly and pivotally connect with cam links 363, 364, respectively. Said cam links extend rearwardly, each cooperating with one of the permutation slides 270, 271, so as to enable the selective release of one of the differential stops 250, as heretofore described. As can be seen in Figs. 7 and 50, the rear ends of the cam links are supported on roller bearings 365 mounted in a frame bracket 366, the rear end of said links being formed with a camming edge containing graduated dwells and arranged to cam against rollers 367, mounted on the permutation slides 270, 271, respectively. The arrangement is such that any rocking movement imparted to a pair of sensing rockers 351, 352 in a counter-clockwise direction by means hereinafter to be described to various limiting positions determined by the stepped surface of the code slides 306, 307, respectively, will be imparted to the bails 357, 358 to effect a rearward shifting of the cam links 363, 364 a corresponding extent. The slides 270, 271, are suitably guided in brackets 368 secured to the side frame plate 13 and are tensioned downwardly by individual springs 369. The rearward shifting of the cam links operates to raise a related permutation slide 270, 271, so as to enable selective release of one of the differential stops 250 corresponding to the set-up position of the code slides 306, 307 of the controlling keyboard column.

It is, of course, understood that the paired code slides 306, 307 of one keyboard column are effective for controlling machine operation in only one cycle, means being provided, as hereinafter described, for successively rocking only one pair of rockers 351, 352 in successive cycles of an issuing operation. The code embodied in the design of the code slides 306, 307 and permutation slides 270, 271 can best be seen in the enlarged schematic view, Fig. 32. It will be understood that the parts are shown in Fig. 32 in an exploded view for purposes of clarity, the two code slides 306, 307 being suitably joined together and being the paired slides relating to a single keyboard column. The slides are shown in normal or "zero" set-up position, in which position the bottom edge of each slide 306, 307 is disposed in the arc of rotation of the studs 354, thereby effectively blocking any counter-clockwise rocking of the sensing rockers 351, 352. Accordingly, in this position of the code slides the cam links 363, 364 will remain in unshifted position and will not effect a lifting of either of the permutation slides 270, 271. It will be seen that in the normal "zero" position as shown, the bottom notch in each of the permutation slides 270, 271 is in horizontal alignment with the bottom stop 250 of the vertical row of stops and that all other stops in the row are in misalignment with notches in either slide 270 or 271. Accordingly, in the "zero" setting, as shown, all stops 250 except the "zero" stop will be blocked by one or the other permutation slides 270, 271, enabling the "zero" stop to rock into fully released position for limiting the movement of the differential mechanism at the "zero" position in the manner hereinbefore described.

In setting up the keyboard for entering the value "one," the code slides 306, 307 of a given keyboard column would be manually shifted downwardly one tooth space, in which position the first step of each slide will lie within the arc of rotation of studs 354, thereby enabling a limited rocking movement of both sensing rockers 351, 352, to a sufficient extent for camming permutation slides 270, 271 up to the first raised dwell surface of the cam links 363, 364. In this position of the permutation slides all differential stops 250, except the next to bottom stop, i. e., the "one" stop, will be effectively blocked with only the "one" stop unblocked for enabling its release movement. With the code slides 306, 307 set up for entering the value "two," the sensing rocker 351 will be limited by the next or intermediate step of code slide 306, while rocker 352 will still be limited by the extended first step in the code slide 307. Accordingly, permutation slide 270 will be raised by the cam link 363 to the second dwell thereon, while the permutation slide 271 will again be raised by cam link 364 to the first dwell thereon. In this setting the permutation slides 270, 271 will effectively block all differential stops 250 except the "two" stop which stop will be free to release and limit the differential mechanism at the "two" position. In a similar manner the various set up positions of the code slides 306, 307 for representing and entering the other digit values operate to selectively limit the camming movement of the cam links 363, 364 and thereby effect the upward shifting of the permutation slides 270, 271 to different combinational positions for enabling the selective release of a corresponding differential stop 250. The arrangement is such that successive set-up positions of the keyboard code slides operate to release the next higher stop 250, so that when the code slides are in their extreme downward position to represent the value "nine" both permutation slides 270, 271 will be cammed upward to their extreme set positions, in which position the top notch in each permutation slide will align with the top or "nine" stop 250, and in which position all other stops 250 will be blocked by one of the other slides. In Fig. 32, the Roman numerals arranged along the stepped edge of the code slides 306, 307 indicate the particular step or portion of a step serving as a limit surface for blocking the sensing rockers 351, 352 in the various set up positions of the slides. The Roman numerals arranged along the stops 250 indicate the particular stop released for each correspondingly numbered set up position of the code slides.

The sensing rockers 351, 352 are actuated by a pair of rock fingers 371, 372, see Figs. 11, 15, 22, which fingers underlie the head portion of the rockers and are mounted for columnar spacing movement each machine cycle so as to enable sensing of the keyboard set-up in a column by column manner in successive cycles of the issuing operation. The rock fingers are loosely mounted on a pivot pin 373 carried between the two supporting arms 374 of a stamp carrier 375. As can be best seen in Fig. 22, each of the fingers 371, 372 is tensioned clockwise about the pivot pin by an individual spring 376, and is formed with an upright limit arm engaging a limit pin 377 also carried between the arms 374 of the stamp carrier. The arms 374 are secured to a hub 378 slidably mounted on guide rod 25 which as heretofore described extends across the width of the machine. Rocking movement is imparted to the stamp carrier arms 374 by means of a rock bail 380 disposed to lie between and bear against a stud 381 and roller 382 mounted on a plate 383 suitably secured to the arms 374. The rock bail 380 is supported at each end thereof by follower levers 385 of identical construction and rockably mounted on guide rod 25. The rearward end of each follower lever 385 carries the roller 386, see also Fig. 11, engaging an individual cam 390 mounted on the main drive shaft 50. A spring 387 urges the roller against the cam so that upon each revolution of the shaft 50 each machine cycle, the levers 385 and bail 380 will be rocked about their axis on the guide rod 25. The rocking of the bail 380 causes a similar movement of the stamp carrier arms 374 about the same axis. Accordingly, as the arms 374 rock clockwise, the rock fingers 371, 372 will be raised and brought to bear against the adjacent pair of sensing rockers 351, 352 so as to actuate said rockers counter-clockwise to different limit positions as determined by the steps in the associated pair of code slides 306, 307. The springs 376 are sufficiently yieldable so as to prevent the different limit positions of the code slides from effecting or limiting the full throw of the bail 380.

The means for spacing the rock fingers laterally each cycle, so as to align with the respective sensing rockers of individual keyboard columns, include a spacing rack 391 slidably fitted to the guide rod 25 by ears 392. Secured to the upper surface of the rack is a channel shaped guide 393 which, as can be best seen in Fig. 11, cooperates with an aligning roller 394 mounted on the under side of the base frame plate 11. The roller is fitted within the channel so as to hold the rack in meshing engagement with an actuating gear 232 (see also Fig. 5). As heretofore described, gear 232 is fast on the bottom end of a shaft 239 and is actuated in a step by step manner by the spacing movement of the card chamber spacing rack 170. Secured to the under surface of the stamp carrier spacing rack 391 is a pair of opposed lips 395 spaced apart so as to define a groove for accommodating the peripheral edge of one of the stamp carrier rock arms 374. Accordingly, as the rack 391 is spaced laterally along the guide 25, the lips 395 effectively pull the rock arms 374 and all related parts including the sensing fingers 371, 372 along the guide rod 25 and along the bail 380. The arrangement is such that as the card chamber spacing rack 170 is advanced from right to left for successively spacing the card chamber in each of the eight cycles of operation, the stamp carrier spacing rack 391 is advanced from left to right, with the gear ratio arranged so as to space the rock fingers 371, 372 in alignment with a different pair of sensing rockers 351, 352 in each of the eight machine cycles. Figs. 51, 52 are operational views which locate the position of these parts in different cycles of operation. In Fig. 51 the parts are shown in a second cycle position wherein the sensing fingers 371, 372 are spaced so as to align with the second pair of rock fingers 351, 352. Fig. 52 shows the same parts in the sixth cycle position wherein it may be noted that the sensing fingers 371, 372 have been laterally shifted or spaced so as to align with the sixth pair of sensing rockers 351, 352. In this manner the sensing of each of the eight keyboard columns is effected successively from left to right to control the differential stops 250 in accordance with the keyboard setting of each separate keyboard column in the respective machine cycles.

As can be seen by reference to Fig. 55, the cam 390 is effective for timing the rocking of bail 380 and rock fingers 371, 372 during the period from 0 to 65°, so as to cam the two permutation slides 270, 271 to their effective set up position just prior to the time of each cycle when the restoring bail 360 for the differential stops 250, under control of cam 265, becomes effective for releasing the selected stop at 71° of the cycle, all as heretofore described.

To briefly review the operation of the card chamber positioning mechanism, with particular reference to Figs. 22, 23, 51, and 52, it will be seen that upon starting the machine the cams 390 will be effective early in the cycle for rocking the bail 380 and rock fingers 371, 372 so as to read the set-up of the first i. e., left hand, keyboard column. The set-up of the first keyboard column will accordingly determine the respective cammed positions of the two permutation slides 270, 271, so as to enable a selective release of one of the differential stops 250 corresponding to the first keyboard column set up. The stop 250 released in the above manner becomes effective for blocking the upward differential movement of the card chamber, comprising the plates 140, 141, so that as the machine enters the latter half of the first cycle the card chamber will be firmly held in one of ten differential positions as controlled by the set-up of the first keyboard column. The card chamber is retained in its respective differential position a sufficient time to enable the printing and punching of a card contained therein with data of the first keyboard column by mechanisms to be hereinafter described. As the card chamber is lowered by the differential mechanism in the latter part of the cycle to its normal or "zero" differential position, the spacing mechanism becomes effective to advance the spacing rack 170 one tooth space which movement, acting through the carry arm 172, is effective for spacing the card chamber laterally from right to left to its second columnar spaced position, which spacing is completed just prior to the end of the first cycle. The spacing mechanism also operates through the gear 232 to advance the spacing rack 391 one columnar space in a left to right direction, so as to bring the rock fingers 371, 372 into alignment with the second keyboard column. Accordingly, as the machine enters the second cycle of operation the second keyboard column will control the differential movement of the card chamber for the second cycle of operation, so as to control the printing and punching of the record in the second column thereof in accordance with the data set up in the second column of the keyboard. Similarly, in each of the remaining cycles of operation, the card chamber will be spaced concurrently with the spacing of the rock fingers 371, 372 so that in each separate cycle the differential movement of the card chamber will be controlled by corresponding separate columns of the keyboard and continuing thus for eight cycles of operation at which time the spacing mechanism is returned to normal and the machine brought to a stop as heretofore described.

Figs. 53, 54 illustrate the form of record card embodying a postal money order as adapted for use with the instant machine. Fig. 53 illustrates the card in blank prior to its insertion in the machine and Fig. 54 illustrates the record upon completion of an issuing operation when issued in the face amount of $47.25. The face of the card 150 is made up in the form of a money order and is divided by vertical score lines 401 into a series of detachable coupon stubs 402, 403, 404. It is desired that each of the stubs contain a printed record of the issuing operation i. e., the face amount of the money order being issued, and, accordingly, suitably labeled blank areas 405 are provided for receiving type imprint from the machine. It is also desired that the money order and each stub, except the paying office stub 404, be stamped with the date stamp imprint 406 of the issuing office and, accordingly, blank spaces are provided for this purpose. The money order has an area containing a pre-punched perforation pattern 407 which is a pattern representation of the serial number of the money order. Means here-in-after to be described are provided for sensing the pre-punched perforation pattern and listing the sensed data in conjunction with data printed on the face of the money order so as to provide a printed tabulation of each separate issuing operation. The serial number may be represented by any suitable punch code, and, in the instant embodiment, the Powers ninety column code is utilized, which is as a code well known to the art and fully described in Patent No. 1,780,621, issued to W. W. Lasker, November 4, 1930.

The right hand end of the card is arranged in a form of a punch field 408 and adapted to receive a perforated pattern from punching mechanism to be hereinafter described. It will be noted that eight columns are provided in the punch field 408, one column thereof being punched in each of the eight cycles of the issuing operation. The first column, that is the left hand column, is punched in the first cycle of the operation under control of the first keyboard column to indicate the year of issue. The next five columns are punched column by column in the next five cycles of the issuing operation, under control of the next five keyboard columns, so as to represent the face amount of the money order and which data corresponds to the data printed on the face of the card in the enclosed areas 405. The last two columns in the punch field are punched in the last two cycles of operation under control of the last two keyboard columns to indicate the post office fee charged for the issuance of the money order. It will be noted that the punch field 408 is punched in a single hole code as distinguished from the multiple hole code adopted for representing the money order serial No. 407. The provision of a single hole code prevents the possibility of an unauthorized alteration of the perforation pattern subsequent to the issuance of the money order and which alteration might otherwise be possible with the use of a multiple hole punch code.

Accordingly, by comparison of Figs. 53, 54 it will be seen that in the course of an issuing operation by the machine the record card is stamped with the date stamp 406 of the issuing post office, imprinted in four separate locations with the face value of the money order, sensed to determine the serial number, and punched to indicate the year of issue, the face amount, and the fee charged for the issuance of the money order. The respective mechanisms by which these several functions are effected will next be separately described.

DATE STAMP MECHANISM (Figs. 6, 10, 11, 14, 15, 16, 17, 22, 23, 51, 52)

The means for stamping the record with the date stamp of the issuing post office is best seen in Figs. 11, 22, 23, 51, 52 and includes a stamp 410 supported on the rearward face of the stamp carrier 375. Any suitable means may be used for securing the stamp to the face of the carrier. In the present instance the stamp is secured to a clamp arm 411 (see Fig. 23), having a slotted opening adapted for slide fitting with the carrier 375 so as to enable easy removal of the stamp from the machine for date changing purposes.

As best seen in Fig. 11, the stamp 410 is thus supported in a position to bear against a card within the card chamber as the carrier 375 is rocked by the rock bail 380 and cam 390 as heretofore described. It is, of course, understood that suitably located openings are provided in the plate 140 of the card chamber for exposing the card to the stamp. Although the carrier is rocked each machine cycle, provision is made for effecting a stamping of the record in selected cycles only. As best seen in Fig. 15, the rock bail 380 is formed with indented edges constituting a cam track which in cooperation with roller 382 and stud 381 serves to shift the stamp carrier 375 to either an effective or ineffective stamping position. In Fig. 15, the parts are shown in the positions occupied at the start of the first cycle with the roller 322 disposed against the raised edge of the rock bail 380. In this position the stamp 410 is cammed sufficiently close to the card chamber as to reach the card with the limited extent of rocking movement imparted by the bail 380. Accordingly, in the first cycle a stamp impression 406 is effected on the stub 402 of the card, (see Fig. 54). As the carrier 375 spaces laterally along the bail 380 to the second cycle position, the roller 382 and stud 381 align with a low indented edge on the bail. In this position the stamp 410 is shifted forwardly a greater distance from the card chamber so that as the bail 380 rocks in the second cycle, the limited extent of rocking will be ineffective for carrying the stamp against a card in the chamber. In the third cycle of operation the carrier 375 is shifted or carried by the raised edge of the bail into effective stamping position so as to effect a stamping impression 406 on the stub 403 of the card. The shape of the bail 380 is such as to render the stamp carrier ineffective in all but the first, third, and eighth cycles of operation, the eighth cycle stamping impression 406 being effected on the money order section of the card 150.

In order to obtain a firm solid backing for the stamping operation, stamp backup mechanism is provided including a platen 415, Figs. 11, 17, 22, disposed rearwardly of the card chamber and of sufficient width to cooperate with the stamp carrier 375 in each spaced position thereof. The platen is supported by and between two follower arms 416 of identical construction, one shown in Fig. 22, each arm being loosely mounted on the guide rod 25. Each follower also carries a roller 417 cooperatively bearing through spring 387 on an individual back up cam 420 on the main drive shaft 59. The cams operate to rock the platen forwardly against the rear surface of a card in the card chamber, occurring, as seen with reference to Fig. 55, at about 65° of the cycle and at a time simultaneous with the actuation of the date stamp carrier 375 by cam 390.

Any suitable inking means may be provided for effecting the stamping of the card. In the present instance said means includes a wide inking ribbon 425, see Fig. 11, wound on an upper and lower spool 426, 427 respectively, and guided by rollers to feed immediately in front of the card chamber. The means for mounting the ribbon spools can best be seen in Figs. 14 and 16. The right hand end of the spools, not shown, are adapted to fit on square pointed spindles 430, 431, the upper spindle 430 seen in Fig. 14, the lower spindle 431 seen in Fig. 16, said spindles being journalled in the frame plates 27 and 28. The left hand end of each spool includes shafts 432, 433 respectively supported in sockets 434, 435, respectively yieldably secured to a door 436. The door is hinged to the side frame plate 12 of the machine, see also Fig. 6, and is provided to enable access to the ribbon spools 426, 427, the date stamp 410 and also the key lock 325 which, as heretofore described, operates to lock up a portion of the machine keyboard.

Associated with the door is certain safety mechanism adapted to prevent operation of the machine except when the door is latched in closed position. A rotatable knob 437 on the door is connected with a latch arm 438, see Fig. 6, which cooperates with a slot in a latch plate 440 to secure the door in closed position. The end of the arm 438 is rounded to cooperate with a recess formed in a slide link 441. The lower end of the link is pivotally connected to a rock lever 442 loosely mounted on the guide rod 25 and tensioned counter-clockwise by a spring 443. The rear end of lever 442 is pivotally connected by a link 444 with a latch lever 445 loosely mounted on a rock shaft associated with type firing mechanism to be hereinafter described. The free end of the latch lever 445 is disposed adjacent and below the heretofore described machine lock out bar 122 so as to engage a slot formed in the under side of said bar. In Fig. 6, the parts are shown in their respective positions where the door is latched shut, in which position the latch is held clear of the lock out bar 122, so as to enable starting of the machine. To unlatch and open the door 436, the door latch arm 438 is turned counter-clockwise until free of the latch plate 440 which movement acts to lift the slide link 441 and through lever 442 and link 444 to rock the latch 445 counter-clockwise into cooperative engagement with the lock out bar 122. When the machine is running, opening of the door is prevented since the lock out bar in its shifted position will block the full counter-clockwise rocking of the latch 445. When the machine is idle with the notch in the lockout bar 122 aligning with the latch 445, opening of the door may be effected, in which event the latch 445 in its fully rocked position blocks shifting of the bar 122 so as to prevent starting of the machine with the door open.

Any suitable form of ribbon feed mechanism may be employed, the present machine utilizing a well known type of ribbon reversing mechanism which can best be seen in Fig. 10. The lower ribbon spool is driven through a ratchet wheel 446 adapted to drive the lower spindle 431 through a friction clutch connection and is actuated each machine cycle by a pawl 447 pivoted to the rock lever 344. The upper ribbon spool is positively driven through a ratchet wheel 448 secured to the upper spindle 430 and is actuated through a loosely mounted lever 449 pivotally connected with the rock lever 344. The lever 449 supports the usual self-reversing pawl 451 yieldably tensioned by an over-center spring 452 into effective forward or reverse driving engagement with the ratchet wheel 448 whereby forward or reverse rotation is imparted to the upper spindle 430 by the rock lever 344 each cycle of machine operation.

CARD PRINTING MECHANISM (Figs. 2, 5, 10, 11, 12, 14, 17, 23, 28–31, 51–54)

As heretofore mentioned, it is desired to print the value of the money order in four separate locations on the card, i. e., on each of the four indicated areas 405 (see Figs. 53, 54). Accordingly, the card printing mechanism is arranged in four separate banks, each bank disposed so as to print identical data in each of the four separate indicated card areas.

The four banks of printing mechanism are suitably mounted in front of the card chamber between a pair of horizontally disposed supporting plates 461, 462 (Figs. 11 and 14) extending between and secured to the front vertical frame plates 26, 27. Each bank comprises an upright substantially U-shaped frame bar 463 (Figs. 28, 29, 31) the opposing walls of which contain openings in which are slidably mounted a single vertically arranged row of type elements 465. In the present instance each row consists of ten type elements 465 for printing the digits from "zero" to "nine" and arranged in that order from the bottom to the top of each row. Each type element carries a doubly bent shoulder fitting 464 detachably secured, for assembly purposes, to the front end of each element by a locking spring 466. A compression spring 467 carried by each element and disposed between the fitting 464 and the front wall of the frame bar 463 serves to fire each type element, when released, into printing engagement with the face of the card 150 in the card chamber 140, 141. Type firing is effected through means including latch pins 470 mounted in the frame bar 463 in a position laterally adjacent each type element. The opening in the rearward wall of the frame bar 463 for supporting the rear end of each latch pin is elongated laterally to enable a slight lateral rocking movement by each latch pin about the fulcrum provided by the forward wall of the frame bar, it being understood that the forward end of each pin is of enlarged cross sectional dimension to provide a shoulder abutting the forward wall of said frame bar. A notch formed in the side of the latch pin 470 is positioned so as to engage the free projecting end of the fitting 464 and latch the associated type element in retracted positions as seen in Figs. 28 and 31. A spring 471 stretched between the forward end of the latch pin and the frame bar 463 yieldably retains the notched portion of the pin in effective latching engagement with the associated type element 465.

The type elements are retracted by means of retract bails 472 one for each bank of type elements and which are loosely mounted for rocking movement on vertical rods 473 mounted in and between the upper and lower supporting plates 461, 462. Each bail 472 is disposed so as to engage the shoulder fittings 464 of all the type elements of the associated bank and is formed with an arm 474 pivotally connected with a retract bar 475 common to all bails for simultaneous rocking thereof. The retract bar is actuated each cycle through a link 476 pivotally connected with a short rock arm 477 secured to the top of an upright rock shaft 478 suitably journalled, as can be seen in Fig. 2, in bearing blocks 479 secured between the front frame plates 21, 26. A rock arm 481 secured to the lower end of the shaft 478, see also Fig. 5, is pivotally connected by a link 482 with a follower bell-crank 483, which bell-crank is pivoted to the under side of the machine base plate 11. The bell-crank 483 carries a roller 484 cooperatively engaging a cam 485 mounted on the vertical drive shaft 175 which as heretofore described is geared to rotate one revolution per cycle. A spring 486 stretched between the rock arm 481 and the machine frame yieldably retains the roller in engagement with the cam periphery. Fig. 28 illustrates the bails 472 in fully retracted position which, by reference to Fig. 55, occurs at about 110 degrees of the cycle. Fig. 29 illustrates the bails in fully released position for enabling the firing of selected type elements 465, which released position occurs at about 220° of the cycle.

The means for effecting the selective firing of individual type elements in each bank of elements includes a series of laterally extending trip bars 490 arranged in a vertical row and each interconnecting related latch pin in each bank. The trip bars are of substantially U-shape in cross section with the open side facing rearwardly and are provided with openings of the same dimension as the rearward end of the latch pins 470 which are fitted thereinto and thereby serve to support the said bars. Additional openings of over-size dimension are also provided in the trip bars for enabling free firing and retract movement of the type elements 465. The right hand end of each trip bar is bent forwardly to provide an ear 491 disposed for selective engagement by a roller 495, whereby a lateral tripping movement is imparted to a selected one of the trip bars each machine cycle. As seen in Fig. 29, the tripping of a bar 490 serves to rock the associated latch pin 470 of each of the four printing banks into unlatching position so as to enable the firing of the four associated type elements 465. Individual springs 492, connecting each trip bar with the machine frame, yieldably retain the bars in normal untripped position.

The roller 495 is vertically positioned each machine cycle in accordance with the differential setting of the card chamber 140, 141. As can be seen also in Figs. 10, 51, and 52, the roller 495 is carried by an upright rock arm 496, the lower end of which is pivoted to a forwardly extending lug formed on the bent ear 161 of the right hand card chamber supporting sleeve 156. The upper extremity of the arm 496 is guided for movement in a vertically elongated slot formed in a yoke shaped trip bail 497, see also Fig. 2, so as to position the roller 495 laterally adjacent the ear 491 of a selected one of the trip bars 490 each machine cycle depending upon the differential setting of the card chamber. It will of course be understood that the vertical spacing of the type elements 465 and trip bars 490 is of the same pitch as that of the differential stops 250, so that when the card chamber is differentially set in any one of the ten differential positions as heretofore described, the roller 495 will be aligned with a corresponding one of the trip bars 490. The trip bail is pivotally connected by a pin 498 with a pair of rock arms 499, the free left hand end of the bail being suitably supported in the machine frame plate 28. The rock arms 499 are mounted fast on a short rock shaft 501 supported in a bracket 502 secured to the machine frame plate 22. The lower rock arm 499 carries a pin 503 cooperatively engaging, under tension of a spring 504, a slot formed in one end of a trip link 505 which link is pivoted at the other end thereof to the retract bar 475. Accordingly, with particular reference to Figs. 28 and 29 it will be seen that as the retract bar is shifted by cam 485 from the retract position of Fig. 28 to the fully released position shown in Fig. 29, the trip link 505 will act to rock the arms 499 causing the trip bail 497 to rock the roller 459 against the ear 491 of a selected one of the trip bars 490, thereby causing the firing of the associated type element 465 in each bank. It will be noted that the initial release movement of the trip link 505 is ineffective for rocking the arms 499 by reason of the pin and slot connection therebetween. The movement of the link 505 becomes effective for rocking the arms 499 at the time the retract bails reach fully released position which is when the cam follower roller 484 rides into the lowest periphery of the cam 485. As can be seen in the timing diagram, Fig. 55, type firing occurs at about 216° of the cycle at which time the card chamber is being held in one of the ten differential positions by the differential mechanism operating in the manner hereinbefore described.

From the foregoing it will be apparent that the particular type elements fired in any one cycle is determined by and corresponds to the differential positioning of the card chamber in that cycle as controlled by the set up of the related keyboard column. For example, assuming the keyboard is set up with data for issuing the money order card illustrated in Fig. 54, the zero setting of the second keyboard will control the card chamber differential movement in the second cycle of operation so as to retain the chamber at the "zero" or lowermost differential position (Fig. 51) in which position the print trip roller 495 will be horizontally aligned with the zero or lowermost trip bar 490. Accordingly, tripping of the "zero" trip bar 490 will release for firing the lowermost or "zero" type element 465 of each of the four print banks so as to print a zero in each of the four designated areas 405 of the money order card. Likewise in the third cycle with the card chamber laterally spaced for the third cycle printing, the differential movement will be limited under control of the third keyboard column to the number "four" differential position whereupon the number "four" trip bar 490 will be tripped so as to print the digit "four" as the next lower denominational order of the printed number. In a similar manner the lower denominational orders of the money order value, i. e., "seven," "two," and "five" are printed in the fourth, fifth and sixth cycles, respectively, all of which printed numbers will appear on the same horizontal line of the card since the differential spacing of the card chamber, as determined by the vertical pitch between the differential stops 250, is the same as the vertical pitch between the type elements 465.

It is not desired to print on the money order card the data pertaining to the year of issue and the issuance fee, which data is set up in the first, seventh and eighth keyboard columns, and for this reason means are provided for preventing card printing in the first, seventh and eighth cycles of the issuing operation. The print disabling mechanism, as best seen in Figs. 5, 28–30, includes a disc 506 formed with bent over blocking segments 507, 508 and secured to the underside of the gear 232. As heretofore described, gear 232 is mounted on a short vertical shaft 230 and is actuated by the card chamber spacing mechanism in a step by step manner throughout the eight cycles of an issuing operation. The blocking segments 507, 508 are disposed to engage a bent under ear 509 formed on the free end of follower 483 so as to limit the rocking movement of the follower in the desired cycles of operation. Figs. 5 and 30 show the position of the disc 506 in the first cycle wherein the segment 507 is disposed within the arc of movement of the ear 509 and thereby effective for preventing the complete rocking of the follower 483 into type firing position in the first cycle of operation. Figs. 28, 29 illustrate the position of the disc in the second machine cycle wherein the segment 507 of the disc is in an advanced counter-clockwise rotated position and clear of the arc of movement of the ear 509 to enable card printing in the second cycle. Similarly, in the next four cycles the follower will be unblocked and free to rock into type firing position. In the seventh and eighth cycles, the segment 508 will be in position for effectively blocking the follower 483 so as to prevent card printing in the seventh and eighth machine cycles. In this manner it will be seen that the disc 506 is effective for preventing the printing on the card of the data pertaining to the year of issue as set up in the first keyboard column and the data representing the issuance fee as set up in the seventh and eighth keyboard columns thereby enabling the card printing of only the data representing the face value of the money order being issued, which data as heretofore described is set up in the second to sixth keyboard columns and printed in the second to sixth machine cycles respectively.

As can be best seen in Figs. 28, 29, individual printing platens 511 are provided for each bank of type elements and comprise inserts preferably of hard rubber or the like mounted in the rear plate 141 of the card chamber. Means are provided also for backing up the platens and include individual back up bars 512, see also Figs. 11, 12, and 17, which bars are pivotally suspended from a pivot rod 513 suitably secured to the top machine frame plate 14. The bars 512 are adapted to be yieldably rocked against the platens by springs 517 concomitantly with the firing of the type elements 465. The springs are secured to the pivot rod 513 and a bracket 516 and are stretched around pins 514, interconnecting pairs of bars 512 at their lower ends, so as to tension the bars clockwise as viewed in Fig. 11. Means are provided for preventing the bars from interfering with the spacing and differential movement of the card chamber and include Y-shaped rock lever 515 loosely carried by each interconnecting pin 514 and fitted into openings formed in a bent over portion of the date stamp platen 415. The levers 515 are disposed within a cut out portion of the bracket 516 which is suitably secured to the machine frame plate 176, which bracket provides a fixed fulcrum about which the levers are rocked under the influence of the date stamp platen 415 and cam 420. In Fig. 11, the back up bars are shown in their ineffective position at 0° of the cycle and clear out the card chamber, which position is determined by an intermediate dwell on the periphery of cam 420. The raised surface of cam 420 is effective for rocking the platen 415 forwardly i. e., counter-clockwise from the position shown, early in the cycle for backing up the date stamp 410 in the manner heretofore described. This forward rocking of the date stamp platen 415 will cause a clockwise rocking of levers 515 about the fulcrum 516 to swing the back-up bars counter-clockwise and further away from the card chamber. The low surface of cam 420 enables the date stamp platen 415 to rock rearwardly from the position shown, i. e. clockwise, thereby rocking the levers 515 counter-clockwise and enabling the back-up bars 512 to rock clockwise into effective backing engagement with the type platens 511. As can be seen in the timing diagram, Fig. 55, the low dwell of cam 420 is effective for fully releasing the back-up bars at about 215° of the cycle which timing coincides with the firing of the type elements under control of the retract cam 485.

CARD PUNCH MECHANISM
(Figs. 10, 15, 36, 51, 52)

Punch mechanism is provided for perforating the money order card 150 in a pattern denoting the data set up in the keyboard of the machine. As heretofore mentioned, the right hand end of the card 150 is designated a punch field 408 having an eight column capacity each of which column is punched during separate machine cycles in a value representative position depending upon the differential setting of the card chamber in the respective cycle of operation.

As can be best seen in Figs. 51, 52 the width of the card 150 is greater than that of the card chamber whereby the punch field area 408 will protrude to the right when the card is properly positioned within the chamber. This protruding portion of the card is disposed to lie immediately in front of the upright frame bar 255. A similarly shaped frame bar 520, see also Figs. 10, 15, and 36, is positioned in slightly spaced relation in front of the bar 255 so as to form a narrow open channel through which the right hand end of the card extends. Punching is effected by a single punch element 521 mounted in the bar 255 and cooperating with a punch die formed in the bar 520. The punch element is located so as to align vertically with the related column of the card punch field 408 in each of the respective spaced positions of the card chamber. The punch element is also located so as to align horizontally with the related index position of a column in each of the respective differential positions of the card chamber. Accordingly it will be apparent that the punch element will operate in the first cycle to punch the first column of the punch field in a position determined by the differential setting of the card chamber which, as heretofore described, is controlled by the set up of the first keyboard column. Likewise, in succeeding cycles, the remaining columns of the punch field will be perforated in accordance with the differential setting of the card chamber in the respective cycle.

The means for actuating the punch element 521 are best seen in Fig. 36. The punch is slidably supported in a nipple 522 suitably secured to the frame bar 255. The head of the punch element is pivotally connected by a pair of links 523 with an actuating lever 524. The lever 524 is mounted for rocking movement on a pivot stud 525 which is secured to the side frame plate 13 of the machine, and is formed with two bent over ears 526, 527 disposed in the path of rotation of a cam roller 528. The roller 528 is cammed on an arm 530 mounted on the main drive shaft 50 which rotates once each cycle in a counter-clockwise direction as viewed in Fig. 36. The roller acting on ear 526 rocks the lever 524 counter-clockwise to thrust the punch element forwardly into cooperative relation with the punch die in the bar 520 thereby perforating the card disposed therebetween. The continued rotation of the roller 528 then engages the rear face of the ear 527 so as to cam the lever clockwise thereby retracting the punch element to normal position. A spring 531 stretched between the lever and a bracket 532 secured to the machine frame, yieldably retains the parts in their normal position as determined by an adjustable limit screw 533 threaded into the bracket 532. In Fig. 36 the parts are shown in their respective positions at about 194° of the cycle just prior to the time that the punch element is actuated. As seen in Fig. 55 card punching occurs at about 217° of the cycle at which time the card is being held in one of the ten punching positions by the differential mechanism in the manner heretofore described, the punch element being fully retracted by 240° of the cycle.

CARD SENSING MECHANISM
(Figs. 15, 17, 37, 38, 39, 40, 43, 53, 54)

The machine is provided with means for sensing the perforation pattern prepunched in a predetermined area of the card, said sensing means being adapted to control additional printing mechanism, to be hereinafter described, so as to effect a printed listing of the data thus sensed. In the present instance, as can be seen in Figs. 53 and 54, the perforation pattern 407 is prepunched to represent the serial number of the money order, the printing of which number in conjunction with the printing of the amounts entered in the money order, as hereinafter described, produces a complete tabulation of all money orders issued by the machine.

The sensing means can best be seen in Figs. 37, 38, 39, and comprises a unitary structure supported by a pair of upright spaced frame bars 540 bolted to a block 541 suitably secured to the base frame plate 11 of the machine. The unit, as seen in Figs. 15 and 17, is disposed on the right hand side of the machine just rearwardly of the card chamber 140, 141. The bars 540 support a pair of horizontal cylindrical posts 542, 543, respectively, the front ends of which project forwardly of the frame bars 540 and serve as guides for a reciprocable yoke 544 slide fitted thereon. The yoke serves as the sensing head of the unit and carries the sensing pin assembly which includes two spaced apart pin supporting plates 545, 546. The plates are suitably secured to the front face of the yoke 544 in spaced relation by a pair of studs 547 and are punched out to provide openings in which are mounted a row of sensing pins 551 and laterally adjacent row of rockable interponents 552. As best seen in Fig. 37 the sensing pins 551 are substantially T shaped and are yieldably tensioned forwardly by springs 553 connected to the head of each pin. The rockable interponents 552 are loosely mounted on a rock shaft 554 and are yieldably tensioned clockwise into cooperative engagement with an associated sensing pin by spring 555. The shaft 554 is journalled in bearing blocks 556 secured to the front pin supporting plate 545. The head of each sensing pin 551 is disposed to engage a protruding lug 557 formed on the adjacent rockable interponent and acts as a shoulder for blocking the rocking of the associates rockable interponent 552 when the sensing pin is in its normal undisplaced position within the sensing head. The sensing pins are selectively displaced in accordance with the perforation pattern being sensed as the forward tips of the pins are carried against the rear surface of the card within the card chamber.

The sensing head is reciprocated each cycle by a lever 561 connected by a pivot bearing 562 to the yoke 544 and rockably mounted in a bracket 563 secured to the base plate 11. A follower roller 564 mounted on the lever cooperatively engages a cam 565 mounted on the main drive shaft 50. A spring 566 tied to a stud 567 on the lever 561 urges the roller against the periphery of the cam. In Fig. 37, the sensing head is shown in a fully released effective sensing position with the lowermost sensing pin 551 in its respective position when locating a perforation punched in the corresponding index position of the sensed card. Accordingly, this lowermost pin 551 penetrates through the card perforation and retains its normal undisplaced position within the sensing head so as to block the clockwise rocking of the associated interponent 552. The movement of all other sensing pins 551, being resisted by the imperforate surface of the card being sensed, are yieldably displaced rearwardly as the sensing head releases to sensing position thereby assuming an unblocking relation to their associated rockable interponents 552.

Associated with each rockable interponent 552 is a transmission pin 571 yieldably mounted for sliding movement in the frame plates 540. The pins 571 are located in positions aligning with the rear tips of their respective rockable interponents 552 when the interponents are blocked by the head of the respective sensing pins but not aligning with the interponents when said interponents are fully released or unblocked by the respective sensing pins. Accordingly, when the sensing head is restored from the released sensing position shown to normal position by cam 565, each interponent 552 blocked by its associated sensing pin 551 upon detecting a card perforation, will bear against an associated transmission pin 571 thereby actuating the transmission pins in accordance with the perforation pattern of the sensed column of the card.

Retract mechanism is provided for resetting the sensing head to effective sensing condition each machine cycle and includes a retract bail 572 mounted on the rock shaft 554 and disposed to engage the shank of the interponents 552. The bail is formed with an arm 573 pivotally connected with a link 574 having an upturned ear slide fitted on a headed stud 575 threaded in the bent over ear of a retract lever 576 pivoted at 577 to the mounting block 541. The retract lever is tensioned counterclockwise against a limit stud 578 by a spring 579 and is formed with a trip arm 581 projecting into the line of rotation of a roller 580 carried by the sensing cam 565. The roller striking the arm 581 each cycle rocks the retract lever momentarily clockwise to pull the link 574 and rock the retract bail 572 counter-clockwise, thereby retracting all rockable interponents 552. It will be noted that the retract is effected when the sensing head is in its forward effective sensing position and serves to erase the set-up from the previous cycle by releasing all sensing pins 551 for selective displacement in accordance with the card perforation pattern being sensed in the current cycle in the manner heretofore described. It is, of course, understood that sensing is effected in a column by column manner, the sensing pins being disposed to align with the first column of the prepunched card pattern in the first cycle of operation and with the successive columns of the punched pattern as the card chamber is laterally spaced throughout the succeeding cycles of an issuing operation. It is also understood that the card chamber plates 140, 141 are suitably perforated to expose the prepunched field of the card. As can be seen in Fig. 55, the sensing head is in effective sensing position from about 36° to 56° of the cycle which is prior to the time the differential or spacing mechanism becomes effective for positioning the card chamber, and is fully restored by 90° of the cycle.

The selective actuation of the transmission pins 571 is carried to a stop basket through individual Bowden wires 582 one end of said wires being supported in nipples 583 mounted in a supporting plate 584 secured to the rear end of the sensing head guide posts 542, 543. The stop basket operates to control the positioning of printing mechanism, to be hereinafter described, and includes a series of spaced plates 585, 586, 587 held in spaced parallel relation by posts 588 and mounted on blocks 589 secured to the base frame plate 11. The plate 585 supports nipples 591 for mounting the ends of Bowden wires 582, and plates 586, 587 are suitably slotted so as to support a series of stops 592, 593. The stops are disposed arcuately in a curve concentric with the differential shaft 275 and, except for the top and bottom stops, are arranged in pairs, each pair comprising a stop 592, and a stop 593. The arrangement of stops is adapted for use with the particular punch code utilized in the prepunched area of the card, which code is embraced within six index positions wherein zero and all odd numbered unit values are represented by a single perforation and all even numbered unit values by a double perforation comprising a perforation in the next lower odd numbered index position in combination with a perforation in the "nine" index position. This punch code, as heretofore mentioned, is one well known in the art and commonly referred to as the Powers 90 Column code. In carrying out this punch code each stop 593 is formed with a bent over flag 594 abutting the edge of the associated paired stop 592. Springs 595 (see Fig. 40) interconnect the stops of each pair, and springs 596 connect each stop 592 with the supporting plate 586 to yieldably retain each pair in ineffective position as shown. The Bowden wires 582 except the wire corresponding to the "nine" index position, are disposed to bear against the edge of stop 592 so that actuation of any one of said wires by the sensing head will shift the associated stop 592 to effective position. The shifting of a stop 592 operates to carry along the paired stop 593 through the tension of the interconnecting spring 595. It will be noted, as best seen in Fig. 43, that the stops 592 at each end of the series are not paired with an associated stop 593. The uppermost stop is the "zero" stop and is separatively mounted since the corresponding "zero" index position in the adopted punch code is not utilized in combined multiple perforation patterns. The lowermost stop 592 is the "nine" stop and is fixed fast in the basket in an effective position. The Bowden wire 582 corresponding to the "nine" index position is mounted in a position to engage the tail of a four fingered blocking bail 597 loosely carried on a pivot pin 598 suitably secured to the stop support plate 586. The fingers of the bail are disposed to engage the flags 594 of each stop 593 so that when the bail is actuated by the "nine" Bowden wire, all stops 593 are blocked and held in ineffective position regardless of the actuation or shifting of an associated paired stop 592. In this manner selective actuation of the stops by the sensing mechanism operates to release the stops in a sequential position corresponding to the value represented by the sensed perforation pattern.

TAPE PRINT MECHANISM
(Figs. 1, 3, 4, 6, 11, 12, 13, 15, 22, 41–49)

The tape print mechanism is provided so as to effect a printed tabulation comprised of the amounts entered in each respective money order issued by the machine, the serial number thereof, together with an identification number designating the machine operator in each issuing operation. The tabulation is achieved by three separate printing members, one of which is controlled each cycle by the sensing means for listing the serial number of each money order, another being controlled each cycle by the differential mechanism for listing the values entered into each money order and the third being manually settable for listing the designating number of the machine operator. Spacing means are provided for said members so as to enable line printing of multi-denominational values by individual printing members.

The means for printing the money order serial number, as can be seen in Figs. 22, 43, 44, includes a type bar 601 pivoted to the forward end of a sector arm 602, which arm is loosely mounted on a hub 603, see also Fig. 47, slidably fitted on the differential shaft 275. Also loosely carried by the hub 603 is a bifurcated arm 604 having bent fingers disposed to straddle the shank of the sector arm 602. The arm 604 and sector arm 602 are tensioned in opposite directions by an interconnecting spring 605, the fingers of the arm 604 being slightly over spaced so as to allow a limited yielding movement between the said two parts. The forward extremity of the arm 604 is formed with a nose disposed to engage with a stud 606 formed on the forward end of a rock lever 607. The lever 607 is loosely mounted on the differential shaft 275 with the rearward extension of the lever disposed for selecting blocking engagement by one of the stops 592, 593. An aligning collar 608 secured to the lever is formed with a peripheral groove seating a spacing roller 609 suitably secured to the machine frame so as to retain the lever in proper aligned position on the shaft 275. The lever 607 is rocked about the shaft each cycle through a link 611, best seen in Fig. 43, pivotally connecting the lever with a follower arm 612 suitably pivoted to the machine base plate 11. The arm 612 carries a roller 613 cooperatively engaging under tension of a spring 614 a cam 615 mounted on the main drive shaft 50. The cam is effective for enabling a yieldable clockwise rocking of the lever 607 to an extent depending upon the respective position of the actuated limiting stop 592 or 593 and for positively restoring the lever to the normal position shown. The rocking movement of the lever is carried through stud 606 to the bifurcated arm 604 and sector arm 602 so as to raise the type bar 601 to a corresponding printing position. The upper extremity or head of the type bar 601, as best seen in Fig. 22, is suitably guided by a slot formed in a spacing bar 620 and supports a plurality of type elements 616 arranged along the rear edge thereof, there being one type element for each of the ten digits "zero to nine." The type elements are thus carried into effective printing position relative to a printing platen 617 (Figs. 48, 49) carried on a shaft 618, the particular type element 616 effective in any one cycle being dependent upon the setting of the type bar 601 as determined by the selectively actuated stops 592, 593. Accordingly, with the stops 592, 593 actuated by the card sensing mechanism as heretofore described, the type bar 601 will be set each cycle for printing the data sensed in the corresponding column in the prepunched perforated pattern of the card. With reference to Fig. 55 it will be seen that cam 615 operates from 91° to set the type bar in effective printing position between 210° and 231° of the cycle and to fully restore the bar by 3° of the following cycle.

The means for printing the amounts entered in each money order includes a type bar 621 of identical construction to the type bar 601 and actuated in a similar manner under control of the differential shaft 275. The type bar 621 is carried by a sector arm 622 loosely mounted on a hub 623 slide fitted on the differential shaft 275 and is actuated through a bifurcated arm 624 yieldably connected therewith by spring 625 which arm is also loosely mounted on the hub 623. Cooperating with the arm 622, 624, is a stud 626 carried by the card chamber lift arm 282. As heretofore described the arm 282 is fast on the differential shaft 275 and is connected by a link 283 with the left hand card chamber support sleeve 156 for differentially positioning the left hand end of the card chamber 140, 141. Accordingly, as the differential shaft is rocked each cycle under control of the machine keyboard to differentially position the card chamber, the stud 626 through the arms 624, 622 will cause the type bar 621 to rise to a corresponding print position.

The means for spacing the type bars 601, 621 so as to effect line printing throughout successive cycles of an issuing operation includes mechanism adapted to slide the hubs 603, 623 along the shaft 275. As can be best seen in Figs. 22, 41, 43, 45, 46, 47 a triangular shaped plate 627 loosely mounted on hub 623 is connected by tie studs 628 with the sector arm 602. Also mounted on the hub 623 is one ear 629 of a spacing rack 630. The rack 630 is mounted for spacing movement along the differential shaft 275 and is supported in meshing engagement with a gear 632 by a grooved collar 631 on shaft 235. The gear 632 is mounted on an upright shaft 635 which, as best seen in Fig. 11, is journalled at its lower end in the frame plate 176 and at its upper end in a horizontally disposed frame plate 633 which is suitably secured to the top frame plate 14 by the depending brackets 123 (see also Fig. 4). Also mounted on shaft 635 is a gear 636 meshing with a gear 637 mounted near the upper end of the shaft 235, which as heretofore described is rotated in a step by step manner through gears 233, 232, 231, 198 by the card chamber spacing rack 170. The arrangement is such that as the rack 170 is advanced each cycle to space the card chamber, the type bar spacing rack 630 will be similarly actuated through the above mentioned gearing to advance the two hubs 603, 623 along the shaft 275 so as to space the type bar supporting mechanism in a corresponding spaced position. Figs. 45, 46 illustrate the position of the parts in the first and 8th cycles, respectively, wherein it will be seen that the sliding movement of the two hubs 603, 623 under influence of the rack 630 is effective for advancing the lower extremities of the type bars 601, 621 in a left to right direction into successive spaced positions.

The heads of the type bars 601, 621 are concurrently spaced by the spacing bar 620. The bar 620 as can also be seen in Figs. 3, 48, 49 is suitably guided for lateral spacing movement by a stud 641 and one of two ribbon spool feed shafts 642. Secured to the bar 620 is a rack 643 meshing with a gear 644 mounted on the upper extremity of the torsion shaft 195. As heretofore described, the shaft 195 is also rotated in a step by step manner by the card chamber spacing rack 170 through gear 198, the gear ratios being arranged so as to space the rack 630 and bar 620 an equal distance. In this manner the two type bars 601, 621 are carried laterally into a different spaced position for each of the respective cycles of the machine operation.

Type bar alignment is effected by an aligning plate 645 (see Figs. 12 and 22) formed with arms by which it is pivotally joined to a rock arm 646 and a follower arm 647. The upper edge of the plate 645 is bent back so as to cooperatively engage detent teeth cut in the forward edge of the sector arms 602, 622, and is tensioned by spring 614 against an upright limit arm formed on the follower arm 647. The arm 646, and follower arm 647 are mounted on a short rock shaft 648 suitably supported in brackets secured to the base frame plate 11. The follower 647 carries a roller 649 cooperating under tension of a spring 651 with a cam 650 fast on the main drive shaft 59. Accordingly, the cam 650 will operate each cycle to rock the aligning plate clockwise into engagement with the teeth of sectors 602, 622, which, as heretofore mentioned, are yieldably positioned by their respective bifurcated arms 604, 624, and in this manner align the type bars 601, 602 in their respective print positions. As seen with reference to Fig. 55, the cam 650 is effective for holding the type bars aligned from 212° to 221° of the cycle.

The printing of the operator's identification number is effected by a type bar 661 identical in structure to the type bars 601, 621 and which, as best seen in Fig. 13, is pivotally supported by an arm 662 loosely mounted on the differential shaft 275. The head of the type bar 661 is suitably guided by a slotted fixed plate 659 secured to a frame bar 660 mounted on the top machine frame plate 14 (see also Fig. 48). The arm 662 (Fig. 13) is secured fast to a sector 663 formed with both gear and detent teeth and also loosely mounted on the shaft 275. The sector is rotated about the shaft by a pinion 664 so as to elevate the type bar 661 in one of its respective print positions relative to the platen 617. A detent pawl 665 pivoted to the side frame plate 12 is tensioned by a spring 666 into cooperative engagement with the detent teeth of the sector so as to yieldably retain the type bar in its respective print position.

The pinion 664 is mounted on a short shaft 667 suitably journalled in the side frame plate 12 and is adapted for manual actuation through a setting knob 668, which can be seen in Figs. 1, 4, 6 and 15. Setting of the knob is effected with the assistance of a setting dial 669 arranged on the machine cover plate 1, partially shown in Fig. 6, whereby an operator may readily set the knob so as to position the type bar 661 for printing the operator's identification number.

In order to prevent any unauthorized use of the machine or improper operator identification, a key lock device is associated with the setting knob 668 and includes a key way 671 mounted in the machine cover plate to cooperate with a code disc 672 mounted on the shaft 667. The disc is formed with openings of suitably differentiated patterns arranged to align with the key way in the respective settings of the knob so as to permit insertion of only the individual key assigned to the respective machine operators. Each operator's key is adapted to actuate a lock 673, best seen in Fig. 13, mounted in the frame plate 12 and which lock carries a rock arm 674. The rock arm is pivotally connected by a link 675 with a bell crank 676 which, as best seen in Fig. 6, is pivoted at 677 to the frame plate 12. The upright arm of the bell crank is disposed for engaging a notch, see also Fig. 49, formed in the top side of lock out bar 122 which as heretofore described must be free to slide laterally before the machine may be started. Actuation of the lock 673 operates to rock the bell-crank arm out of engagement with the bar 122 so as to enable starting of the machine. A spring 678 connecting the bell-crank with the machine frame yieldably retains the parts in unlocked position. Since the code disc 672 is so formed as to prevent removal of a key when turned to unlocked or machine operating position, it will be seen that the presence of the key in the lock is effective for locking the knob 667 in its respective set positions so as to positively retain the type bar 661 in position for printing the corresponding operator identification number.

All three type bars 601, 621, 661 are fired simultaneously by a firing bail 680 actuated by mechanism best seen in Figs. 13, 22, 48, 49. The bail is carried by and between an actuating lever 681 and a rock arm 682 both fast on a rock shaft 683, suitably journaled in the side frame plate 12 and one of the frame brackets 123. The arm and lever are connected for bracing purposes by a tie rod 684, the actuating lever 681 being extended below the shaft (see Fig. 13) and formed with a cam nose disposed for engagement by a trip roller 685. A strong spring 686 connecting the lever 681 with the machine frame tensions the lever clockwise so as to impart a limited throw to the firing bail 680 to a position determined by an adjustable limit stud 687 in the frame plate 12. The trip roller 685 is carried on one arm of a bell-crank 688 pivoted to the upper end of a lever 689 mounted for rocking movement on the frame plate 12. The other arm of bell-crank 688 carries an adjustable set screw 691 adapted to yieldably engage under tension of a spring 693 a limit ear 692 formed on the lever 689. The lower end of lever 689 is connected by a link 694 with an eccentric strap 696 cooperating with an eccentric 695 mounted on the main drive shaft 50. In Fig. 13 the parts are shown in their respective positions after the bail 680 has been fired. It will be seen that as the eccentric 695 rotates counter-clockwise, the strap will pull, through link 694, the lever 689 counter-clockwise causing the trip roller 685 to ride forwardly around the cam nose of the lever 681 and into an effective tripping position in front of the cam nose. The eccentric, upon completing about a half revolution, will then push the lever 689 clockwise causing the trip roller 685 to bear positively against the front edge of the cam nose so as to rock the lever 681 and bail 680 counter-clockwise into pre-firing position against the tension of spring 686. The continued clockwise rocking of lever 689 causes the roller to ride off and clear of the cam nose thereby releasing the bail 680 which snaps rearwardly and clockwise to the position shown in Fig. 13 throwing the type bars against the platen 617. Although each of the type bars are provided with individual springs 697 at their lower extremities (see Fig. 13) for yieldably urging the head of the bars into bearing engagement with the firing bail, the force of the bail when fired as above described, imparts adequate momentum to the head of the type bars to overcome the tension of springs 697 and still strike the platen 617 with sufficient impact for achieving a clear printing impression. With reference to Fig. 55 it will be seen that the eccentric 695 is timed to fire the bail at about 217° which is during the period that the bars are held in alignment by the aligning plate 645 actuated by the aligning cam 659 as before described.

Means are provided for disabling the operation of particular type bars in certain machine cycles said means being best seen in Figs. 3, 13, 22, 48, 49 and including disabling pawls 701, 702 pivotally mounted on the frame bar 669 and each tensioned clockwise by individual springs 703 against limit studs 704. The pawl 701 is disposed to engage the type bar 661 and the pawl 702 the type bar 621, each pawl being formed with a camming edge adapted when effective to rock and hold its respective type bar clear of the firing bail 680. Since type bar 661 for printing the operator's identification number, as distinguished from type bars 601, 621, is not spaced laterally each machine cycle, the pawl 701 operates to enable printing in the first cycle only and to disable printing in the remaining cycles of an issuing operation. Figs. 3, 13 and 22 show the parts in their first cycle spaced position while Figs. 48, 49 show the second cycle spaced position. In the first cycle, the pawl 701 is held rocked in an ineffective position by a nose formed on the spacing rack 628 which bears against a bent down ear formed on the pawl to thereby enable contact of the type bar 661 with the firing bail 680. As the spacing bar 629 advances to its second cycle position, the camming edge of the pawl swings clockwise so as to cam the type bar 661 slightly rearwardly to a position clear of the firing bail 680 and thereby effectively disable the type bar in the second and all remaining cycles.

The type bar 621, as heretofore described, is positioned by the keyboard controlled differential mechanism and since it is not desired to list the year of issue, the pawl 702 operates to disable the bar 621 in the first cycle only and to enable printing by type bar 621 in all remaining cycles. Accordingly the pawl 702 is located so that when the spacing bar 628 returns the type bar 621 to its first cycle spaced position, the bar 621 will be cammed against the camming edge of the pawl 702 and be thus rendered disabled in the first cycle. As the type bar is carried to its second column spaced position (Figs. 48, 49), the pawl becomes ineffective and thereby enables printing by the type bar 621 in the second and all remaining cycles of the issuing operation.

The type bar 601 which is controlled by the machine sensing mechanism for printing the money order serial number is effective each machine cycle.

It is of course understood that adequate provision is made for feeding an inking ribbon between the type bars 601, 621, 661 and the platen 617 and also for advancing a paper tape about the platen. The ribbon feed mechanism employed in the present machine is of a well known reversing type and, briefly described, comprises a pair of ribbon spools 711, see Figs. 3, 12, 13, 48 mounted on the ribbon feed shafts 642. Ribbon feed pawls 712, best seen in Figs. 12, 13, are arranged to selectively engage sprocket wheels on each feed shaft and step the shafts in opposite directions. The pawls are selectively enabled and actuated through a toggle reversing mechanism linked with a bell-crank 713 pivoted to the upper extremity of the eccentric strap 696. The arrangement is such that in each machine cycle, one or the other pawls 712 will be rendered effective for actuating its respective shaft 642 and spool 711 so as to feed the ribbon in one or another direction in front of the platen 617.

The paper tape is arranged to feed around the platen from a supply spool 716 on a shaft 717 to a take up shaft 718, both the spool and shaft being journalled in a pair of support plates 721, see also Fig. 4, which are removably mounted on brackets 722 secured to the top frame plate 14 of the machine. The platen is actuated to line space the tape by means of a ratchet wheel 723, see Fig. 12, secured to the platen shaft 618, and engageable by a feed pawl 724. The pawl is carried by a rocker 725 which is actuated by the eccentric strap 696 through bell-crank arms 726. Since line spacing is required only once for each eight cycle issuing operation, means are provided to disable the rocker 725 and pawl 724 in all but the eighth machine cycle, said disabling means comprising a blocking arm 727 pivotally mounted on a frame stud and normally disposed in a position to block the rocking movement of rocker 725. The arm 727 is formed with a depending flag 728 disposed in the path of an upright stud 729, which stud is carried by accumulator spacing mechanism to be hereinafter described. The arrangement is such that as the stud 729 is carried laterally into the eighth cycle spaced position, it bears on the flag 728 and rocks the blocking arm 727 clear of rocker 725, which thereupon is free to follow the reciprocal movement of bell-crank 726 enabling the pawl 724 to rotate the platen 617 and thereby line space the paper tape. The take up shaft 718 is actuated from the platen shaft 618 through a spring cable 730.

As a precautionary measure provision is made to prevent operation of the machine when the paper tape supply is exhausted. As can be seen in Fig. 12, the shaft 717 for the supply spool is supported loosely in inclined slots formed in the supporting plates 721. One end of the shaft 717 is arranged to bear against the rearward end of a lever 731 (see Fig. 13) pivoted at 732 to the side frame plate 12. The forward end of the lever 731 is disposed immediately above the lock out bar 122, see also Fig. 49, heretofore described, so as to yieldably engage under tension of a spring 733 a notch formed in the upper edge of the lock out bar. The arrangement is such that the weight of the supply spool bearing on the lever 731 is effective for overcoming the tension of springs 733 so as to hold the forward end of the lever clear of the lock out bar 122. However, when the supply spool is exhausted, the feed of the tape, which is secured to the spool, will cause the shaft 617 to ride up the inclined slots in the supporting plates 621 and out of bearing engagement with the lever 731. In such event, the forward end of the lever will be urged into engagement with its respective notch in the lock out bar 122 to block the lateral shifting of the bar and thereby prevent the starting of the machine.

ACCUMULATOR MECHANISM (Figs. 3, 4, 10, 11, 14, 22, 35)

In order to enable an accounting of all money orders issued by the machine within a given accounting period, accumulators are provided for accumulating the data entered in successive issuing operations. The accumulators may be of any known construction, preferably of the visible and non-resettable type and are actuated under control of the differential shaft so as to provide a running visible total of the values punched in and printed on, as aforesaid, all issued money orders.

The accumulator mechanism is contained between a pair of upright side frame plates 740, Figs. 3, 4, and 35, which are secured to the top frame plate 14 of the machine. The plates 740 support a plurality of cross rods on which are mounted the accumulator wheels and related transfer mechanism of each respective denominational order. Fig. 11 is a sectional view taken through the accumulator unit showing the mechanism pertaining to one order and which mechanism includes an accumulator wheel 741 loosely mounted on a fixed cross rod 742 and actuated through a train of pendant idler gears 743, 744. The pendant gears are mounted on cross rods 745, 746 respectively, carried by a series of pendant arms 747, including one at each side of the unit, which arms are adapted to rock about the accumulator wheel support rod 742, so as to carry a gear 744 in and out of mesh with one or another actuator gear 748 or 749 slide fitted on a rectangular actuator shaft 750. Units transfer is effected in a known manner through a trip pawl 751 disposed for tripping by the transfer tooth on a wheel 741 of a lower order so as to unblock a transfer lever 752 mounting a carry pawl 753 associated with the wheel 741 of the next higher denominational order. A yieldable detent pawl 754 is provided for each wheel 741 for retaining the wheel and associated pendant gears 743, 744, in their respective actuated positions. The transfer levers 752 are spring actuated under control of a restoring bail 755 disposed to bear on the rearward tail portions of the levers and which bail rocks each cycle to release any lever which is unblocked by its associated trip pawl 751. The gears and transfer mechanism are held in proper aligned relationship by a series of spaced partition plates 756 which are arranged to lie between mechanism of the several denominational orders. A window bar 757 mounted on the front edges of the plates 756 enables a visible reading of the dials associated with each accumulator wheel 741.

The accumulators are conditioned for adding through the rocking of the restoring bail 755. As seen in Fig. 35, the bail is carried by and between a pair of bell-cranks 757, mounted on opposite ends of one of the fixed cross rods 742. Each of the bell-cranks carries a roller 758 disposed to bear against the cam edge of a rearward extension formed on the associated pendant arms 747. The bail is actuated each cycle through a link 761, see Figs. 11 and 35, pivotally connecting a pivot bracket 759 secured to the bail with a rock arm 762 which is secured fast to a rock shaft 763 (see also Fig. 4) suitably journalled in the supporting frame plate 176. Also fast on the shaft 763 is a rock arm 764 pivotally connected by links 765 with a cam follower arm 766 pivoted to the frame plate 176. The follower arm carries a roller 767 disposed to cooperate under influence of a spring 768 with an accumulator restoring cam 770 mounted on the main drive shaft 50. The construction is such that the cam operates through the aforementioned linkage to raise and lower the restoring bail 755 each machine cycle. As the bail is raised, the transfer levers 752 are free to effect a unit transfer and the pendant arms are free to swing counter-clockwise so as to enmesh a pendant gear 744 with one of the actuator gears 748, 749. When the bail is lowered positively by the cam 770, to the position shown, the transfer levers are restored and the pendant arms are cammed clockwise to disengage the gear 744 from the respective acuator gear 748 or 749. With reference to Fig. 55 it will be seen that the accumulators are conditioned for adding from 77° through 207° which is concurrent in timing with the actuation of the differential mechanism, and are sufficiently restored so as to be disengaged from the actuator gears by 227° of the cycle which is the time that the differential mechanism starts to restore.

The accumulator actuating shaft 750 which has rounded extremities journalled in accumulator frame plates 740, is rotated each cycle to an extent corresponding to the rotation of the differential shaft 275. As shown in Figs. 10 and 35 a gear 771 secured to the shaft 750 enmeshes with a gear sector 772 secured fast to the differential shaft 275, thereby causing entry in the accumulators of the corresponding differential values.

In order to actuate the accumulators in accordance with the corresponding denominational order of the differential value, means are provided for spacing the actuator gears 749, 748 along the shaft 750 and which means, as best seen in Fig. 22, includes a spacing cradle 773. The cradle is adapted to bear against the side faces of the gears 748, 749 and is secured to a spacing rack 774, see also Figs. 4, 11, 14. The rack is suitably supported for lateral spacing movement in guide blocks 776 secured to the frame plate 633 and is actuated by a gear 775 mounted on the upper end of the spacing shaft 235. The arrangement is such that as the spacing shaft 235 is rotated step by step, as heretofore described, each machine cycle, the cradle 773 will space the gears 748, 749 into alignment with the pendant gears 744 of successively lower denominational orders. Fig. 14 shows the spaced position of the respective gears in the first cycle, it being understood that the accumulator mechanism is split into two independent adding units, one for receiving a five denominational value representing the face amount of the money order being issued, and the other unit for receiving a two denominational value representing the post office issuance fee. The actuator wheel 748 is effective for actuating in succession the pendant gears 744 of the five order unit, the wheel 749 being effective for actuating the gears 744 of the two order unit. In the first cycle of an issuing operation both gears 748, 749 are in an ineffective spaced position since it is not desired to enter in the accumulators the value indicating the year of issue. However, as the rack spaces from left to right to carry the gears to the second cycle position, the gear 748 will align with the pendant gear 744 of the highest order in the five order unit so as to enter the value of the highest order of the face amount of the money order, as set up in the second keyboard column. Likewise in the third, fourth, fifth and sixth cycles, the gear 748 will be spaced to effect entry successively in next lower orders of the five accumulator unit. The actuator gear 749 is ineffective in the first six cycles and becomes effective in the seventh and eight cycles to actuate the two pendant gears 744 of the two order adding unit so as to enter in said unit the post office issuance fee.

It is also desired to have a visible record of the number of money orders issued by the machine and for this purpose a counter 780 is provided and which, as seen in Figs. 3 and 10, is mounted on a supporting plate 781 secured by posts 782 to the top frame plate 14. The counter may be of any known construction and in the present instance is of the Veeder type having an actuating arm 783. The counter is actuated once during each issuing operation by a cam follower lever 784 pivoted on the stud 641 and carrying a roller 786 cooperating under tension of a spring 787 with a cam 785 mounted on the torsion shaft 195. The arrangement is such that as the torsion shaft is rotated to space the type bars throughout the eight cycle issuing operation, the cam 785 will rock the follower lever 784 against the actuating arm 783 so as to enter a unit value in the counter 780 and in this manner effect a record of the number of issuing operations performed by the machine. As can be seen with reference to Fig. 55, the cam 785 is effective at about 337° in the third cycle of the issuing operation.

SUMMARY OF OPERATION
*(Figs. 1, 3, 5, 22, 23, 51–54)*

In summarizing the operation of the machine, it will be assumed that the keyboard is set-up for issuing in the year 1949 (9). The money order shown in Fig. 54, in the face amount of $047.25 requiring an issuance fee of eighteen cents and bearing Serial No. 13,650,739, and that the operator's identification selector knob 668 (Fig. 1) is set to identify operator No. 3. Upon insertion of a blank card 150 (Fig. 53) within the card chamber 140, 141 (Fig. 23) and closing of the door 101, (Fig. 3), the clutch mechanism for the main drive shaft 50 becomes effective for enabling rotation of the shaft either by the motor 35 or by hand depending upon the setting of the selector sleeve knob 73 as heretofore described.

In the first cycle of operation, the rock fingers 371, 372 (Figs. 51, 52) will operate to read the first keyboard column so as to limit the differential movement of the card chamber in the "9" position. The date stamp 419 will be rendered effective for stamping the stub 402 of the card. Firing of the type elements 485 is disabled by the blocking segment 567 (Fig. 5). The punch 521 will be actuated so as to perforate the first column of the punch field 408 in the "9" position. The type bar 661 (Fig. 22) is effective for printing the operator's identification No. "3," and the type bar 601 is effective for printing a "1" which is the value sensed in the highest denominational order of the prepunched money order serial number. Type bar 621 is disabled in the first cycle of operation by pawl 702. The accumulator actuator gears 748, 759 (see also Fig. 14) are in an ineffective spaced position in the first cycle of operation.

In the second cycle of operation, the parts will be advanced to their second cycle spaced position, the position shown in Fig. 51, wherein the rock fingers 571, 572 will operate to read the second keyboard column so as to differentially limit the card chamber 140, 141 at the "zero" position. The date stamp 419 is rendered ineffective by the cam bail 386. The face type elements 485 are fired to print a "zero" in the four designated areas 495 on the face of the card, and the punch element 521 is effective for perforating the second column of the punch field 408 in the "zero" position. The type bar 661 (Fig. 22) is disabled by pawl 701. The type bar 601 is fired to print a "3" which is the value sensed in the next lower denominational order of the money order serial number and the type bar 621 is fired to print "0" which is the value in the highest denominational order of the face amount being entered in the money order. The accumulator actuator gear 748 is spaced to an effective position for entering the differential value in the highest order of the separate five order accumulator unit but is not actuated since said value is "zero," and the actuator gear 749 is in an ineffective spaced position.

In the third cycle of operation, the third keyboard column becomes effective for controlling the differential positioning of the card chamber at the "4" position. The date stamp 410 is effective for stamping the stub 403 of the card. Type elements 465 are fired to print "4's" on the face of the money order, and the punch element 521 operates to perforate the third column of the punch field 408 in the "4" position. The type bar 661 is held disabled. The type bar 601 is fired to print the paper tape with a "6" which is the next lower denominational order of the serial number and type bar 621 is fired to print the differential value "4" on the paper tape. Accumulator actuator gear 748 is effective for entering "4" into the next lower order of the separate accumulator unit and the accumulator actuator gear 749 is ineffective.

In the fourth cycle, the fourth keyboard column is effective for limiting the differential movement of the card chamber at its "7" differential position. The date stamp 410 is rendered ineffective by the cam bail 380. The type elements 465 will be fired to print "7" on the face of the record card and the punch element 521 is effective for perforating the fourth column of the punch field 408 in the "7" position. The type bar 661 is disabled. The type bar 601 will be fired to print, under control of the sensing mechanism, a "5" which is the value in the fourth highest denominational order of the serial number, and the type bar 621 will be fired to print a "7" which is the value in the next lower denominational order of the face amount of the money order. The accumulator actuator gear 748 will operate to enter a "7" in the next lower order in the separate accumulator unit, and the actuator gear 749 will be ineffective.

In the fifth cycle of operation, the card chamber will be positioned under control of the fifth keyboard column in its "2" differential position, and the date stamp 410 will be rendered ineffective. Printing elements 465 will be fired to print "2" on the face of the money order and the punch element 521 will perforate the "2" position of the fifth column of the punch field 408. Type bar 661 remains disabled and type bars 601, 621 are fired to print the next lower denominational orders of the serial number and issue amount, respectively. Accumulator actuator gear 748 will enter a "2" in the next lower denominational order of the separate accumulator unit, and the accumulator actuator gear 749 remains ineffective.

In the sixth cycle of operation as controlled by the sixth keyboard column, the card chamber 140, 141 will be held in its "5" differential position, the position shown in Fig. 52, and the date stamp 410 remains ineffective. The printing elements 465 will be fired to print a "5" on the face of the money order and the punch element 521 will be actuated to perforate a "5" in the sixth column of the punch field 408. Type bar 661 (Fig. 22) remains ineffective and type bar 601, 621 are fired to print the next lower denominational orders of the serial number and issue amount, respectively. The accumulator actuator gear 748 will be effective for entering a "5" in the lowest denominational order of the associated separate five order accumulator unit, and the actuator gear 749 remains ineffective.

In the seventh cycle of operation as controlled by the seventh keyboard column, the card chamber 140, 141 will be differentially positioned in its "1" position, and the date stamp 410 remains ineffective. Since it is not desired to print the issue fee on the face of the record, the type elements 465 are disabled by the blocking disc 506 (Fig. 5), but the punch element 521 operates to perforate the "1" position in the seventh column of the punch field 408. Type bar 661 remains disabled. Type bar 601 is fired to print "3" which is the value of the seventh highest denominational order of the sensed serial number, and type bar 621 is fired so as to print a "1" which is the value of the highest denominational order of the issuance fee. Accumulator actuator gear 748 has now been spaced to an ineffective position, and the actuator gear 749 becomes effective for entering a "1" into the higher order of its associated two order separate accumulator unit.

In the eighth cycle under control of the eighth keyboard column, the card chamber 141 is positioned at its "8" differential position. The date stamp 410 becomes effective for stamping the face of the money order 150, and the printing elements 465 remain disabled by the associated blocking disc 406. The punch element 521 operates to perforate the eighth or last column of the punch field in the "8" position. Type bar 661 remains disabled and the type bars 601, 621 are fired so as to print the lowest denominational orders of the serial number and issuance fee, respectively. The accumulator actuator gear 748 is ineffective and the gear 749 is effective for entering "8" in the lower order of the associated separate accumulator unit.

During the course of the eight cycle operation, the counter 780 (Fig. 3) is actuated once through the operation of cam 785 and follower 784, so as to register the completion of an issuing operation.

In the latter part of the eight cycle the spacing mechanism operates to return related parts to their original first cycle position, which movement as heretofore described, operates to disengage the clutch for the main drive shaft 50 and to throw open the card chamber door 101 as the machine is brought to stop at the completion of the eighth cycle. Upon completion of the operation the issued card 150 will appear as shown in Fig. 54 with the amount for which issued of $047.25 printed on the face of the money order and on coupon stubs 402, 403, 404, and with the date stamp imprint 406 of the issuing office appearing on the face of the order and on stubs 402, 403. The punch field 408 of the money order will be perforated to represent the year of issue (9), the issued amount ($047.25) and the issuance fee ($.18). The paper tape print mechanism will have operated to list the sensed money order serial number in tabulation with said issued and fee amounts which amounts will have also been entered in the accumulators so as to effect in this manner a complete accounting for each money order issued by the machine.

While we have described what we consider to be a highly desirable embodiment of the invention, it is obvious that many changes in form could be made without departing from the spirit of the invention, and we, therefore, do not wish to be limited to the exact form herein shown and described, nor to anything less than the whole of the invention as hereinbefore set forth, and as hereinafter claimed.

What we claim as new, and desire to secure by Letter Patent, is:

1. A record issuing machine of the class described operable through a succession of cycles and comprising a keyboard including a plurality of members arranged columnarly and individually settable to represent different items of data to be recorded by the machine, data recording means arranged in cooperable relation to a record to be issued and operable in accordance with the differential positioning of a record relative thereto for recording in said record the data represented by the setting of said keyboard members, and record positioning means for supporting said record in recording relation to said recording means, said positioning means including a spacing mechanism for advancing said record through a succession of columnar spaced positions relative to said recording means, said record positioning means also including a differential mechanism under control of said keyboard and operable in successive cycles for moving said records within each columnar spaced position thereof into a differential data recording position relative to said recording means, said differential position corresponding to the setting of a related one of said settable keyboard members.

2. A machine of the class described operable through a succession of cycles and comprising a keyboard including a plurality of set-up members aranged columnarly and settable to represent data to be recorded by the machine, a keyboard reading device operable for detecting successively the setting of individual ones of said set-up members, data recording means arranged in cooperative relation to a record to be issued and operable in accordance with the differential positioning of a record relative thereto for recording in said record the data represented by the setting of said set-up members, and record positioning means for supporting a record in data recording relation to said recording means and including a spacing mechanism for advancing said record into successive columnar spaced positions relative to said recording means, said positioning means including also a differential mechanism operable under control of said keyboard reading device for moving said record within each columnar spaced position thereof into a corresponding differential position relative to said data recording means.

3. A record issuing machine of the class described operable through a succession of cycles and comprising a keyboard having a plurality of set-up members arranged columnarly and each individually settable to represent data to be recorded by the machine, a keyboard reading device operable each cycle for detecting the setting of an individual set-up member, data recording means arranged in cooperative relation to the record to be issued and operable in accordance with the differential positioning of a record relative thereto for recording in said record the data represented by the setting of said set-up members, a record chamber for supporting a record in cooperative relation to said recording means said chamber being mounted for concurrent spacing and differential movement relative to said recording means, said differential movement being in a direction transverse to the direction of said spacing movement, spacing mechanism associated with said reading device and said chamber and effective for correlating each spaced position of said chamber with a corresponding one of said keyboard set-up members, and means differentially actuable under control of said reading device for imparting a differential movement to said chamber in accordance with the setting of the corresponding set-up member.

4. A record issuing machine of the class described operable through a succession of cycles and comprising a keyboard having a plurality of set-up members arranged columnarly and individually settable to represent data to be recorded by the machine, a keyboard reading device operable for detecting the setting of said set-up members successively, data recording means including a row of individually actuable type elements effective for printing on a record the data represented by the setting of said set-up members, and record positioning means for supporting a record in printing relation to said type elements said positioning means including a spacing mechanism for advancing a record through a succession of columnar spaced positions in a direction lateral to said row of type elements, said positioning means also including a differential mechanism operable under control of said reading device for moving said record within each columnar spaced position in a direction longitudinally to said row of type elements to a differential printing position corresponding to the setting of one of said set-up members, said differential mechanism including means for selectively actuating the individual type element corresponding to the differential positioning of said record relative to said row of type elements.

5. A machine of the class described operable through a succession of cycles and comprising a keyboard having a plurality of set-up members arranged columnarly each settable to represent data to be recorded by the machine, a keyboard reading device operable each cycle for detecting the setting of an individual set-up member, data recording means including a plurality of type elements arranged in a row and each individually actuable for printing on a record data represented by the setting of said set-up members, a chamber for supporting a record in cooperative relation to said row of type elements said chamber being mounted for concurrent columnar spacing and differential movement, said spacing movement being in a direction laterally of said row of type elements, said differential movement being in a direction longitudinally of said row of type elements, spacing mechanism associated with said reading device and said record chamber and effective for correlating each columnar spaced position of said chamber with a corresponding individual set-up member, and means differentially actuable under control of said reading device for imparting a differential movement to said chamber in accordance with the setting of a set-up member, said means including a member operable for selectively actuating the type element corresponding to the differential position of said chamber relative to said row of type elements.

6. A machine of the class described operable for recording data in records having data representative index positions arranged columnarly thereon and comprising a keyboard having a plurality of set-up members arranged columnarly and each settable to represent data to be recorded in said record, a keyboard reading device operable for detecting the setting of said set-up members successively, data recording means including a record perforating member effective for punching said record in a data representative index position, record positioning means for supporting a record in punching relation to said perforating member said positioning means including a spacing mechanism for advancing said record successively into columnar spaced relation to said perforating member, said positioning means including a differential mechanism operable under control of said keyboard reading device for moving into punching relation to said perforating member the index position of a record column corresponding to the setting of a related set-up member, and means for operating said perforating member.

7. A machine of the class described operable through a succession of cycles for recording data in records having data representative index positions arranged columnarly thereon, comprising, in combination, a keyboard having a plurality of set-up members columnarly arranged each settable to represent data to be recorded in said record, a keyboard reading device operable each cycle for detecting the setting of an individual set-up member, data recording means including a record perforating member operable for punching said record in a data representative index position, a record in chamber for supporting a record punching relation to said perforating member, said chamber being mounted for concurrent columnar spacing and differential movement relative to said perforating member, spacing mechanism associated with said reading device and said chamber and effective for correlating each columnar spaced position of said chamber with a corresponding individual keyboard set-up member, and means differentially actuable for imparting a differential movement to said chamber in accordance with the setting of the set-up member detected by said reading device.

8. In a record issuing machine of the class described, a series of individually releasable differential stops, means differentially actuable to limiting engagement with the released one of said stops, keyboard means manually settable in one of a plurality of data representative positions for selectively controlling the release of said stops, a record chamber mounted for differential movement and settable in one of a plurality of data recording positions by said differentially actuable means, a plurality of type elements arranged in a row and each individually releasable into printing engagement with a record within said chamber, said row extending longitudinally in the direction of differential movement of said chamber, said elements being spaced apart within said row a distance equal to the spacing between the data recording positions of said chamber, and a trip member carried by said differentially actuable means, said member selectively releasing for printing the type elements corresponding to the data recording setting of said chamber relative to said row of type elements.

9. In a record issuing machine of the class described, a series of individually releasable differential stops, means differentially actuable to limiting engagement with the released one of said stops, keyboard means manually settable in one of a plurality of data representative positions for selectively controlling the release of said stops, a record chamber mounted for differential movement and settable in one of a plurality of data recording positions by said differentially actuable means, a plurality of type elements one for each setting of each keyboard means and disposed in a row, each element being individually releasable into printing engagement with a record within said chamber, said row extending longitudinally in the direction of said differential movement of said chamber, said elements being spaced apart within said row a distance equal to the spacing between the data recording positions of said chamber, a latch member for each of said type elements, said latch members engaging an associated type element and actuable for releasing the associated type elements, a trip member carried by said differentially actuable means, said member selectively actuating the latch member asosciated with the type element corresponding to the data recording setting of said record chamber relative to said row of type elements, and means for restoring said type elements to latching engagement with said latch members.

10. In a record issuing machine of the class described, a series of individually releasable differential stops, means differentially actuable to limiting engagement with the released one of said stops, a keyboard having individual set-up members columnarly arranged and each manually settable in one of a plurality of data representative positions, keyboard reading means spaceable for cooperative engagement with said set-up members successively and actuable in accordance with the setting of a set-up member for selectively controlling the release of said stops, a record chamber mounted for concurrent differential and spacing movement said spacing movement being in a direction transverse to the direction of said differential movement, said differential movement being controlled by said differentially actuable means to set said chamber in one of a plurality of data recording positions, a row of individually releasable type elements, one for each setting of said chamber, and disposed for printing engagement with a record within said chamber, said row of type elements extending longitudinally in the direction of differential movement of said chamber, said elements being spaced apart within said row a distance equal to the spacing between the data recording positions of said chamber, spacing mechanism associated with said chamber and with said keyboard reading means and effective for correlating each columnarly spaced position of said chamber relative to said row of type elements with an individual one of said keyboard set-up members, and a trip member carried by said differentially actuable means, said trip member selectively releasing for printing a type element corresponding to the data recording setting of said chamber relative to said row of type elements.

11. In a record issuing machine of the class described, a series of individually releasable differential stops, means differentially actuable to limiting engagement with a released one of said stops, a keyboard having individual set-up members columnarly arranged and each manually settable in one of a plurality of data representative settings, keyboard reading means spaceable for cooperative engagement with said set-up members successively and actuable in accordance with the setting of an individual set-up member for selectively controlling the release of said stops, a record chamber mounted for concurrent differential and spacing movement, said spacing movement being in a direction transverse to the direction of said differential movement, said differential movement being controlled by said differentially actuable means to set said chamber in one of a plurality of data recording positions, a row of individually releasable type elements, one for each differentially set position of said chamber and disposed for printing engagement with a record within said chamber, said row extending longitudinally in the direction of differential movement of said chamber, said type elements being spaced apart within said row equally to the spacing between said data recording settings of said chamber, a latch member for each of said type elements, said latch member engaging an associated type element and actuable for releasing the associated type element, spacing mechanism associated with said chamber and said keyboard reading means and effective for correlating each columnar spaced position of said chamber relative to said row of type elements with an individual one of said keyboard set-up members, a trip member carried by said differentially actuable means, said trip member selectively actuating the latch member associated with the type element corresponding to the data recording setting of said record chamber relative to said row of type elements, and means for restoring said type element to latching engagement with said latch members.

12. In a machine of the class described operable through a succession of cycles, in combination, a keyboard having a plurality of set-up members columnarly arranged and settable to represent data to be recorded by the machine, means differentially actuable in accordance with the setting of said set-up members, said means operating in successive cycles under control of an individual one of said set-up members, a printing platen, means for feeding record material to said platen, a printing member operatively associated with said platen and mounting a series of type elements one for each setting of said set-up members, said printing member being adapted for differential and columnar spacing movement relative to said platen and differentially settable under control of said differentially actuable means to carry a selected one of said type elements into printing register with said platen, spacing means for said printing member operable in successive cycles for moving said member through a succession of columnar spaced positions relative to said platen, and means operating upon each differential setting of said printing member for actuating said member into printing engagement against said platen.

13. In a machine of the class described operable through a succession of cycles, a line print mechanism comprising, in combination, a platen, means for feeding record material to said platen, a printing member having a plurality of type elements arranged in a row along one face of said member, said member being differentially settable in a direction longitudinally of said row to carry a selected one of said type elements into printing register with said platen, said member being movable in a direction laterally of said row of type elements to carry said elements into successive columnar spaced relation to said printing platen, differential means cyclically actuable in accordance with the data to be printed for effecting the differential setting of said member, means cyclically operable for columnar spacing said printing member, and means operable upon each differential setting of said member for firing the selected type element against said printing platen.

14. In a machine of the class described operable through a succession of cycles, a line print mechanism comprising, in combination, a printing platen, means for feeding record material to said platen, a pivotally mounted printing member having a plurality of type elements arranged in a row along one face thereof, said member being differentially settable in a direction longitudinally of said row to carry a selected one of said elements into printing register with said platen, said member being also movable in a direction laterally of said row to carry said row into successive columnar space relation to said platen, differential means cyclically actuable to an extent corresponding to the data to be printed for effecting a differential setting of said printing member, means cyclically operable for columnarly spacing said printing member, and means operable for rocking said member about the pivotal mounting for said member to bring the type elements selected in accordance with the differential setting of said member into printing contact with said printing platen.

15. In a machine of the class described having a keyboard and data recording means differentially settable in accordance with the data set up in said keyboard, a differentially actuable mechanism comprising, in combination, a series of limit stops one for each keyboard setting and each individually releasable to an effective position under control of said keyboard, a pair of stop abutting members mounted for cooperative engagement with said stops, said members being disposed oppositely of said stops and each actuable in opposite directions to each other to the limit position determined by the released one of said stops, actuating means for said stop abutting members, said means including a pivotally supported lever linked at opposite ends with said members, the pivotal support of said lever being mounted for a predetermined extent of reciprocal movement, said lever being rotatable about said support for actuating one of said stop abutting members to an extent complemental of the extent of actuation of the other, means connecting one of said stop abutting members with said data recording means for setting said recording means in a differential position corresponding to the position of the released one of said stops, and positively actuated means for reciprocating the pivotal support of said lever.

16. In a recording machine of the class described, a differentially actuable mechanism comprising, in combination, a series of limit stops each individually releasable to an effective limiting position in accordance with data to be recorded by the machine, a pair of stop abutting members disposed oppositely to said stops and actuable in opposite directions into abutting engagement with the released one of said stops, means for differentially actuating said members to an extent determined by the relative position between said members of said released one of said stops, said actuating means including a rockable member for each of said stop abutting members and arranged to rock in opposite directions about a common axis, a pivotally supported member having opposite ends connected with said rockable members, the pivotal support of member being mounted for a predetermined extent of reciprocal movement, said member pivoting about said support for moving one of said rockable members to an extent complemental to the extent of movement of the other of said rockable members, and cam operated means for positively reciprocating the pivotal support for said pivotal member.

17. In a machine of the class described having a keyboard for setting up data to be recorded and data recording means differentially settable in one of a plurality of data recording positions, a differentially actuable mechanism under control of said keyboard said mechanism comprising a reciprocating member positively driven through a predetermined extent of reciprocal movement, a lever pivoted centrally thereof to said member and carried by said member through said predetermined extent of reciprocal movement, a pair of differentially actuable stop abutting members mounted for converging and diverging movement under the influence of said reciprocating member, said pair of differentially actuable members being connected with diametrically opposed portions of said lever and each responsive to the pivotal rocking of said lever in one or another direction relative to said reciprocating member for differentially moving to an extent complementary to that of the other, a plurality of limit stops under control of said keyboard and individually releasable to an effective limiting position between said pair of differentially actuable members and effective for limiting the converging movement of both of said members in the respective differential position, and means connecting one of said pair of differentially actuable members with said data recording means for setting said recording means in a corresponding data recording position.

18. In a machine of the class described having a keyboard for setting up data to be recorded and data recording means differentially settable in one of a plurality of data recording positions, a differentially actuable mechanism under control of said keyboard said mechanism comprising a rockable member adapted for positive reciprocating movement, a resiliently supported pivot for said member, a lever adapted for pivotal movement relative to said member and carried by said member through said reciprocating movement, a pair of differentially actuable stop abutting members adapted for converging and diverging movement under the influence of said reciprocating member, said pair of members being connected with diametrically opposed portions of said lever and each responsive to the pivotal rocking of said lever relative to said reciprocating member for affecting a differential movement complemental to that of the other, a series of keyboard controlled stops individually releasable for limiting the converging movement of said stop abutting members in a corresponding differential position, cam actuated means for reciprocating said rockable member through a predetermined arc of rotation, said arc including an overthrow movement supplementing the movement required for moving said differentially actuable members into limiting engagement with one of said stops, said overthrow movement being effective for rotating said rockable member about the pivotal axis of said lever and against the tension of said resiliently supported pivot for said reciprocating member, and means connecting one of said differentially actuable members with said data recording means.

19. In a machine of the class described operable through a succession of cycles and including recording means movable into a separate spaced position for each of said cycles, a spacing mechanism operatively associated with said recording means and comprising a rack yieldably urged to a restored position, reciprocating means engageable with said rack for advancing the rack through a succession of separate spaced positions, holding means for retaining said rack in each of said separate spaced positions, and rack restoring means responsive to the movement of said rack into a predetermined one of said spaced position for rendering said advancing means and said holding means ineffective, said restoring means including a member swingable into engagement with said rack when in said predetermined spaced position, said member being cam actuated in a direction longitudinally of the direction of movement of said rack for controlling the return of said rack to said restored position.

20. In a machine of the class described having data recording mechanism differentially settable in a data recording position said mechanism being adapted for a spacing movement for each successive setting of said mechanism, a spacing rack operatively connected with said recording mechanism and yieldably tensioned to a restored position, cam reciprocated means engageable with the said rack for advancing the rack through a succession of spaced positions, holding means engageable with said rack for retaining the rack in each advanced position, a cam controlled restoring member engageable with said rack for returning said rack from an advanced position to said restored position, an escapement member actuable for engaging said restoring member with said rack, said escapement member being operatively connected with said cam reciprocated means and said holding means for disengaging said reciprocated means and said holding means from said rack concomitantly with the engagement of said restoring member with said rack, operating means for actuating said escapement member, and means responsive to the advance of said rack to a predetermined spaced position for rendering said operating means effective.

21. In a machine of the class described, a spacing mechanism comprising, in combination, a slidably mounted rack, a spring urging said rack into a restored position, pawls yieldably engaging said rack, one of said pawls being reciprocably actuated for advancing said rack through a series of spaced positions against the tension of said spring, the other of said pawls effective for holding said rack in each of said spaced positions, a cam actuated restoring member engageable with said rack said member being reciprocable in a direction longitudinally to the direction of advance of said rack and adapted when effective to advance said rack beyond engageable relation with said pawls and to control the return of said rack to said restored position, an escapement lever actuable for rendering said restoring member effective, said escapement lever being operatively connected with said pawls and adapted to disengage said pawls from said rack upon the advance movement of said rack by said restoring member, operating means for positively actuating said escapement member, and means responsive to movement of said rack into a predetermined spaced position for rendering said operating means effective.

22. In a machine of the class described operable through a predetermined number of cycles and having a chamber for supporting a record in a data recording position within each of said cycles, the combination with a main drive shaft, operating means for rotating said shaft, a clutch for associating said operating means with said shaft, of a record retaining member manually swingable from an open to a closed position and effective when in a closed position for preventing removal of a record from said chamber, a clutch trip member swingable from a latched position to a released position for rendering said clutch effective, means responsive to the manual swinging of said record retaining member for releasing said clutch trip member, said means including a pivotally mounted crank lever rockable to a position effective for releasing said trip member and means linking said retaining member with said crank lever, said linking means having pivotal connections disposed in dead center relation when said retaining member is in closed position for preventing manual swinging of said retaining member to an open position, and cam actuated means operable after said predetermined number of cycles for restoring said clutch trip member to a latched position to render said clutch ineffective, said cam actuated means including a member actuable for rocking said crank lever and said linking means to a position where said pivotal connections are out of dead center relation to swing said record retaining member to an open position.

23. In a machine of the class described operable through a predetermined number of cycles and having a chamber for supporting a record in a data recording position in each of said cycles, the combination with a main drive shaft, and a clutch for rendering said operating means effective, of a record retaining member manually swingable from an open to a closed position and effective when in closed position for preventing removal of a record from said chamber, a trip lever for operating said clutch, latching means for retaining said trip lever in a position rendering said clutch ineffective, a pivotally supported crank lever rockable from a machine stop position to a machine start position to render said latching means ineffective, toggle means yieldably urging said crank lever into either of said positions, means linking said crank lever with said record retaining member and operable in cooperation with said toggle means upon the swinging of said retaining member to closed position for rocking said crank lever to a machine start position, said linking means having pivotal connections disposed in dead center relation when said crank lever is in the machine start position to prevent the manual swinging of said retaining member to open position, and cam actuated means operable after said predetermined number of cycles for restoring said clutch trip member to latching relation with said latch member, said cam actuated means including a member actuatable in cooperation with said toggle means for rocking said crank lever from machine start position to a machine stop position, said rocking movement being effective through said linking means for swinging said record retaining member from closed position to open position.

24. In a machine of the class described having cyclically operable data recording means and a chamber for supporting a record in data recording relation to said recording means, the combination with a main drive shaft, a clutch for associating said operating means with said shaft, and spacing mechanism operated from said shaft for advancing said recording means through a succession of separate spaced positions, of a record retaining member manually swingable from an open to a closed position and effective when in closed position for preventing removal of a record from said chamber, a clutch trip member rockable from a latched position to a released position for rendering said clutch effective, a pivotally supported crank lever yieldably tensioned into a machine stop position or a machine start position and effective in the latter position for releasing said clutch trip member, means linking said retaining member with said crank lever, said linking means having pivotal connections disposed in dead center relation with said retaining member when in closed position to prevent manual swinging of said retaining member to open position when said crank lever is in machine start position, cam actuated means for restoring said clutch trip member to a latched position to render said clutch ineffective, said means including a member actuable for rocking said crank lever away from machine start position to move the pivotal connections of said linking means out of dead center relation, and means controlled by said spacing mechanism upon advancing to a predetermined spaced position for rendering said cam actuated means effective.

25. In a machine of the class described having cyclically operable data recording means and a chamber for supporting a record in data recording relation to said recording means, the combination with a main drive shaft, operating means for rotating said shaft, and a clutch effective for engaging said operating means with said shaft, of a pivotal member having a machine stop position and a machine start position and adapted when said latter position to render said clutch effective, manually actuable means for rocking said member from the machine stop position towards the machine start position, a record sensing member disposed for cooperative engagement with a predetermined area of a record within said chamber, said sensing member having a yieldably releasable movement adapted for limiting engagement with a perforation in said predetermined area of said record, means responsive to the initial rocking of said pivotal member from machine stop position for releasing said record sensing member, and means arranged for blocking engagement with the said sensing member when in fully released and unlimited position for preventing continued rocking of said pivotal member towards effective machine start position.

26. In a machine of the class described operable through a succession of cycles and including data recording means settable each cycle in one of a plurality of data recording positions and means differentially actuable for effecting the setting of said recording means, a series of differential stops each individually releasable to a position limiting the movement of said differentially actuable means, a pair of permutation slides disposed in blocking engagement with said stops and having notched portions arranged along the blocking edge thereof for enabling the selective release of said stops, each of said slides being individually shiftable to effect a plurality of different combinational settings relative to said stops, said notched portions being arranged to enable the release of a different one of said stops for each of said combinational settings, a keyboard having plurality of set up members each manually settable in one of a plurality of data representative positions, each of said set up members including a pair of code bars, one for controlling each of said slides, said bars having steps arranged along an edge thereof each step defining a limit position for the shifting of the related slide, the steps of each pair of code bars being disposed to control the combinational setting of said slides to selectively unblock a differential stop corresponding to the data represented by the setting of said set up member, and a keyboard reading mechanism actuable in accordance with the setting of a keyboard set up member for shifting said permutation slides to a corresponding combinational setting, said reading mechanism including members disposed for limiting engagement with the stepped edge of each of said code bars and linked with said permutation slides, said members operatively associating one of each pair of said bars with a related one of said slides, and actuating means for said members said means being operable in successive cycles for actuating cooperating pairs of said members successively.

27. In a machine of the class described operable through a succession of cycles and including data recording means settable each cycle in one of a plurality of data recording positions, means differentially actuable for effecting the setting of said recording means, and spacing means operable each cycle for effecting successive columnar spaced relation between the record material to be recorded and said recording means, a series of differential stops each yieldably releasable individually to a position limiting the movement of said differentially actuable means, a pair of permutation slides disposed for blocking engagement with said stops and having notched portions arranged along the blocking edge thereof for selectively unblocking the release of said stops, said slides being individually shiftable to a plurality of combinational settings relative to said stops, said notched portions being arranged to unblock a different one of said stops in each of said different combinational settings, a keyboard associated with said stops said keyboard having a plurality of set up members columnarly arranged each member settable in one of a plurality of data representative positions, each of said set up members including a pair of code bars, one relating to each of said stops, said bars having a stepped edge each step defining a limit position for controlling the extent of shifting of the related permutation slide, the steps of each pair of said bars controlling the combinational setting of said slides to selectively unblock the stop corresponding to the data represented by the setting of a set up member, and keyboard reading mechanism actuable in accordance with the setting of a set up member for shifting said pair of permutation slides to a corresponding combinational setting, said mechanism including members disposed for limiting engagement with the stepped edge of each of said code bars and linked with said slides, said members operatively associating one of each pair of code bars with the related one of said permutation slides, and actuating means operable each cycle for moving a pair of said members into limiting engagement with the paired code bars of one of said set up members, said actuating means being mounted for spacing movement relative to said members under control of said spacing mechanism for actuating successively pairs of said members in each of said succession of cycles.

LORING P. CROSMAN.
HAROLD J. CHALL.

References Cited in the file of this patent

UNITED STATES PATENTS

| Number | Name | Date |
| --- | --- | --- |
| 905,422 | Hanson | Dec. 1, 1908 |
| 1,528,390 | Ansart | Mar. 3, 1925 |
| 2,562,251 | Wockenfuss | July 31, 1951 |
| 2,577,070 | Cheney | Dec. 4, 1951 |

FOREIGN PATENTS

| Number | Country | Date |
| --- | --- | --- |
| 401,012 | Great Britain | Nov. 9, 1933 |